(12) United States Patent
Jensen

(10) Patent No.: US 7,773,621 B2
(45) Date of Patent: Aug. 10, 2010

(54) TRANSACTION SELECTOR EMPLOYING ROUND-ROBIN APPARATUS SUPPORTING DYNAMIC PRIORITIES IN MULTI-PORT SWITCH

(75) Inventor: Michael Gottlieb Jensen, Ely (GB)

(73) Assignee: MIPS Technologies, Inc., Sunnyvale, CA (US)

(*) Notice: Subject to any disclaimer, the term of this patent is extended or adjusted under 35 U.S.C. 154(b) by 522 days.

(21) Appl. No.: 11/532,521

(22) Filed: Sep. 16, 2006

(65) Prior Publication Data
US 2008/0069129 A1    Mar. 20, 2008

(51) Int. Cl.
*H04L 12/56* (2006.01)
(52) U.S. Cl. ....................... 370/412
(58) Field of Classification Search ............ None
See application file for complete search history.

(56) References Cited

U.S. PATENT DOCUMENTS

| | | | |
|---|---|---|---|
| 4,126,895 A | 11/1978 | Weemaes et al. | |
| 4,924,380 A | 5/1990 | McKinney et al. | |
| 5,095,460 A | 3/1992 | Rodeheffer | |
| 5,276,887 A | 1/1994 | Haynie | |
| 5,309,382 A | 5/1994 | Tamura et al. | |
| 5,357,512 A | 10/1994 | Khaira et al. | |
| 5,528,513 A | 6/1996 | Vaitzblit et al. | |
| 5,570,356 A * | 10/1996 | Finney et al. | 370/476 |
| 5,636,210 A | 6/1997 | Agrawal | |
| 5,689,508 A * | 11/1997 | Lyles | 370/391 |
| 5,734,877 A | 3/1998 | Ries et al. | |
| 5,745,778 A | 4/1998 | Alfieri | |
| 5,793,993 A | 8/1998 | Broedner et al. | |

(Continued)

FOREIGN PATENT DOCUMENTS

DE        10110504 A1    10/2001

(Continued)

OTHER PUBLICATIONS

Shen & Lipasti; Modern Processor Design: Fundamentals of Superscalar Processors; 2003; McGraw-Hill Companies, Inc; Beta Edition; pp. 252, 281, 283-285.

(Continued)

*Primary Examiner*—Ayaz R Sheikh
*Assistant Examiner*—Timothy J Weidner
(74) *Attorney, Agent, or Firm*—Sterne, Kessler, Goldstein & Fox, P.L.L.C.

(57) ABSTRACT

An apparatus for selecting one of N transaction queues from which to transmit a transaction out a switch port. P round-robin vectors of P queue priorities each have N bits that are a 1-bit left-rotated and subsequently sign-extended version of an N-bit input vector with a single bit true corresponding to the last queue selected at the priority. N P-input muxes each receive a corresponding bit of each round-robin vector and select one of the inputs specified by its queue priority. Selection logic receives a transaction from each queue and selects one transaction corresponding to the queue having a transmit value greater than or equal to the queues left thereof in the input vectors. Each queue's transmit value comprises a least-significant bit equal to the corresponding mux output, a most-significant bit that is true if its transaction is transmittable, and middle bits comprising the queue priority.

6 Claims, 32 Drawing Sheets

U.S. PATENT DOCUMENTS

| | | | |
|---|---|---|---|
| 5,832,278 A * | 11/1998 | Pham | 710/243 |
| 5,898,694 A | 4/1999 | Ilyadis et al. | |
| 5,913,049 A | 6/1999 | Shiell et al. | |
| 5,938,742 A | 8/1999 | Faddell et al. | |
| 6,032,218 A | 2/2000 | Lewin et al. | |
| 6,052,375 A | 4/2000 | Bass et al. | |
| 6,073,159 A | 6/2000 | Emer et al. | |
| 6,094,435 A | 7/2000 | Hoffman et al. | |
| 6,101,193 A | 8/2000 | Ohba | |
| 6,105,051 A | 8/2000 | Borkenhagen et al. | |
| 6,105,053 A | 8/2000 | Kimmel et al. | |
| 6,152,612 A | 11/2000 | Liao et al. | |
| 6,163,827 A | 12/2000 | Viswanadham et al. | |
| 6,170,051 B1 | 1/2001 | Dowling | |
| 6,212,544 B1 | 4/2001 | Borkenhagen et al. | |
| 6,260,073 B1 * | 7/2001 | Walker et al. | 370/412 |
| 6,272,520 B1 | 8/2001 | Sharangpani et al. | |
| 6,272,567 B1 | 8/2001 | Pal et al. | |
| 6,272,579 B1 | 8/2001 | Lentz et al. | |
| 6,295,600 B1 | 9/2001 | Parady | |
| 6,385,715 B1 | 5/2002 | Merchant et al. | |
| 6,389,449 B1 | 5/2002 | Nemirovsky et al. | |
| 6,430,642 B1 | 8/2002 | Stracovsky et al. | |
| 6,434,155 B1 | 8/2002 | Jones et al. | |
| 6,438,132 B1 * | 8/2002 | Vincent et al. | 370/395.42 |
| 6,470,016 B1 | 10/2002 | Kalkunte et al. | |
| 6,477,562 B2 | 11/2002 | Nemirovsky et al. | |
| 6,510,155 B1 * | 1/2003 | Sudo | 370/395.6 |
| 6,516,369 B1 | 2/2003 | Bredin | |
| 6,542,921 B1 | 4/2003 | Sager | |
| 6,549,930 B1 | 4/2003 | Chrysos et al. | |
| 6,556,571 B1 | 4/2003 | Shahrier et al. | |
| 6,563,818 B1 | 5/2003 | Sang et al. | |
| 6,567,839 B1 | 5/2003 | Borkenhagen et al. | |
| 6,633,939 B2 | 10/2003 | Butta' et al. | |
| 6,647,449 B1 * | 11/2003 | Watts | 710/111 |
| 6,658,447 B2 | 12/2003 | Cota-Robles | |
| 6,665,760 B1 | 12/2003 | Dotson | |
| 6,675,187 B1 * | 1/2004 | Greenberger | 708/622 |
| 6,721,874 B1 | 4/2004 | Le et al. | |
| 6,741,552 B1 * | 5/2004 | McCrosky et al. | 370/218 |
| 6,754,736 B1 | 6/2004 | Ogawa et al. | |
| 6,792,446 B2 | 9/2004 | Merchant et al. | |
| 6,810,426 B2 | 10/2004 | Mysore et al. | |
| 6,868,529 B1 * | 3/2005 | Frannhagen | 716/1 |
| 6,931,641 B1 | 8/2005 | Davis et al. | |
| 7,007,153 B1 | 2/2006 | Berenbaum et al. | |
| 7,015,913 B1 | 3/2006 | Lindholm et al. | |
| 7,035,997 B1 | 4/2006 | Musoll et al. | |
| 7,042,883 B2 | 5/2006 | Fan et al. | |
| 7,051,189 B2 | 5/2006 | Warnes | |
| 7,110,359 B1 | 9/2006 | Acharya | |
| 7,120,714 B2 | 10/2006 | O'Connor et al. | |
| 7,150,021 B1 | 12/2006 | Vajjhala et al. | |
| 7,185,178 B1 | 2/2007 | Barreh et al. | |
| 7,269,712 B2 | 9/2007 | Cho | |
| 7,382,787 B1 | 6/2008 | Barnes et al. | |
| 7,490,230 B2 | 2/2009 | Jensen et al. | |
| 7,506,140 B2 | 3/2009 | Jensen | |
| 7,509,447 B2 | 3/2009 | Jensen | |
| 7,554,907 B1 * | 6/2009 | Epps et al. | 370/230 |
| 7,580,350 B1 * | 8/2009 | Parker | 370/230 |
| 7,596,086 B2 * | 9/2009 | Wang et al. | 370/230 |
| 7,613,904 B2 | 11/2009 | Jones et al. | |
| 7,660,969 B2 | 2/2010 | Jensen et al. | |
| 2001/0028659 A1 | 10/2001 | Johnson et al. | |
| 2001/0043610 A1 | 11/2001 | Nemirovsky et al. | |
| 2002/0062435 A1 | 5/2002 | Nemirovsky et al. | |
| 2002/0075883 A1 | 6/2002 | Dell et al. | |
| 2002/0136230 A1 | 9/2002 | Dell et al. | |
| 2003/0018686 A1 | 1/2003 | Kalafatis et al. | |
| 2003/0028816 A1 | 2/2003 | Bacon | |
| 2003/0058876 A1 | 3/2003 | Connor et al. | |
| 2003/0076849 A1 | 4/2003 | Morgan et al. | |
| 2003/0081624 A1 | 5/2003 | Aggarwal et al. | |
| 2003/0182536 A1 | 9/2003 | Teruyama | |
| 2003/0233394 A1 | 12/2003 | Rudd et al. | |
| 2004/0060052 A1 | 3/2004 | Brown et al. | |
| 2004/0090974 A1 | 5/2004 | Balakrishnan et al. | |
| 2004/0128448 A1 | 7/2004 | Stark et al. | |
| 2004/0139441 A1 | 7/2004 | Kaburaki et al. | |
| 2004/0215945 A1 | 10/2004 | Burky et al. | |
| 2004/0215947 A1 | 10/2004 | Ward et al. | |
| 2004/0216105 A1 | 10/2004 | Burky et al. | |
| 2004/0216106 A1 | 10/2004 | Kalla et al. | |
| 2004/0258070 A1 | 12/2004 | Arima | |
| 2005/0076189 A1 | 4/2005 | Wittenburg et al. | |
| 2005/0138328 A1 | 6/2005 | Moy et al. | |
| 2006/0004989 A1 | 1/2006 | Golla | |
| 2006/0004995 A1 | 1/2006 | Hetherington et al. | |
| 2006/0095732 A1 | 5/2006 | Tran et al. | |
| 2006/0123420 A1 | 6/2006 | Nishikawa | |
| 2006/0153197 A1 | 7/2006 | Nemirovsky et al. | |
| 2006/0159104 A1 | 7/2006 | Nemirovsky et al. | |
| 2006/0179194 A1 | 8/2006 | Jensen et al. | |
| 2006/0179274 A1 * | 8/2006 | Jones et al. | 712/205 |
| 2006/0179276 A1 * | 8/2006 | Banerjee et al. | 712/205 |
| 2006/0179279 A1 * | 8/2006 | Jones et al. | 712/214 |
| 2006/0179280 A1 | 8/2006 | Jensen et al. | |
| 2006/0179281 A1 | 8/2006 | Jensen et al. | |
| 2006/0179283 A1 | 8/2006 | Jensen et al. | |
| 2006/0179284 A1 | 8/2006 | Jensen et al. | |
| 2006/0179439 A1 * | 8/2006 | Jones et al. | 718/105 |
| 2006/0187949 A1 | 8/2006 | Seshan et al. | |
| 2006/0206692 A1 | 9/2006 | Jensen | |
| 2007/0089112 A1 | 4/2007 | Jensen | |
| 2007/0113053 A1 | 5/2007 | Jensen et al. | |
| 2007/0116025 A1 | 5/2007 | Yadlon et al. | |
| 2007/0204137 A1 | 8/2007 | Tran | |
| 2008/0019388 A1 | 1/2008 | Harmon et al. | |
| 2008/0069115 A1 | 3/2008 | Jensen | |
| 2008/0069128 A1 | 3/2008 | Jensen | |
| 2008/0069130 A1 | 3/2008 | Jensen | |
| 2008/0229068 A1 | 9/2008 | Bose et al. | |
| 2009/0135832 A1 | 5/2009 | Fan et al. | |
| 2009/0249351 A1 | 10/2009 | Jensen | |
| 2009/0292575 A1 | 11/2009 | Ellebracht et al. | |

FOREIGN PATENT DOCUMENTS

| | | |
|---|---|---|
| EP | 1351117 | 8/2003 |
| WO | WO02/39269 | 5/2002 |

OTHER PUBLICATIONS

Mano & Kime; Logic and Computer Design Fundamentals; 2001; Prentice Hall; Second Edition Updated; p. 119.

Kessler, R.E. "The Alpha 21264 Microprocessor." Compaq Computer Corporation. Mar.-Apr. 1999 IEEE Macro. pp. 24-36.

Cazorla et al. "DCache Warn: an I-Fetch Policy to Increase SMT Efficiency." 18th International Parallel and Distributed Processing Symposium. Apr. 26, 2004, pp. 74-83. XP002405769 Los Alamitos, CA. USA.

Tullsen et al. "Exploiting Choice: Instruction Fetch and Issue on an Implementable Simultaneous Multithreading Processor." Computer Architecture News, ACM. New York, NY, US. vol. 24, No. 2, May 1, 1996. pp. 191-202, XP000592185. ISSN: 0163-5964 Paragraph 5.2.

Roth et al. "Speculative data-driven multithreading." High-Performance Computer Architecture, 2001. HPCA. The Seventh International Symposium on Monterrey, Mexico Jan. 19-24, 2001, Los Alamitos, CA, USA. IEEE Comput. Soc. US. Jan. 19, 2001. pp. 37-48, XP010531673. ISBN: 0-7695-1019-1.

Wallace et al. "Threaded multiple path execution." Computer Architecture, 1998. Proceedings. The 25th Annual International Symposium on Barcelona. Spain Jun. 27-Jul. 1, 1998. Los Alamitos, CA, USA. IEEE Comput. Soc, US, Jun. 27, 1998. pp. 238-249, XP010291395. ISBN 0-8186-8491-7.

Kreuzinger et al. "Real-time Event-Handling and Scheduling on a Multithreaded Java Microcontroller." Microprocessors and Microsystems, 1PC Business Press Ltd. London, GB. vol. 27, No. 1, Feb. 1, 2003, pp. 19-31. XP004404896. ISSN: 0141-9331.

Pouwelse et al. "Energy Priority Scheduling for Variable Voltage Processors." Proceedings of the 2001 International Symposium on Low Power Electronics and Design. ISLPED. Huntington Beach, CA. Aug. 6-7, 2001. pp. 28-33, XP001134578. ISBN: 1-58113-371-5.

MIPS32 Architecture for Programmers, vol. III; The MIPS32 Privileged Resource Architecture. MIPS Technologies, Mar. 12, 2001, pp. 1,2,7,37-39, 49, 53-57. XP002407506.

U.S. Office Action for U.S. Appl. No. 11/086,258, filed Jan. 16, 2007, pp. 1-17 and cover sheet.

Lebeck, A.R. et al. "A Large, Fast Instruction Window for Tolerating Cache Misses." Proceedings. 29th Annual International Symposium on Computer Architecture, 2002. Publication Date: 2002. pp. 59-70.

Shen & Lipasti. "Modern Processor Design: Fundamentals of Superscalar Processors." 2004. McGraw-Hill Companies. p. 259.

U.S. Appl. No. 09/616,385, filed Jul. 14, 2000, Musoll et al.

U.S. Appl. No. 09/706,154, filed Nov. 3, 2000, Nemirovsky et al.

"RTOS Operations Put in Hardware IP", Electronic Engineering Times article, posted Jan. 17, 2005 by Ron Wilson. http://www.eetasia.com/article_content.php3?article_id=8800356670.

"A Survey of Processors With Explicit Multithreading", in ACM Computing Surveys, vol. 35, No. 1, Mar. 2003, pp. 29-63 by Theo Ungerer, et al.

"Interleaving: A Multithreading Technique Targeting Multiprocessors and Workstations", from Proceedings of the 6th International Conference on Architectural Support for Programming Languages and Operating Systems, 1994 by Laudon et al.

"Instruction Recycling on a Multiple-Path Processor", in 5th International Symposium on High Performance Computer Architecture, Jan. 1999 by Wallace et al.

MIPS SOC-it 101 System Controller Family User's Manual, MD0163, Rev. 01.05, May 18, 2004, p. 49-50.

MIPS SOC-it 101 System Controller Family Integrator's Guide, MD0162, Rev. 01.03, May 18, 2004, p. 31-35.

MIPS SOC-it 101 System Controller Family Datasheet, MD0164, Rev. 01.04, May 19, 2004, p. 25-26.

Shin et al. "Dynamic Scheduling Issues in SMT Architectures." Parallel and Distributed Processing Symposium, 2003. Apr. 22, 2003. pp. 77-84. XP010645608. ISBN: 0-76950-1926-1.

Fiske et al. "Thread Prioritization: A Thread Scheduling Mechanism for Multiple-Context Parallel Processors." Future Generations Computer Systems, Elsevier Science Publishers. Amsterdam, NL. vol. 11, No. 6, Oct. 1995. pp. 503-518, XP004002214 ISSN: 0167-739X.

Ilhyun et al. "Understanding Sceduling Replay Schemes." High Performance Computer Architecture. 2004. Department of Electrical and Computer Engineering. University of Wisconsin-Madison. Feb. 14, 2004. XP010778841. ISBN: 0-7695-2053-7.

Sigmund et al. "On Speculation Control in Simultaneous Multithreaded Processors." Journal of Universal Computer Science. vol. 7, No. 9. Sep. 28, 2001. pp. 848-868. XP009069084. ISSN 0948-695X.

Hennessy et al. "Computer Architecture—A Quantative Approach, 3rd edition." 2002. Morgan Kaufmann, USA. XP002388271. ISBN: 1558607242. pp. 181-187.

Sazeides, Yiannakis. "Modeling Value Speculation." High-Performance Computer Architecture, 2002. Feb. 2, 2002. pp. 189-200. XP010588723. ISBN: 07695-1525-8.

"Mercury Computer Systems Introduces the MC432 Serial RapidIO Switch With a Breakthrough Feature Set." connectiviyZONE Products for the week of Dec. 12, 2005. Downloaded on Aug. 18, 2006 from http://www.analogzone.com/iop_1212.htm.

"Tundra Launches Industry's First Serial RapidIO Switch." connectivityZONE Products for the week of Feb. 14, 2005. Downloaded on Aug. 18, 2006 from http://www.analogzone.com/iop_0214.htm.

"Tsi568A." Technical Specifications. Tundra Semiconductor Corporation. 2006. Downloaded on Aug. 18, 2006 from http://vvww.tundra.com/product_detail.aspx?id=1399.

"MC432 8-port Switch Short Datasheet." Revision 1.2. Mercury Computer Systems, Inc. Feb. 7, 2006.

English Abstract for German Patent Publication No. DE 10110504 A1, published Oct. 18, 2001, 1 page, from espacenet.com.

Office Communication, dated Mar. 31, 2009, for U.S. Appl. No. 11/532,520, filed Sep. 16, 2008, 13 pages.

Office Communication, dated Oct. 13, 2009, for U.S. Appl. No. 11/532,520, filed Sep. 16, 2008, 13 pages.

Examiner Interview Summary, mailed Jan. 14, 2010, for U.S. Appl. No. 11/532,520, filed Sep. 16, 2008, 2 pages.

Office Communication, dated Apr. 1, 2009, for U.S. Appl. No. 11/532,522, filed Sep. 16, 2008, 12 pages.

Office Communication, dated Nov. 5, 2009, for U.S. Appl. No. 11/532,522, filed Sep. 16, 2008, 14 pages.

Examiner Interview Summary, mailed Feb. 16, 2010, for U.S. Appl. No. 11/532,522, filed Sep. 16, 2008, 3 pages.

Notice of Allowance, mailed Mar. 5, 2010, for U.S. Appl. No. 11/532,520, filed Sep. 16, 2006, 6 pages.

Office Communication, dated Mar. 9, 2010, for U.S. Appl. No. 11/532,523, filed Sep. 16, 2006, 29 pages.

* cited by examiner

*Round-Robin Generator*

*Barrel-Incrementer*

ANDing the ~E vector with the ~L vector guarantees that at least one bit of the first addend is clear, which prevents the single increment bit of the second addend L vector from infinitely rippling around the ring.

Result: Q 1 is selected for transmission because it has the greatest TS_Q_priority. Although all Q's are transmittable and all are at the same PM_Q_priority 3 (which is highest priority), Q 1 was selected as as the next round-robin Q at priority 3 since Q 0 was the last selected Q at priority 3 and Q 1 was the transmittable Q rotatively left of Q 0.

Fig. 9B

Transaction Scheduler Example 2

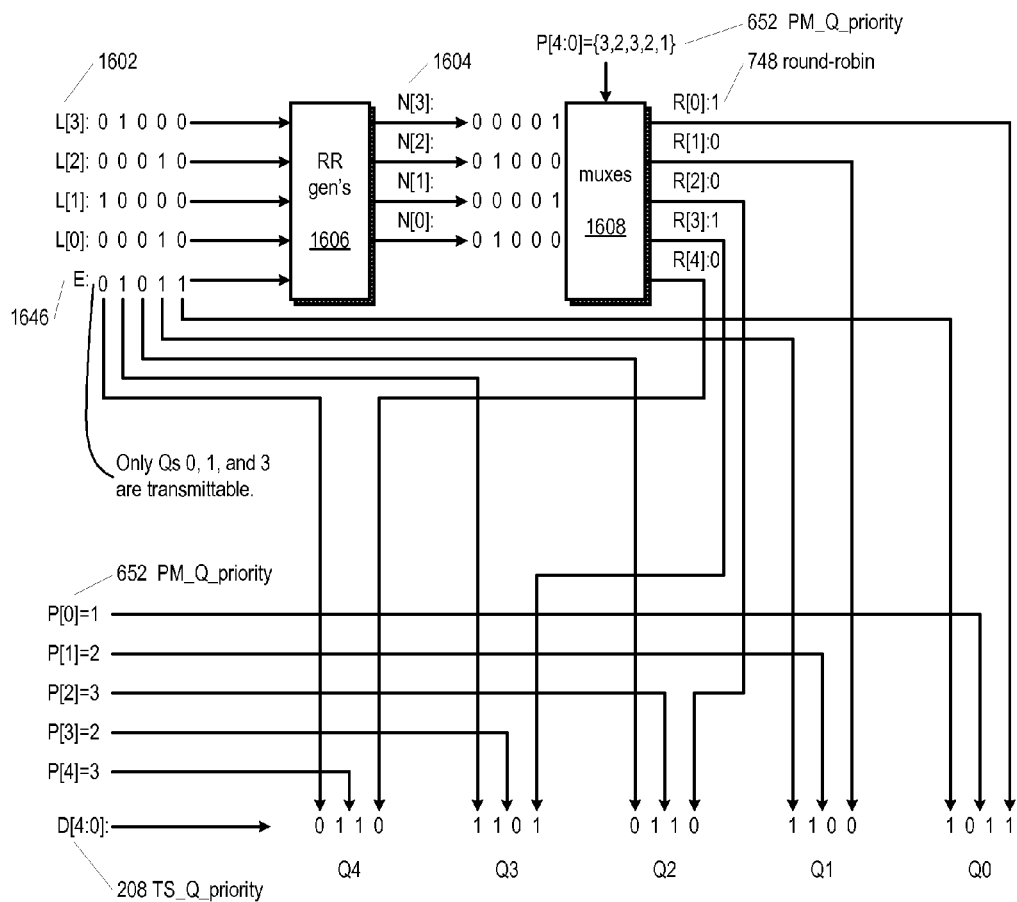

Result: Q 3 is selected for transmission because it has the greatest TS_Q_priority. Although Q 1 also is transmittable and at the highest PM_Q_priority which has a transmittable transaction (priority 2), Q 3 is selected because the round-robin bit is set for Q 3 (not Q 1) at priority 2, since Q 1 was the last selected Q at priority 2 and Q 3 is the next transmittable Q rotatively left of Q 1 (since Q 2 is not transmittable, i.e., is not enabled to transmit transactions).
Although the round-robin bit is set for Q 0 because it was selected as the round-robin Q at priority 1, Q 0 is not selected for transmission because its TS_Q_priority is lower than Q 3 and Q 1.
Q 4 was skipped at priority 3 for round-robin since it was not transmittable, and Q 2 was skipped at priorities 2 and 0 for round-robin since it was not transmittable.

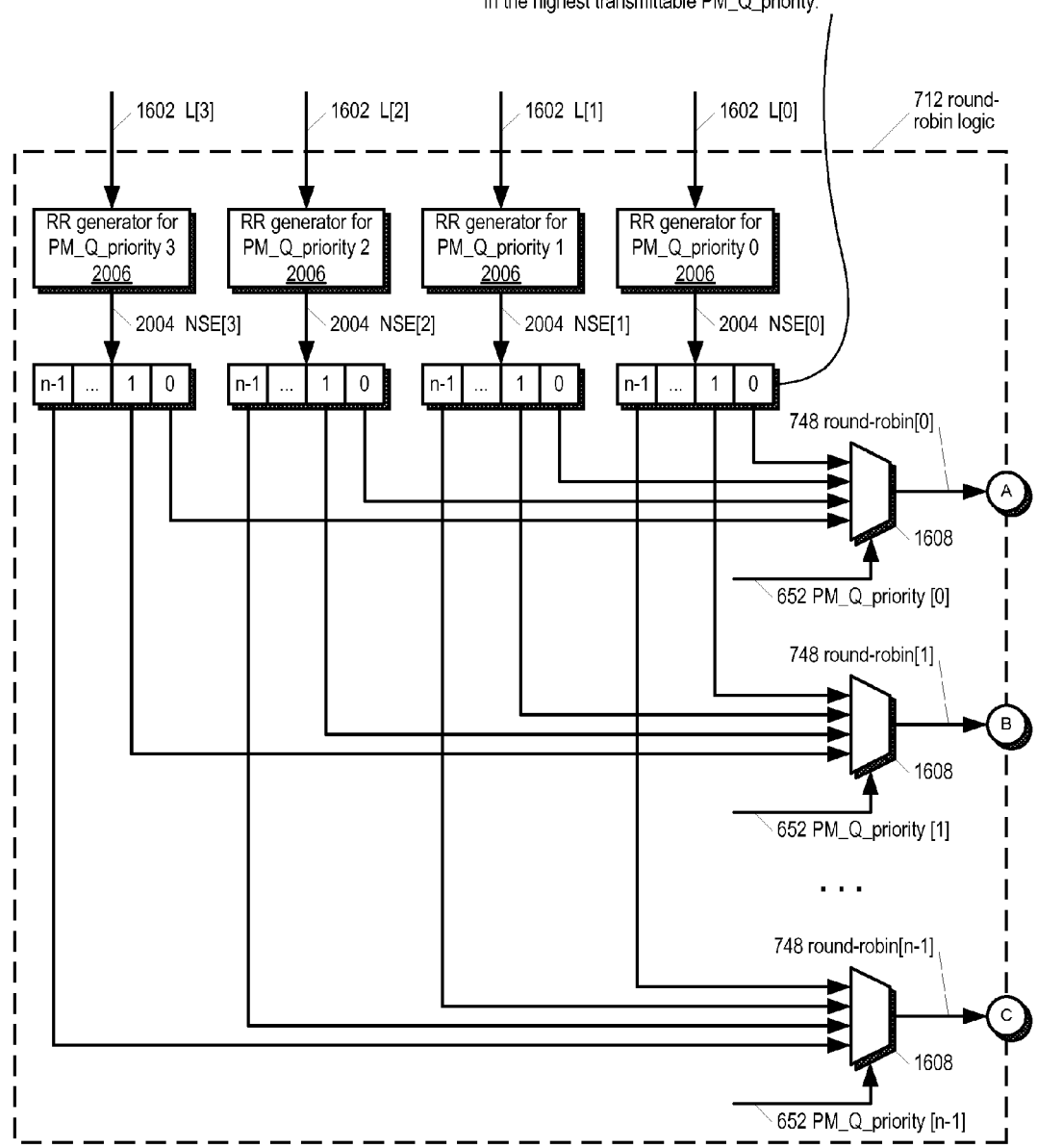

Fig. 11

Round-Robin Generator

Advantageously, the round-robin logic of this alternate embodiment does not require knowledge of which instruction queues are transmittable in order to generate the round-robin indicator indicating the next Q to be selected at the PM_Q_priority level. The combination of the sign-extended N vector in conjunction with the transmittable bit and PM_Q_priority level to create a transmit priority that is used by the greater-than-or-equal comparators insures that the correct round-robin Q is selected.

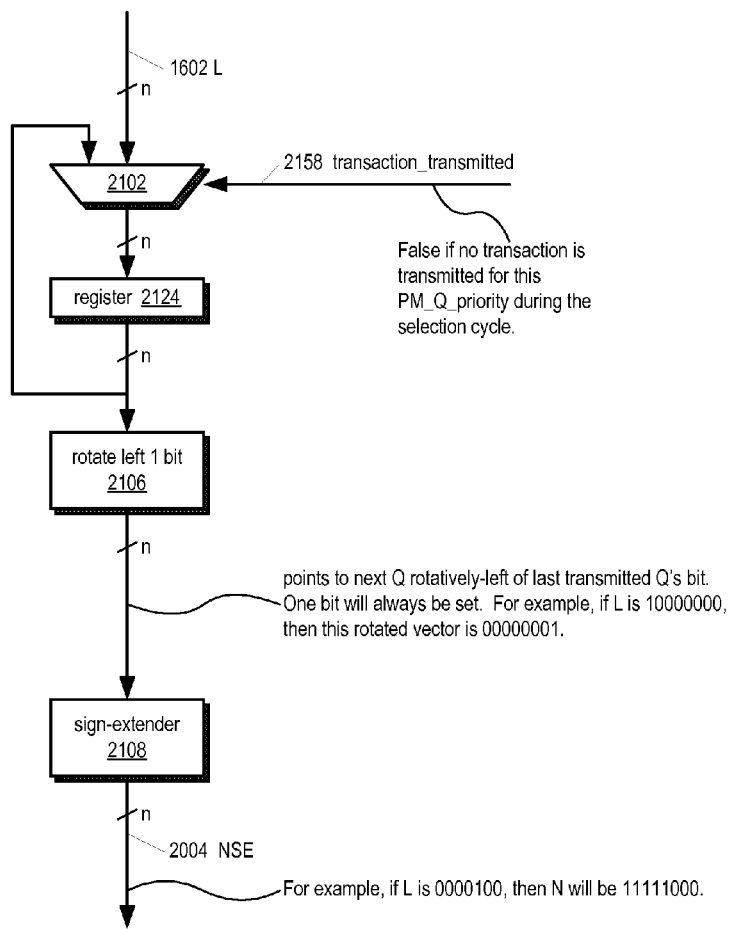

Fig. 12A

Transaction Scheduler (Alternate Embodiment) Example 1

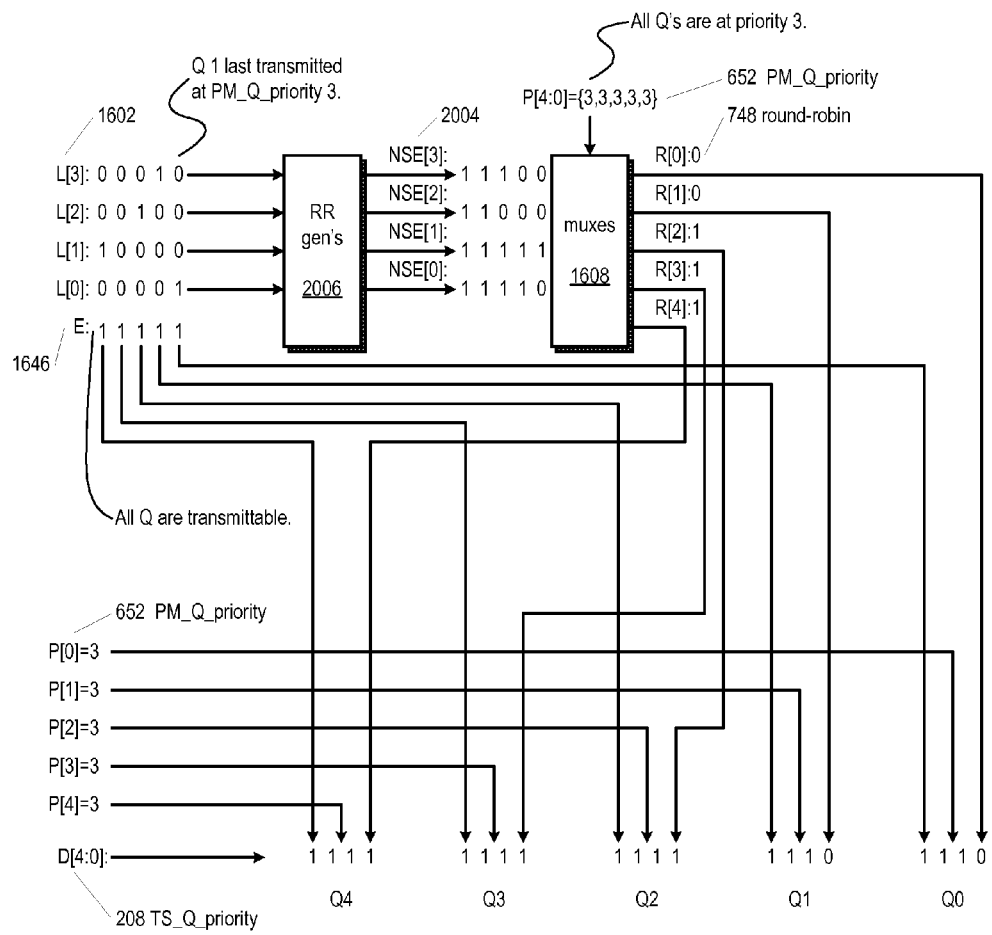

Result: Q 2 is selected for transmission because it is the highest Q in the transaction selection logic mux tree (i.e., right-most bit in the NSE vector) that has the greatest or equal TS_Q_priority.
Although all Q's are transmittable and all are at the same PM_Q_priority 3 (which is highest priority), Q 2 was selected as the next round-robin Q at priority 3 since Q 1 was the last selected Q at priority 3 and Q 2 was the Q rotatively left of Q 1.

Transaction Scheduler (Alternate Embodiment) Example 2

Transaction Scheduler (Alternate Embodiment) Example 3

Result: Q 0 is selected for transmission because it is the highest Q in the transaction selection logic mux tree (i.e., right-most bit in the NSE vector) that has the greatest or equal TS_Q_priority since Q 2 is not transmittable and Q 3 and 4 are at a lower PM_Q_priority.

Transaction Scheduler (Alternate Embodiment) Example 4

Result: Q 1 is selected for transmission because it is the highest Q in the transaction selection logic mux tree (i.e., right-most bit in the NSE vector) that has the greatest or equal TS_Q_priority since even though Q 0 and 1 are at the same PM_Q_priority and are transmittable, Q 1 is first in the sign-extended NSE vector.

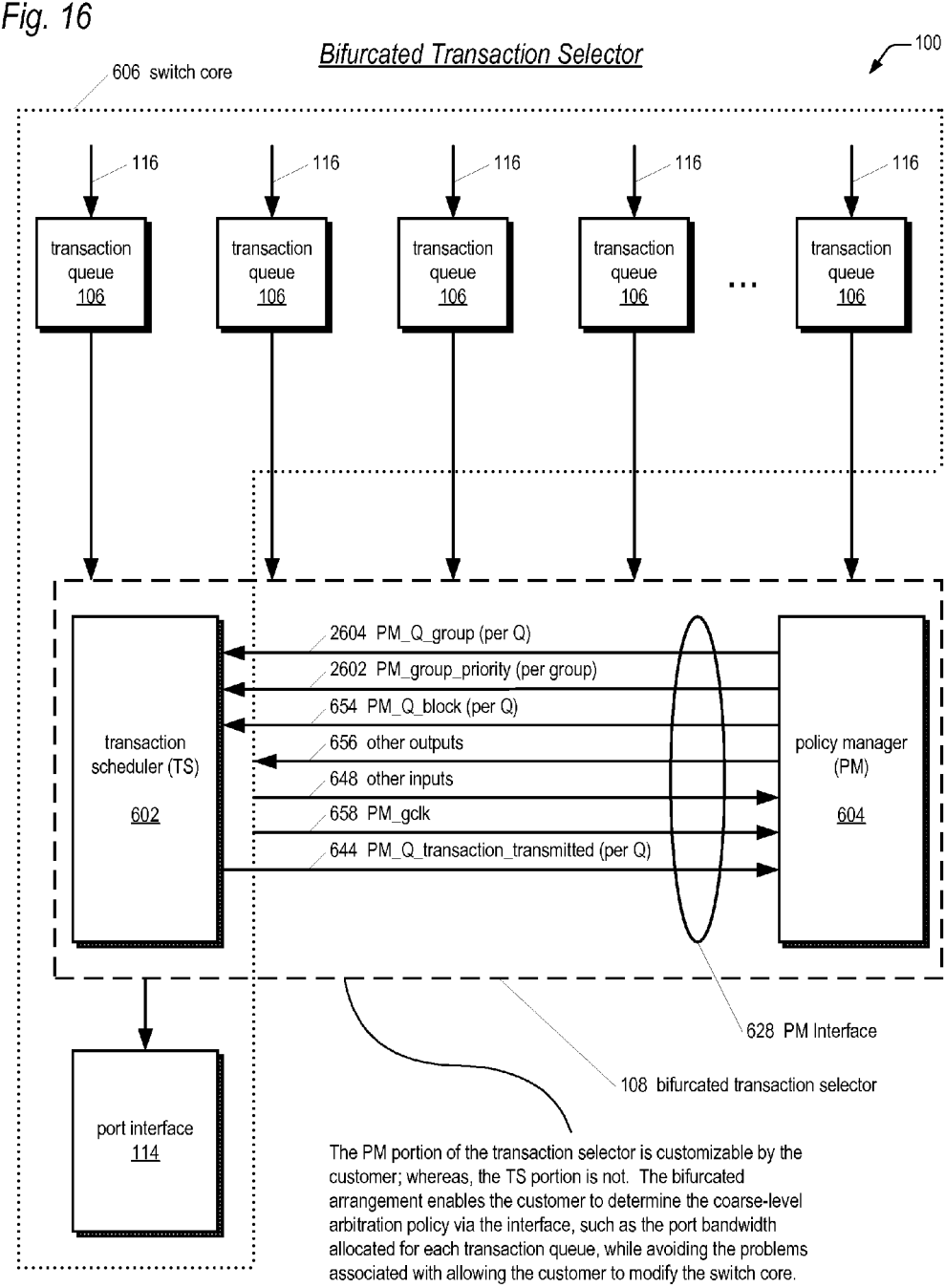

Group-Based Transaction Scheduler (TS)

Group-Based Transaction Scheduler (TS) (Alternate Embodiment)

*Fig. 23*

Example Policy Manager Group Priority Generator

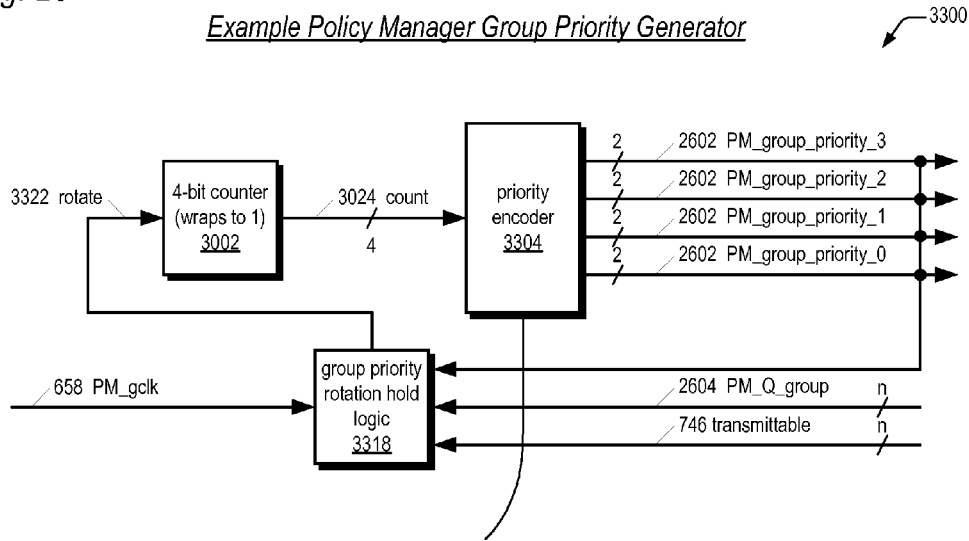

PM_group_priority_3 = {count[0] | count[1] | count[2], count[0]};
PM_group_priority_2 = count == 4'b1001 ? 2'b01 :
 {(~count[3] & ~count[2]) | ~count[2] & ~count[1] | count[1] ^ count[0]), (count[2] & count[1] | count[1] & ~count[0])};
PM_group_priority_1 = ~G2_priority;
PM_group_priority_0 = ~G3_priority;

| count | group 3 priority | group 2 priority | group 1 priority | group 0 priority |
|---|---|---|---|---|
| 4'b0001 | P3 | P2 | P1 | P0 |
| 4'b0010 | P2 | P3 | P0 | P1 |
| 4'b0011 | P3 | P2 | P1 | P0 |
| 4'b0100 | P2 | P0 | P3 | P1 |
| 4'b0101 | P3 | P2 | P1 | P0 |
| 4'b0110 | P2 | P3 | P0 | P1 |
| 4'b0111 | P3 | P1 | P2 | P0 |
| 4'b1000 | P0 | P2 | P1 | P3 |
| 4'b1001 | P3 | P1 | P2 | P0 |
| 4'b1010 | P2 | P3 | P0 | P1 |
| 4'b1011 | P3 | P2 | P1 | P0 |
| 4'b1100 | P2 | P0 | P3 | P1 |
| 4'b1101 | P3 | P2 | P1 | P0 |
| 4'b1110 | P2 | P3 | P0 | P1 |
| 4'b1111 | P3 | P1 | P2 | P0 |

Fig. 24

| cycle count | rotation count | group 3 priority | group 2 priority | group 1 priority | group 0 priority |
|---|---|---|---|---|---|
| 1 |  | P3 | P2 | P1 | P0 |
| 2 | 4'b0001 | P3 | P2 | P1 | P0 |
| 3 |  | P3 | P2 | P1 | P0 |
| 4 | 4'b0010 | P2 | P3 | P0 | P1 |
| 5 |  | P3 | P2 | P1 | P0 |
| 6 | 4'b0011 | P3 | P2 | P1 | P0 |
| 7 |  | P3 | P2 | P1 | P0 |
| 8 |  | P2 | P0 | P3 | P1 |
| 9 | 4'b0100 | P2 | P0 | P3 | P1 |
| 10 |  | P2 | P0 | P3 | P1 |
| 11 |  | P3 | P2 | P1 | P0 |
| 12 | 4'b0101 | P3 | P2 | P1 | P0 |
| 13 |  | P3 | P2 | P1 | P0 |
| 14 | 4'b0110 | P2 | P3 | P0 | P1 |
| 15 |  | P3 | P1 | P2 | P0 |
| 16 | 4'b0111 | P3 | P1 | P2 | P0 |
| 17 |  | P3 | P1 | P2 | P0 |
| 18 | 4'b1000 | P0 | P2 | P1 | P3 |
| 19 |  | P3 | P1 | P2 | P0 |
| 20 | 4'b1001 | P3 | P1 | P2 | P0 |
| 21 |  | P3 | P1 | P2 | P0 |
| 22 | 4'b1010 | P2 | P3 | P0 | P1 |
| 23 |  | P3 | P2 | P1 | P0 |
| 24 | 4'b1011 | P3 | P2 | P1 | P0 |
| 25 |  | P3 | P2 | P1 | P0 |
| 26 |  | P2 | P0 | P3 | P1 |
| 27 | 4'b1100 | P2 | P0 | P3 | P1 |
| 28 |  | P2 | P0 | P3 | P1 |
| 29 |  | P3 | P2 | P1 | P0 |
| 30 | 4'b1101 | P3 | P2 | P1 | P0 |
| 31 |  | P3 | P2 | P1 | P0 |
| 32 | 4'b1110 | P2 | P3 | P0 | P1 |
| 33 |  | P3 | P1 | P2 | P0 |
| 34 | 4'b1111 | P3 | P1 | P2 | P0 |
| 35 |  | P3 | P1 | P2 | P0 |

3400

TRANSACTION SELECTOR EMPLOYING ROUND-ROBIN APPARATUS SUPPORTING DYNAMIC PRIORITIES IN MULTI-PORT SWITCH

CROSS REFERENCE TO RELATED APPLICATION(S)

This application is related to the following Non-Provisional U.S. Patent Applications:

| Ser. No. | Filing Date | Title |
| --- | --- | --- |
| 11/051,997 | Feb. 4, 2005 | BIFURCATED THREAD SCHEDULER IN A MULTITHREADING MICROPROCESSOR |
| 11/051,980 | Feb. 4, 2005 | LEAKY-BUCKET THREAD SCHEDULER IN A MULTITHREADING MICROPROCESSOR |
| 11/051,979 | Feb. 4, 2005 | MULTITHREADING MICROPROCESSOR WITH OPTIMIZED THREAD SCHEDULER FOR INCREASING PIPELINE UTILIZATION EFFICIENCY |
| 11/051,998 | Feb. 4, 2005 | MULTITHREADING PROCESSOR INCLUDING THREAD SCHEDULER BASED ON INSTRUCTION STALL LIKELIHOOD PREDICTION |
| 11/051,978 | Feb. 4, 2005 | INSTRUCTION/SKID BUFFERS IN A MULTITHREADING MICROPROCESSOR |
| 11/087,064 | Mar. 22, 2005 | BARREL-INCREMENTER-BASED ROUND-ROBIN APPARATUS AND INSTRUCTION DISPATCH SCHEDULER EMPLOYING SAME FOR USE IN MULTITHREADING MICROPROCESSOR |
| 11/087,070 | Mar. 22, 2005 | INSTRUCTION DISPATCH SCHEDULER EMPLOYING ROUND-ROBIN APPARATUS SUPPORTING MULTIPLE THREAD PRIORITIES FOR USE IN MULTITHREADING MICROPROCESSOR |
| 11/086,258 | Mar. 22, 2005 | RETURN DATA SELECTOR EMPLOYING BARREL-INCREMENTER-BASED ROUND-ROBIN APPARATUS |
| 11/087,063 | Mar. 22, 2005 | FETCH DIRECTOR EMPLOYING BARREL-INCREMENTER-BASED ROUND-ROBIN APPARATUS FOR USE IN MULTITHREADING MICROPROCESSOR |
| 11/191,258 | Jul. 27, 2005 | MULTITHREADING INSTRUCTION SCHEDULER EMPLOYING THREAD GROUP PRIORITIES |
| 11/532,520 | concurrently herewith | TRANSACTION SELECTOR EMPLOYING BARREL-INCREMENTER-BASED ROUND-ROBIN APPARATUS SUPPORTING DYNAMIC PRIORITIES IN MULTI-PORT SWITCH |
| 11/532,522 | concurrently herewith | BIFURCATED TRANSACTION SELECTOR SUPPORTING DYNAMIC PRIORITIES IN MULTI-PORT SWITCH |
| 11/532,523 | concurrently herewith | TRANSACTION SELECTOR EMPLOYING TRANSACTION QUEUE GROUP PRIORITIES IN MULTI-PORT SWITCH |

BACKGROUND OF THE INVENTION

Field of the Invention

The present invention relates in general to switches, and particularly to the fair and efficient arbitration for switch port bandwidth from multiple competing requestors thereof.

In a multi-port switch, each of the ports of the switch receives transactions from the device coupled to the port. The switch routes the transactions from the source port to a destination port of the switch specified by the transaction so that the destination port can output the transactions to the device coupled to the destination port. The destination port may receive transactions from all the other ports of the switch. If the destination port is receiving requests to output transactions from multiple source ports, the destination port must select the order in which to output the transactions received from the various source ports. Thus, each of the source ports competes for output bandwidth of the destination port, and the destination port must implement a policy for arbitrating, or scheduling, the transmission of the transactions from the various competing source ports out the destination port.

As may be observed from the foregoing, the extent to which a switch helps or hinders the overall performance of a system that incorporates the switch to connect various devices may be highly dependent upon the policy for scheduling the transmission of transactions out of the ports of the switch. Furthermore, the appropriate transaction scheduling policy may be highly dependent upon the particular application in which the switch is used. Still further, it may be desirable to vary the transaction scheduling policy from port to port within the switch depending upon the type of device that is coupled to a given port. In particular, it may be desirable to accommodate varying quality-of-service requirements for the various combinations of paths between the different ports of the switch depending upon the types of devices connected to the ports. That is, it may be desirable for each destination port to guarantee different transaction bandwidth requirements for each of the source ports of the switch, and particularly, the avoidance of transaction bandwidth starvation for any of the source ports. Consequently, it is highly desirable to provide customers with various applications the ability to customize the transaction scheduling policy to meet their particular requirements. A customizable transaction scheduling policy is particularly desirable when attempting to design a switch core that may be part of a system that is customizable to meet the needs of various customer applications. This makes the switch core reusable for various designs, which is highly desirable because it avoids having to redesign an entire switch for each application.

However, making the entire transaction scheduling policy circuitry of the switch customizable is problematic since the transaction scheduling policy circuitry is typically closely tied to the internal operation of the switch, which may have undesirable side effects. For example, it may be difficult for the customer to understand the internal workings of the switch, and therefore difficult for the customer to customize the transaction scheduling policy circuitry. Furthermore, timing critical signal paths of the internal switch would necessarily be exposed to the customer, which might potentially lower the overall clock speed of the switch if the customer's custom logic is too slow. Finally, the customer may introduce bugs into the transaction scheduling policy circuitry potentially seriously impacting the overall operation and functionality of the switch core. Therefore, what is needed is a switch with an architecture that enables its transaction scheduling policy circuitry to be customizable without undesirable side effects, such as those mentioned above.

Furthermore, because there are multiple ports in a switch competing for the limited output bandwidth of a given port, there is a need to fairly arbitrate among the requesting ports for the limited output bandwidth. One fair arbitration scheme used in other contexts is a round-robin arbitration scheme. In a round-robin arbitration scheme, an order of the requesters is maintained and each requestor gets a turn to use the requested resource in the maintained order. The circuitry to implement a round-robin arbitration scheme in which each of the requestors requests the resource each time the resource becomes available is not complex. A conventional round-robin circuit may be implemented as a simple N-bit barrel shifter, wherein N is the number of requestors and one bit corresponds to each of the N requesters. One bit of the barrel shifter is initially true, and the single true bit is rotated around the barrel shifter each time a new requester is selected. One characteristic of such a round-robin circuit is that the complexity is N. In particular, the integrated circuit area and power consumed by the barrel shifter grows linearly with the number of requesters N.

However, the circuitry to implement a round-robin arbitration scheme in which only a variable subset of the requestors may be requesting the resource each time the resource becomes available is more complex. A conventional round-robin circuit accommodating a variable subset of requesting requesters may be implemented by a storage element storing an N-bit vector, denoted L, having one bit set corresponding to the previously selected requester and combinational logic receiving the L vector and outputting a new N-bit selection vector, denoted N, according to the following equation, where E.i indicates whether a corresponding one of the requesters is currently requesting:

---

N.i =
  ; This requestor is enabled, i.e., is requesting.
    E.i AND
  ; The requestor to the right was selected last time.
    (L.i−1 OR
  ; A requestor further to the right was selected last
  ; time AND the requestors in between are disabled.
    (~E.i−1 AND L.i−2) OR
    (~E.i−1 AND ~E.i−2 AND L.i−3) OR
    ...
  ; This requestor was selected last time,
  ; but no other requestors are enabled.
    (~E.i−1 AND ~E.i−2 AND ~E.i−3 AND .... ~E.i+1 AND L.i))

---

As may be observed from the equation above, the complexity of the conventional round-robin circuit accommodating a variable subset of disabled requestors has complexity $N^2$. Thus, as the number of requestors—such as the number of ports in a switch requesting a port to transmit out transactions—becomes relatively large, the size of the conventional circuit may become burdensome on the switch in terms of size and power consumption, particularly if more than one such circuit is needed in the switch.

Furthermore, in some applications, the requesters may have multiple priority levels; i.e., some requesting ports may have higher priority than others. It is desirable to select requesting ports fairly within each of the priority levels. That is, it is desirable for requesting ports to be chosen in a round-robin manner within each priority level independent of the order the requesting ports are chosen within the other priority levels. Furthermore, the priority levels of the various requesting ports may change dynamically over time. Therefore, what is needed is a transaction scheduler for the ports in a switch that incorporates a simple and fast round-robin apparatus and method that accommodates a variable subset of all requesting ports at a time, and which does so independent of the priority level, among multiple priority levels, at which the requesting ports are requesting transmission.

Still further, a problem that may be introduced by allowing different priorities among the requesting ports is that it may be difficult to accomplish the desired quality-of-service in terms of transaction output bandwidth. In particular, low priority requesting ports may be starved for bandwidth in favor of high priority requesting ports.

Therefore, what is needed is a switch with a customizable transaction scheduling policy architecture that allows prioritization among requestors and yet still accomplishes desired quality-of-service requirements by fairly distributing the transaction transmission bandwidth of a switch port.

BRIEF SUMMARY OF THE INVENTION

In one aspect, the present invention provides an apparatus for selecting one of N transaction queues from which to transmit a transaction out a port of a switch, each of the N transaction queues having a priority, the priority being one of P priorities. The apparatus includes P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The apparatus also includes N P-input muxes, each coupled to receive a corresponding one of the N bits of each of the P round-robin vectors, each configured to select for output one of the P inputs specified by the corresponding transaction queue priority. The apparatus also includes selection logic, coupled to receive a transaction from each of the N transaction queues and to select for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the corresponding P-input mux output, a most-significant bit that is true if the corresponding transaction is transmittable, and middle bits comprising the priority of the transaction queue.

In another aspect, the present invention provides a method for selecting one of N transaction queues from which to transmit a transaction out a port of a switch, each of the N transaction queues having a priority, the priority being one of P priorities. The method includes generating P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The method also includes for each of the N transaction queues, receiving a corresponding one of the N bits of each of the P round-robin vectors, and selecting as a round-robin bit one of the P received corresponding one of the N bits of each of the P round-robin vectors specified by the corresponding transaction queue priority. The method also includes receiving a transaction from each of the N transaction queues, and selecting for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the round-robin bit of the transaction queue, a most-significant bit that is true if the corresponding transaction of the transaction queue is transmittable, and middle bits comprising the priority of the transaction queue.

In another aspect, the present invention provides a computer program product for use with a computing device, the computer program product including a computer usable storage medium, having computer readable program code embodied in the medium, for causing an apparatus for selecting one of N transaction queues from which to transmit a transaction out a port of a switch, each of the N transaction queues having a priority, the priority being one of P priorities. The computer readable program code includes first program code for providing P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The computer readable program code also includes second program code for providing N P-input muxes, each coupled to receive a corresponding one of the N bits of each of the P round-robin vectors, each configured to select for output one of the P inputs specified by the corresponding transaction queue priority. The computer readable program code also includes third program code for providing selection logic, coupled to receive a transaction from each of the N transaction queues and to select for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the corresponding P-input mux output, a most-significant bit that is true if the corresponding transaction is transmittable, and middle bits comprising the priority of the transaction queue.

In another aspect, the present invention provides a method for providing an apparatus for selecting one of N transaction queues from which to transmit a transaction out a port of a switch, each of the N transaction queues having a priority, the priority being one of P priorities. The method includes providing computer-readable program code describing the apparatus. The program code includes first program code for providing P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The program code also includes second program code for providing N P-input muxes, each coupled to receive a corresponding one of the N bits of each of the P round-robin vectors, each configured to select for output one of the P inputs specified by the corresponding transaction queue priority. The program code also includes third program code for providing selection logic, coupled to receive a transaction from each of the N transaction queues and to select for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the corresponding P-input mux output, a most-significant bit that is true if the corresponding transaction is transmittable, and middle bits comprising the priority of the transaction queue. The method also includes transmitting the computer-readable program code as a computer data signal on a network.

In another aspect, the present invention provides a port in a switch for transmitting transactions from N transaction queues each having a priority, the priority being one of P priorities. The port includes a port interface, for transmitting the transactions to a device coupled to the port. The port also includes P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The port also includes N P-input muxes, each coupled to receive a corresponding one of the N bits of each of the P round-robin vectors, each configured to select for output one of the P inputs specified by the corresponding transaction queue priority. The port also includes selection logic, coupled to receive a transaction from each of the N transaction queues and to select for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the corresponding P-input mux output, a most-significant bit that is true if the corresponding transaction is transmittable, and middle bits comprising the priority of the transaction queue.

In another aspect, the present invention provides a switch. The switch includes a network. The switch also includes a plurality of ports, each coupled to receive transactions from other of the plurality of ports via the network. Each port includes a port interface, configured to transmit the transactions to a device coupled to the port. Each port also includes N transaction queues, configured to receive the transactions from the network, each of the N transaction queues having a priority, the priority being one of P priorities. Each port also includes a transaction selector, coupled to the port interface and the N transaction queues, configured to select for transmission transactions of the N transaction queues in a round-robin fashion within each of the P priorities independent of the other P priorities. The transaction selector includes P round-robin vectors, corresponding to the P priorities, each having N bits corresponding to the N transaction queues, each being a 1-bit left-rotated and subsequently sign-extended version of an N-bit input vector. The input vector has a single bit true corresponding to a last one of the N transaction queues selected for transmitting out the port at a corresponding one of the P priorities. The transaction selector also includes N P-input muxes, each coupled to receive a corresponding one of the N bits of each of the P round-robin vectors, each configured to select for output one of the P inputs specified by the corresponding transaction queue priority. The transaction selector also includes selection logic, coupled to receive a transaction from each of the N transaction queues and to select for transmitting out the port one of the N transactions corresponding to one of the N transaction queues having a transmit value greater than or equal to any of the N transaction queues left thereof in the N-bit input vectors. The transmit value of each of the N transaction queues comprises a least-significant bit equal to the corresponding P-input mux output, a most-significant bit that is true if the corresponding transaction is transmittable, and middle bits comprising the priority of the transaction queue.

BRIEF DESCRIPTION OF THE DRAWINGS

FIGS. 9A and 9B are block diagrams illustrating examples of operation of the transaction scheduler employing the round-robin generators of FIG. 6 according the present invention.

FIG. 10 is a block diagram illustrating the transaction scheduler of FIG. 3 including round-robin logic of FIG. 4 according to an alternate embodiment of the present invention.

FIG. 11 is a block diagram illustrating the round-robin generator of FIG. 10 according to one embodiment of the present invention.

FIGS. 12A through 12D are block diagrams illustrating examples of operation of the transaction scheduler having round-robin generators of FIG. 10 according the present invention.

FIG. 16 is a block diagram illustrating the transaction selector within the switch of FIG. 1 according to an alternate embodiment of the present invention in which the transaction selector 108 is bifurcated.

FIG. 23 is a block diagram illustrating a second example of logic for generating the PM_group_priority signals within a policy manager of FIG. 16 according to the present invention.

FIG. 24 is a table illustrating operation of the logic of FIG. 23 in an example transaction queue configuration of the switch of FIG. 1 according to the present invention.

DETAILED DESCRIPTION

Figure 1:
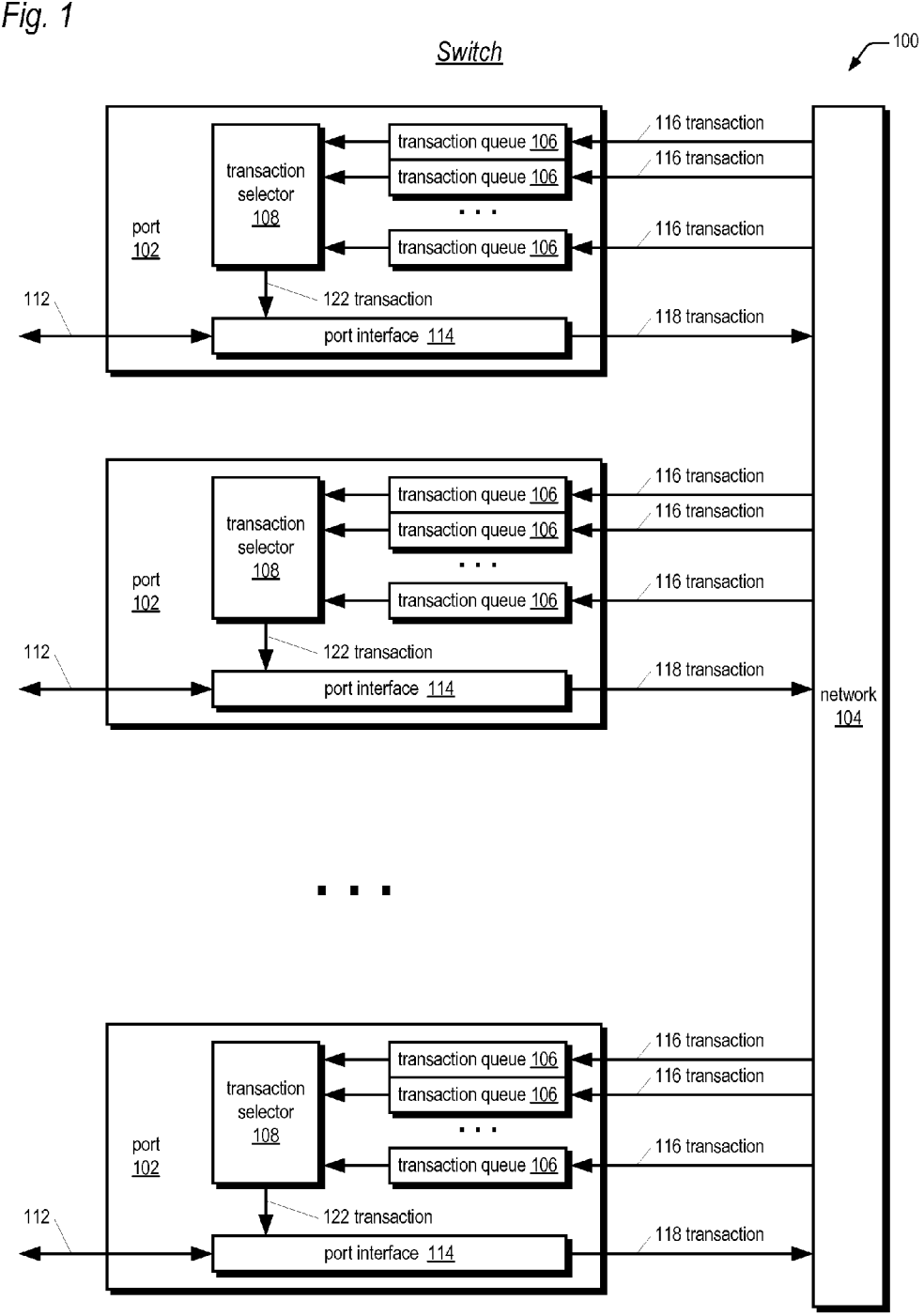
FIG. 1 is a block diagram illustrating a switch according to the present invention.

Referring now to FIG. 1, a block diagram illustrating a switch 100 according to the present invention is shown. The switch 100 includes a plurality of ports 102 each coupled to a network 104. Each port 102 includes a plurality of transaction queues 106 (also referred to herein as a "Q") that receive transactions 116 from the network 104. Each port 102 also includes a transaction selector 108 coupled to receive transactions from the transaction queues 106. Each port 102 also includes a port interface 114 that receives a transaction 122 from the transaction selector 108. The transaction selector 108 periodically selects a transaction from one of the transaction queues 106 to provide to the port interface 114 according to one of various embodiments as described herein. The port interface 114 transmits the received transaction 122 on a bus 112 to a device coupled by the bus 112 to the port 102. The port interface 114 also receives transactions on the bus 112 from the device coupled to the port 102 and forwards the transactions 118 to the network 104.

The network 104 switches the transactions 118 from the source ports 102 of the switch 100 to the appropriate transaction queue 106 of the appropriate destination port 102 based on the destination of the transaction 118. The network 104 includes connection paths for connecting the port interface 114 of the source ports 102 to the transaction queue 106 of the destination ports 102. A source port 102 denotes a port 102 that transmits a transaction to the network 104, and a destination port 102 denotes a port 102 that receives a transaction from the network 104. Hence, each port 102 may be both a source and a destination port 102. Thus, each transaction queue 106 in a given destination port 102 stores transactions transmitted through the network 104 by only one of the other source ports 102 in the switch 100. That is, each source port 102 for which the network 104 includes a connection path to a destination port 102 has a corresponding transaction queue 106 in the destination port 102 for storing the transactions transmitted by the source port 102 through the network 104. In one embodiment, there is a one-to-one relationship between the transaction queues 106 of a destination port 102 and the source ports 102 of the switch 100. In one embodiment, there may be some source ports 102 of the switch 100 that do not transmit transactions to all of the other ports 102 in the switch 100. In one embodiment, the network 104 may include multiple connection paths between a source port 102 and a destination port 102, in which case the destination port 102 includes multiple transaction queues 106 associated with the multiple connection paths for storing the transactions received from the source port 102. In one embodiment, the network 104 comprises a cross-bar type network. However, other types of networks 104 for switching transactions between the various ports 102 are contemplated.

Each transaction queue 106 in a port 102 has an associated priority for being selected to have its transactions transmitted to the port interface 114. Advantageously, the transaction selector 108 may dynamically vary the priorities of the transaction queues 106 as described herein as needed by a given application in which the switch 100 is employed. In particular, the transaction selector 108 may vary the priorities to avoid a given source port 102 from being starved from having its transactions transmitted to the port interface 114. Furthermore, the transaction selector 108 may vary the priorities to guarantee a specified minimum amount of bandwidth, or quality-of-service, to each of the source ports 102, as described herein.

Advantageously, the transaction selector 108 for each port 102 of the switch 100 may be uniquely tailored to accommodate the particular characteristics of the port 102, such as particular quality-of-service requirements of the port 102. Advantageously, embodiments of the transaction selector 108 are described that not only provide a high degree of control of the arbitration between the various transaction queues 106, but do so in a low latency manner. Furthermore, the transaction selectors 108 are relatively small, and grow in size on the order of N, where N is the number of transaction queues 106 that must be selected from. This is important in applications in which the number of ports 102 on the switch 100 becomes relatively large. For example, the switch 100 may be employed in a system-on-chip (SOC) embodiment that includes a processor core, one or more memories, and multiple application blocks.

A transaction may include a command, or data, or both a command and data. For example, a transaction may include a command to write a specified amount of data from a source port 102 to a destination port 102. In the case of a write command, the transaction may include all or part of the data to be written. If the transaction including the write command does not include all the data to be written, then subsequent transactions from the source port 102 to the destination port 102 may include the remaining data. For another example, a transaction may include a command to read a specified amount of data from the destination port 102 to the source port 102. In the case of a read command, subsequent transactions sent from the port 102 that received the read command to the port that sent the read command will include the requested data.

Figure 13:
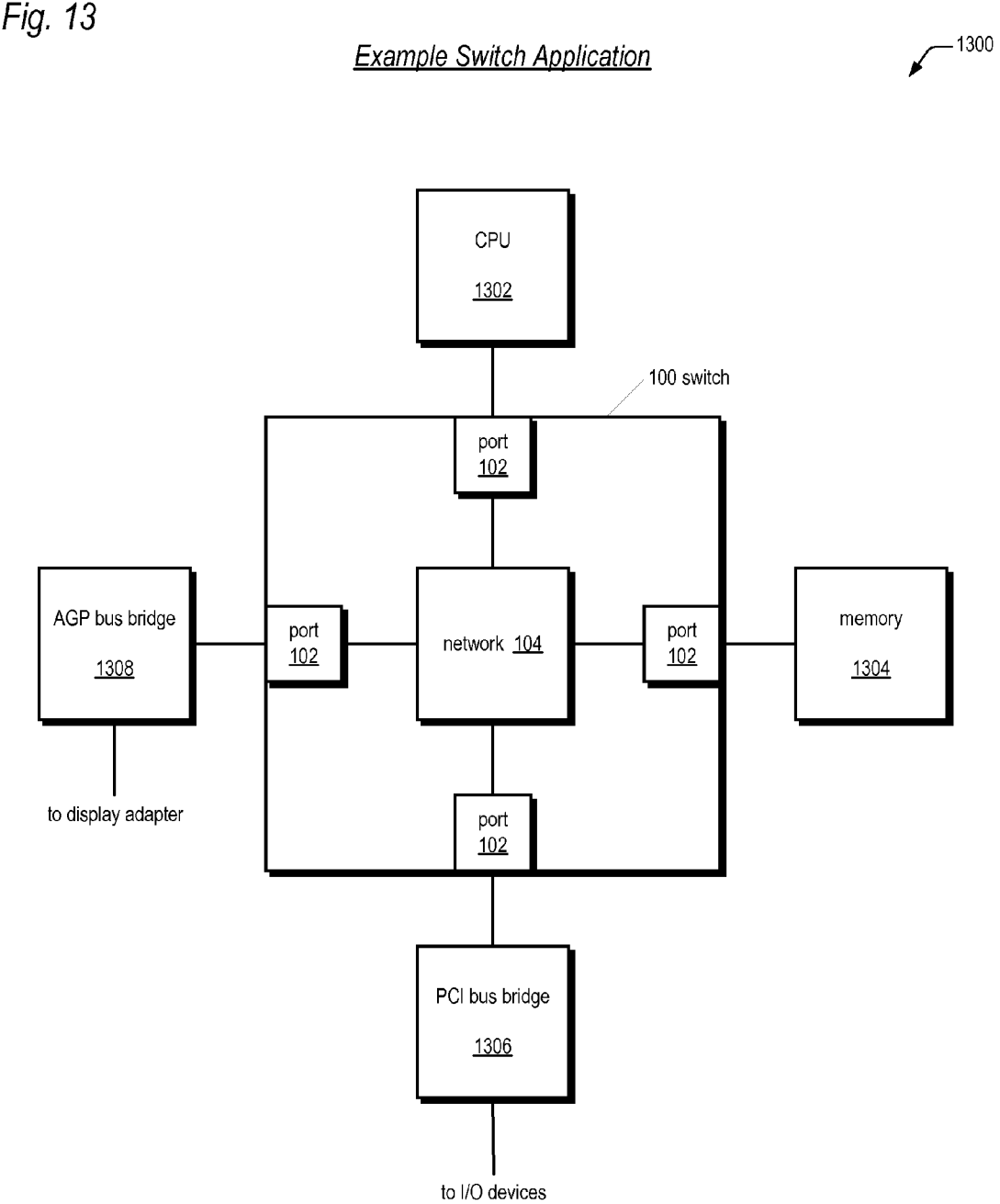
FIG. 13 is a block diagram of an example application system for use of the switch of FIG. 1 according to the present invention.

Using the system 1300 of FIG. 13 as an example, the CPU 1302 may send a transaction to its port 102 that includes a write command to write data to the memory 1304. The write command transaction includes the data to be written. The CPU 1302 port 102 port interface 114 provides the transaction to the network 104, which switches the transaction to a transaction queue 106 in the memory 1304 port 102 associated with the CPU 1302 port 102. Eventually, the transaction selector 108 in the memory 1304 port 102 selects the transaction queue 106 in the memory 1304 port 102 associated with the CPU 1302 port 102 and transmits the transaction via the port interface 114 to the memory 1304, which writes the data to the location in the memory 1304 specified in the transaction. Similarly, the CPU 1302 may send a write transaction to the PCI bus bridge 1306 that includes data, for example, to perform a programmed-I/O or memory-mapped I/O operation to read or write control and status registers of an I/O device coupled to the PCI bus bridge 1306. Still further, the PCI bus bridge 1306 may send a write transaction on behalf of the I/O device to the CPU 1302 to perform a DMA operation, for example.

Using the system 1300 of FIG. 13 again as an example, the CPU 1302 may send a transaction to its port 102 that includes a read command to read data from the memory 1304. The transaction is switched through the network 104 to the transaction queue 106 in the memory 1304 port 102 associated with the CPU 1302. When the memory 1304 receives the transaction, it fetches the data from the location specified in the transaction and then sends a transaction to its port 102 that includes the requested data. The transaction including the read data is switched through the network 104 to the CPU 1302 port 102 and eventually transmitted to the CPU 1302. Similarly, the AGP bus bridge 1308 may send a read transaction to the memory 1304, for example, to read video data from the memory 1304 for provision to a display adapter coupled to the AGP bus bridge 1308.

Figure 2:
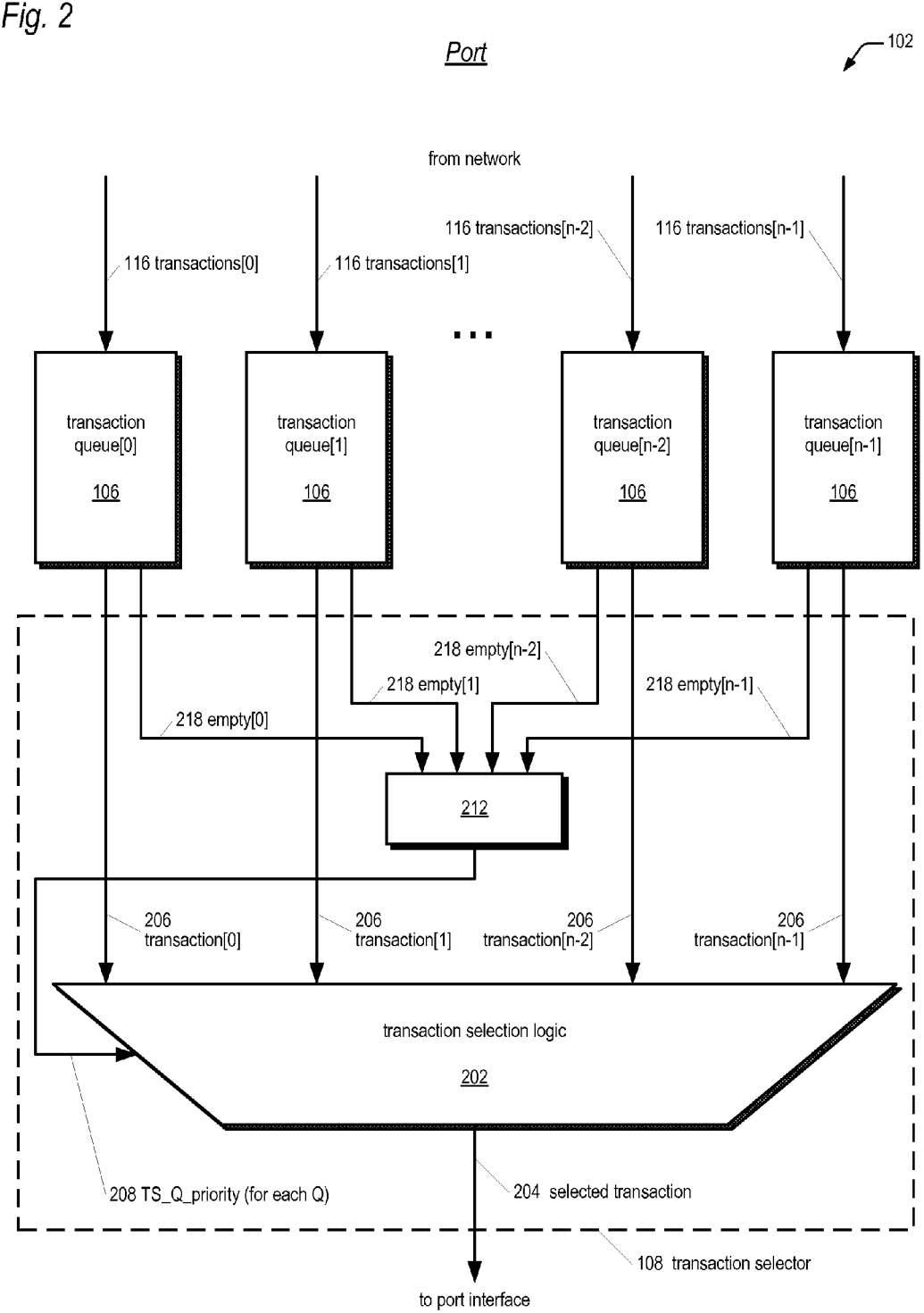
FIG. 2 is a block diagram illustrating a representative port of the switch of FIG. 1 according to the present invention.

Referring now to FIG. 2, a block diagram illustrating a representative port 102 of the switch 100 of FIG. 1 according to the present invention is shown. FIG. 2 illustrates the plurality of transaction queues 106 of FIG. 1 into which the network 104 writes transactions 116. Each transaction queue 106 provides a transaction 206 at the bottom of the transaction queue 106 to transaction selection logic 202 of the transaction selector 108 of FIG. 1 of the port 102. The transaction selection logic 202 selects one of the transactions 206 as selected transaction 204 for provision to the port selector 114 to be transmitted out of the port 102. The transaction selection logic 202 selects the selected transaction 204 in response to a TS_Q_priority signal 208 provided by logic 212 of the transaction selector 108 of FIG. 1 for each transaction queue 106. The logic 212 and operation of the TS_Q_priority signal 208 is described in more detail below with respect to FIGS. 4 and 5. Each of the transaction queues 106 provides an empty signal 218 to the logic 212 to indicate whether the transaction queue 106 is empty so that the transaction selector 108 will not attempt to read another transaction from the transaction queue 106 until the transaction queue 106 is no longer empty. In one embodiment, each transaction queue 106 also provides a full signal to the network 104 to indicate that it is full of transactions.

Figure 3:
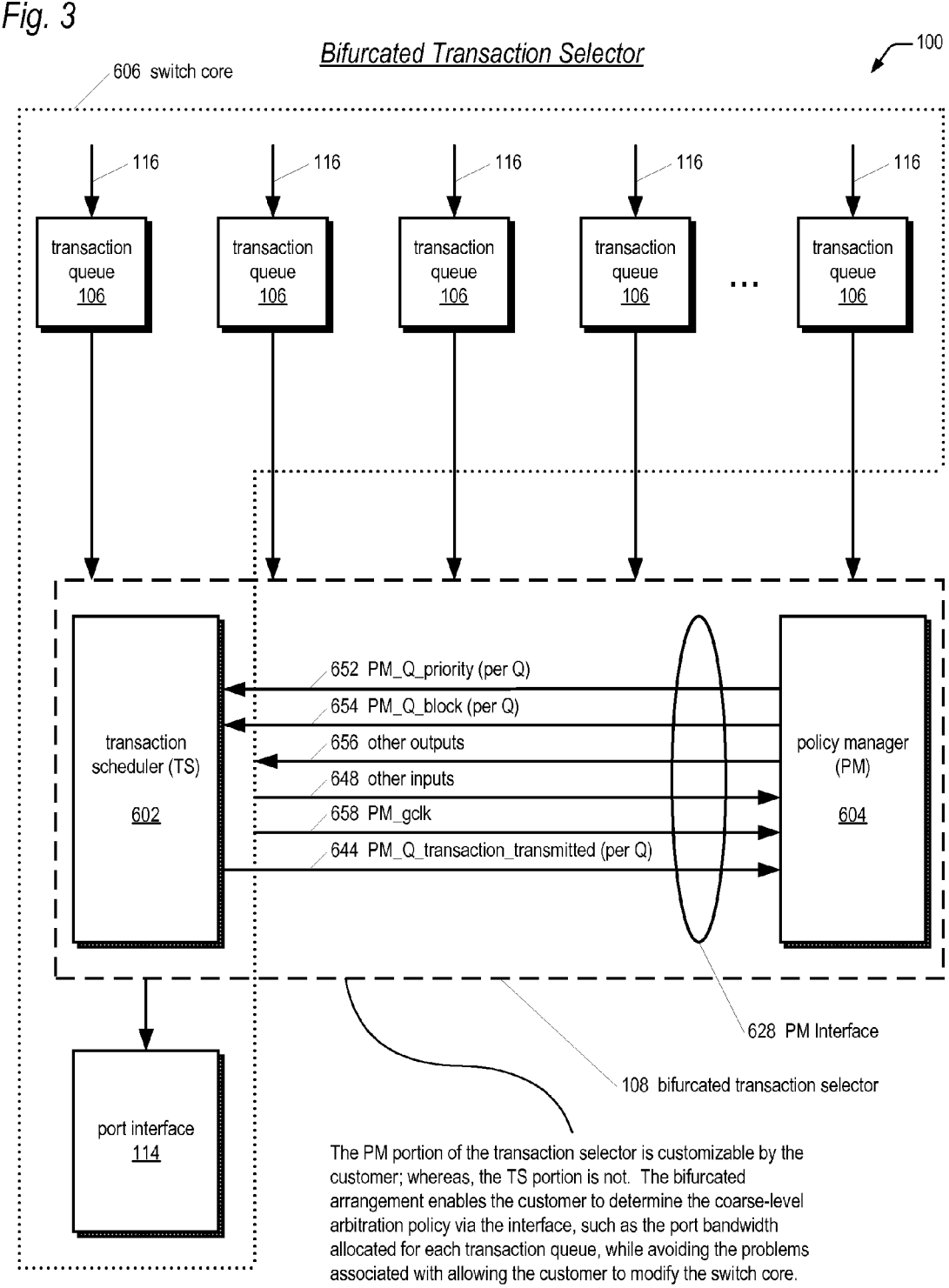
FIG. 3 is a block diagram illustrating the transaction selector within the switch of FIG. 1 according to one embodiment of the present invention in which the transaction selector is bifurcated.

Referring now to FIG. 3, a block diagram illustrating the transaction selector 108 within the switch 100 of FIG. 1 according to one embodiment of the present invention in which the transaction selector 108 is bifurcated is shown. The bifurcated transaction selector 108 comprises a transaction scheduler (TS) 602 portion and a policy manager (PM) 604 portion. The transaction scheduler 602 portion is comprised within a switch core 606 of switch 100; whereas, the policy manager 604 portion is comprised outside of the switch core 606. The switch core 606 is the portion of the switch 100 that is not customizable by the customer; whereas, the policy manager 604 is customizable by the customer. In one embodiment, the switch core 606 is a synthesizable core, also referred to as a soft core. The design of a synthesizable core is capable of being reduced to a manufacturable representation quickly and easily using automated tools, commonly referred to as synthesis tools.

The switch core 606 provides an interface 628 to the policy manager 604 comprising a plurality of signals. In one embodiment, the inputs to the transaction scheduler 602 and output signals from the transaction scheduler 602 are registered, to advantageously enable the non-core policy manager 604 logic to interface with the switch core 606 in a manner that alleviates certain timing problems that might be otherwise introduced by a bifurcated scheduler. Furthermore, the interface 628 is easy for the customer to understand, which eases the design of the policy manager 604 scheduling policy.

In Table 1 below, the various signals comprising the policy manager interface 628 according to one embodiment are shown. Table 1 specifies the signal name, the direction of the signal relative to the policy manager 604, and a brief description of each signal. Table 1 describes an embodiment in which the switch 100 includes nine transaction queues 106. Several of the signals described in Table 1 may be used by a device external to the policy manager 604, such as a CPU, to read and write control registers that may be present in the policy manager 604. For example, FIGS. 14 and 15 describe an embodiment in which the policy manager 604 includes a QSchedule Register 902 that may be read and written to accomplish an exemplary transaction transmission, or scheduling, policy by a port 102. However, it should be understood that a policy manager 604 for a given port 102 may or may not comprise control registers, depending upon the transaction scheduling policy required for the particular port 102.

TABLE 1

| Signal Name | Direction | Description |
| --- | --- | --- |
| PM_gclk | Input | Switch clock |
| PM_gfclk | Input | Free running switch clock |
| PM_greset | Input | Global Reset |
| PM_scanenable | Input | Global Scan Enable. |
| PM_rd_reg | Input | Register number for reads |
| PM_rd | Input | Read strobe |
| PM_rdata | Output | Read data |
| PM_wr_reg | Input | Register number for writes |
| PM_wr | Input | Write strobe |
| PM_wdata | Input | Write data |
| PM_Q_transaction_transmitted[8:0] | Input | A transaction was transmitted for the specified transaction queue. |
| PM_Q_priority_0[1:0] | Output | Priority of transaction queue 0. |
| PM_Q_priority_1[1:0] | Output | Priority of transaction queue 1. |
| PM_Q_priority_2[1:0] | Output | Priority of transaction queue 2. |
| PM_Q_priority_3[1:0] | Output | Priority of transaction queue 3. |
| PM_Q_priority_4[1:0] | Output | Priority of transaction queue 4. |
| PM_Q_priority_5[1:0] | Output | Priority of transaction queue 5. |
| PM_Q_priority_6[1:0] | Output | Priority of transaction queue 6. |
| PM_Q_priority_7[1:0] | Output | Priority of transaction queue 7. |
| PM_Q_priority_8[1:0] | Output | Priority of transaction queue 8. |
| PM_Q_block[8:0] | Output | Prevent the transaction scheduler from transmitting transactions for specified transaction queues. |

Some of the particular signals of the policy manager interface 628 specified in Table 1 will now be described in more detail. The policy manager 604 specifies to the transaction scheduler 602 the priority of the respective transaction queue 106 via the PM_Q_priority 652 output. In one embodiment, the PM_Q_priority 652 comprises two bits and the transaction scheduler 602 allows the policy manager 604 to specify one of four different priorities for a transaction queue 106. The policy manager 604 instructs the transaction scheduler 602 to stop transmitting transactions for a transaction queue 106 by generating a true value on the respective PM_Q_block 654 output. Thus, the policy manager 604 may affect how the transaction scheduler 602 transmits transactions for the various transaction queues 106 via the PM_Q_priority 652 and PM_Q_block 654 outputs, as described in more detail below, particularly with respect to FIGS. 4 and 5 below.

The switch core 606 provides the PM_gclk 658 to the policy manager 604, which enables the policy manager 604 to adjust the PM_Q_priority 652 periodically based on the PM_gclk 658, as described below.

The transaction scheduler 602 communicates to the policy manager 604 that it has transmitted a transaction for a transaction queue 106 via a respective PM_Q_transaction_transmitted 644 input. Thus, the switch core 606 provides feedback about the transmission of transactions for the various transaction queues 106 via the PM_Q_transaction_transmitted 644 inputs, as described in more detail below, particularly with respect to FIGS. 4 and 5 below. In one embodiment, the transaction scheduler 602 is capable of removing a transaction from a transaction queue 106 in a single clock cycle. In one embodiment, the port interface 114 may take multiple clock cycles to transmit the transaction to the device coupled to the port 102, depending upon the type of bus interface between the port 102 and the device. In one embodiment, if the transaction is transmitted in a burst as N sets of data over N clock cycles, the transaction scheduler 602 communicates to the policy manager 604 that it has transmitted N transactions for a transaction queue 106 via the respective PM_Q_transaction_transmitted 644 input.

Figure 4:
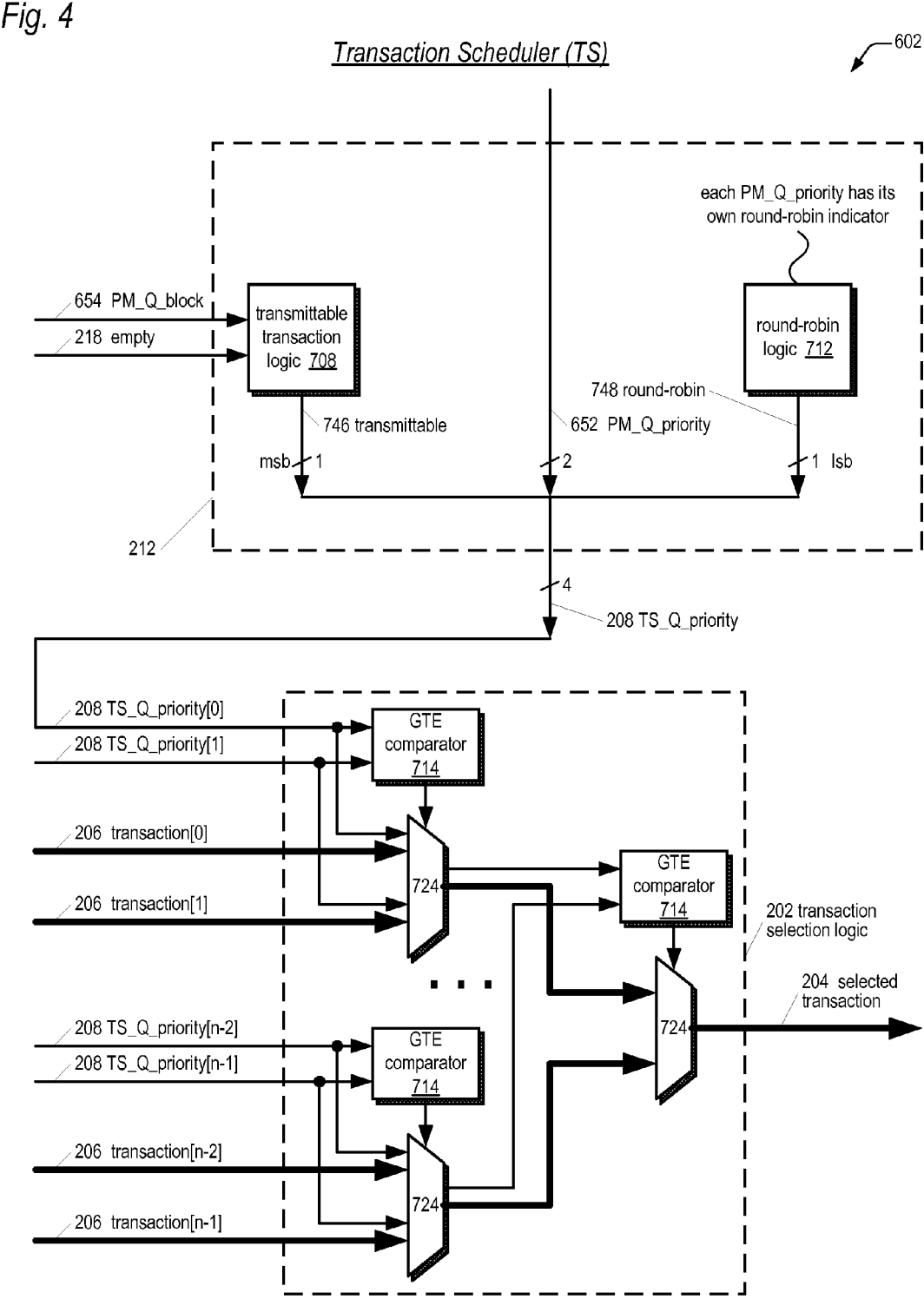
FIG. 4 is a block diagram illustrating in more detail the transaction scheduler of FIG. 3 and the transaction selection logic of FIG. 2 according to the present invention.

Referring now to FIG. 4, a block diagram illustrating in more detail the transaction scheduler 602 of FIG. 3 and the transaction selection logic 202 of FIG. 2 according to the present invention is shown. The transaction selection logic 202 includes a tree of muxes 724 controlled by comparators 714. In some of the embodiments discussed herein the comparators 714 are greater-than-equal (GTE) comparators. Each mux 724 receives a transaction 206 of FIG. 2 from two different transaction queues 106. Each mux 724 also receives the transaction's 206 associated TS_Q_priority 208 of FIG. 2. The comparator 714 associated with each mux 724 also receives the pair of TS_Q_priority 208 signals for the two transaction queues 106 and controls its associated mux 724 to select the transaction 206 and TS_Q_priority 208 with the highest TS_Q_priority 208 value. The selected transactions 206 and TS_Q_priorities 208 propagate down the tree until the final mux 724 selects the selected transaction 204 of FIG. 2 with the highest TS_Q_priority 208 for provision to the transmission pipeline.

FIG. 4 shows logic 212 of the transaction scheduler 602, namely transmittable transaction logic 708 and round-robin logic 712. In one embodiment, the transmittable transaction logic 708 is replicated within the transaction scheduler 602 for each transaction queue 106 of the port 102 to generate a TS_Q_priority 208 for each transaction queue 106. In contrast, the round-robin logic 712 is instantiated once for each possible PM_Q_priority 652 and generates a round-robin indicator for each PM_Q_priority 652. For example, FIG. 4 illustrates an embodiment in which the policy manager 604 may specify one of four possible PM_Q_priorities 652; hence, the round-robin logic 712 is instantiated four times in the transaction scheduler 602 and generates four respective round-robin indicators.

In one embodiment, the round-robin indicator includes one bit per transaction queue 106 of the switch 100. The bit of the round-robin indicator associated with its respective transaction queue 106 is provided as round-robin bit 748 as shown in FIG. 4. If the round-robin bit 748 is true, then it is the transaction queue's 106 turn in the round-robin scheme to be transmitted among the other transaction queues 106 that are currently at the same PM_Q_priority 652.

The transmittable transaction logic 708 receives the PM_Q_block 654 signal from the policy manager 604 of FIG. 3 and the empty signal 218 of FIG. 2 from the transaction queue 106. The transmittable transaction logic 708 generates a transmittable 746 signal in response to its inputs. The transmittable 746 signal is true if the transaction 206 at the bottom of the transaction queue 106 for the transaction queue 106 is transmittable. In one embodiment, a transaction is transmittable if the PM_Q_block 654 and empty 218 signals are false.

The transmittable 746 bit, the PM_Q_priority 652 bits, and the round-robin bit 748 are combined to create the TS_Q_priority 208. In the embodiment of FIG. 4, the transmittable 746 bit is the most significant bit, the round-robin bit 748 is the least significant bit, and the PM_Q_priority 652 is the two middle significant bits. As may be observed, because the transmittable bit 746 is the most significant bit of the TS_Q_priority 652, a non-transmittable transaction will be lower priority than all transmittable transactions. Conversely, the round-robin bit 748 is only used to select a transaction queue 106 if more than one transaction queue 106 has a transmittable transaction and has the same highest PM_Q_priority 652.

Figure 5:
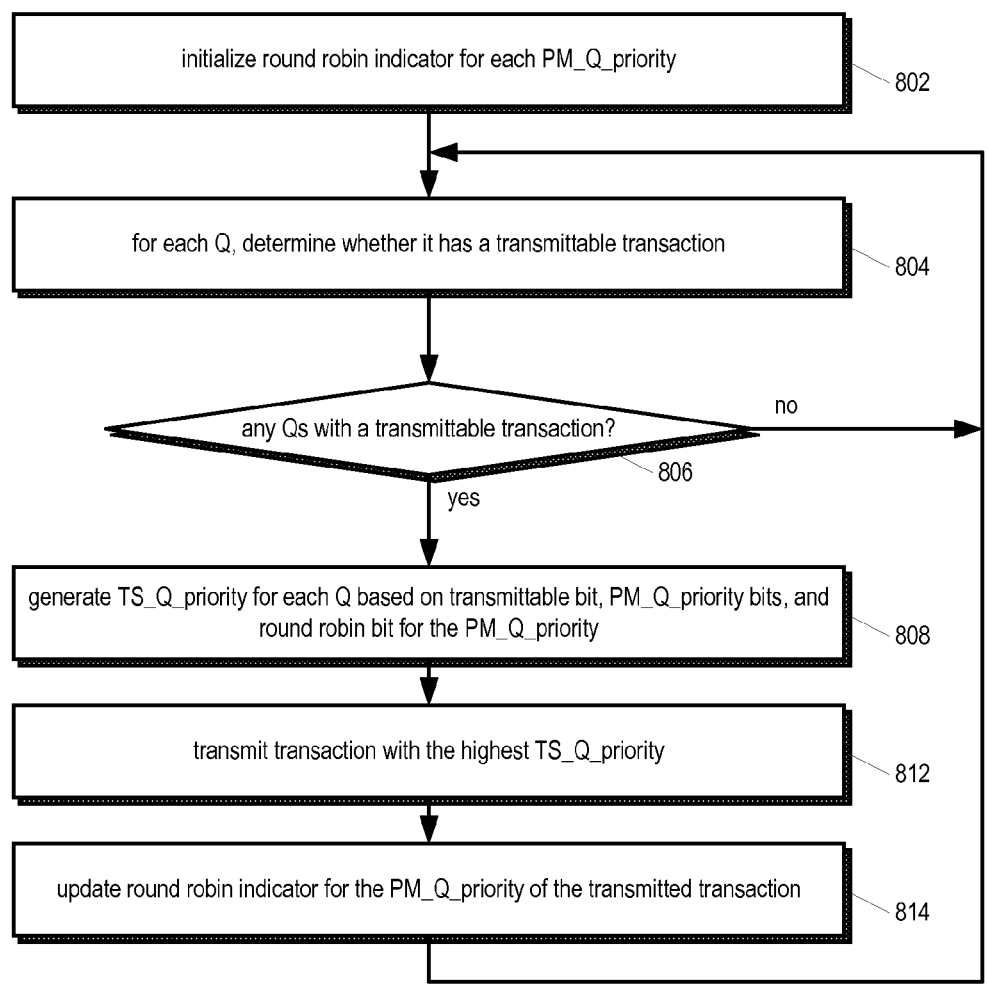
FIG. 5 is a flowchart illustrating operation of the transaction scheduler of FIG. 4 according to the present invention.

Referring now to FIG. 5, a flowchart illustrating operation of the transaction scheduler 602 of FIG. 4 according to the present invention is shown. Flow begins at block 802.

At block 802, the transaction scheduler 602 initializes each round-robin indicator for each PM_Q_priority 652. Flow proceeds to block 804.

At block 804, the transaction scheduler 602 determines, for each transaction queue 106, whether the transaction queue 106 has a transmittable transaction 206. That is, the transmittable transaction logic 708 for each transaction queue 106 generates a value on the transmittable 746 signal. In one embodiment, the transmittable transaction logic 708 generates a true signal on the transmittable 746 signal only if the PM_Q_block 654 and empty 218 signals are false. Flow proceeds to decision block 806.

At decision block 806, the transaction scheduler 602 determines, by examining the transmittable 746 signal for each of the transaction queues 106, whether there are any transaction queues 106 that have a transmittable transaction 206. If not, flow returns to block 804 until at least one transaction queue 106 has a transmittable transaction 206; otherwise, flow proceeds to block 808.

At block 808, the transaction scheduler 602 generates the TS_Q_priority 208 for the transaction 206 of each transaction queue 106 based on the transmittable 746 bit of the transaction queue 106, the PM_Q_priority 652 of the transaction queue 106, and the round-robin bit 748 of the PM_Q_priority 652 of the transaction queue 106. Flow proceeds to block 812.

At block 812, the transaction scheduler 602 transmits the transaction 206 with the highest TS_Q_priority 208. In other words, the transaction scheduler 602 transmits the transaction from the transaction queue 106 that has a transmittable transaction and has the highest PM_Q_priority 652; if multiple transaction queues 106 have a transmittable transaction and have the highest PM_Q_priority 652, the transaction scheduler 602 transmits the transaction from the transaction queue 106 whose turn it is to transmit as indicated by the round-robin bit 748 for the PM_Q_priority 652 of the transaction queues 106. Flow proceeds to block 814.

At block 814, the round-robin logic 712 updates the round-robin indicator for the PM_Q_priority 652 based on which of the transaction queues 106 was selected to have its transaction transmitted. Flow returns to block 804.

Figure 6A:
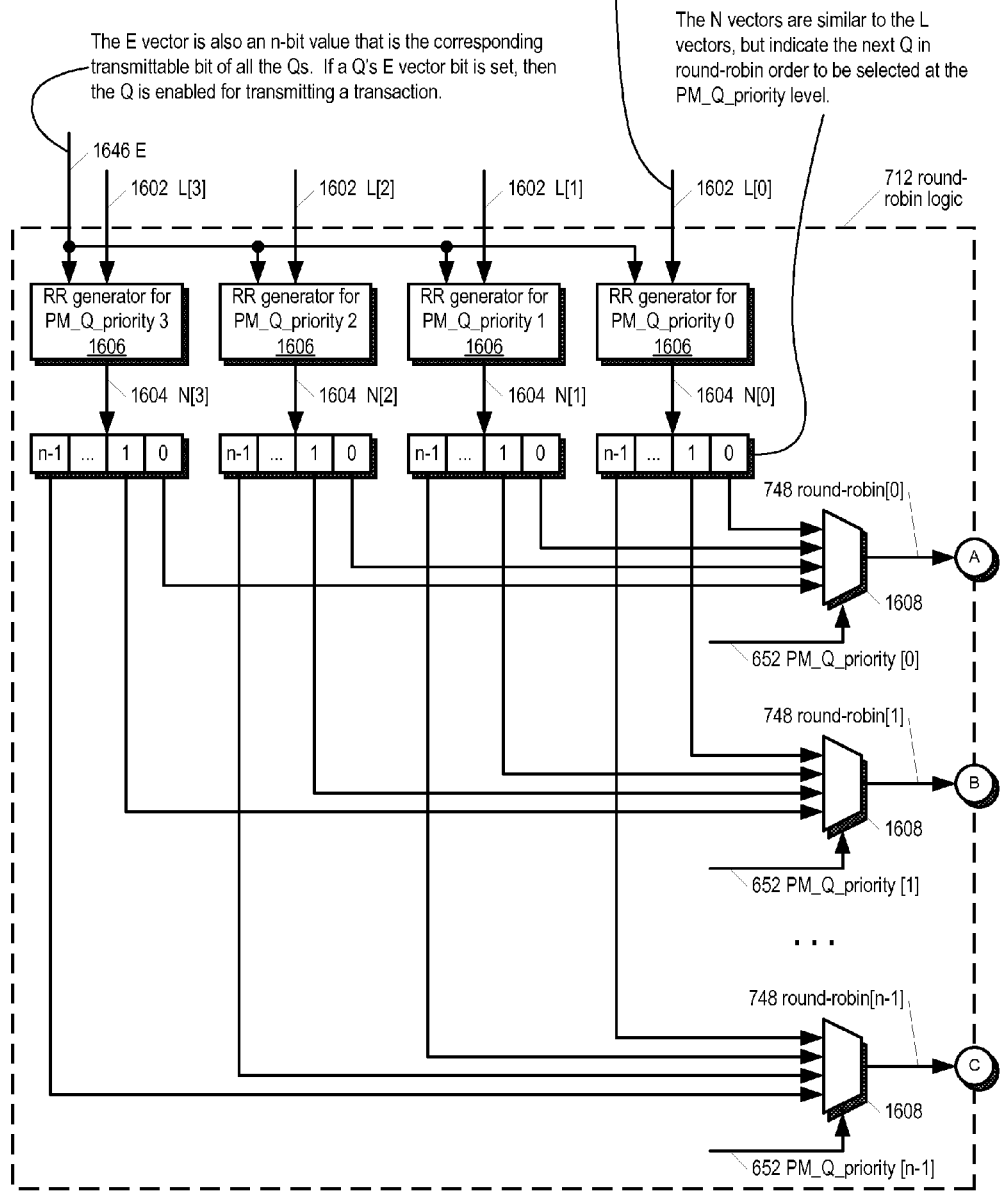
FIGS. 6A and 6B are a block diagram illustrating the transaction scheduler of FIG. 3 including round-robin logic of FIG. 4 according to one embodiment of the present invention.
Figure 6B:
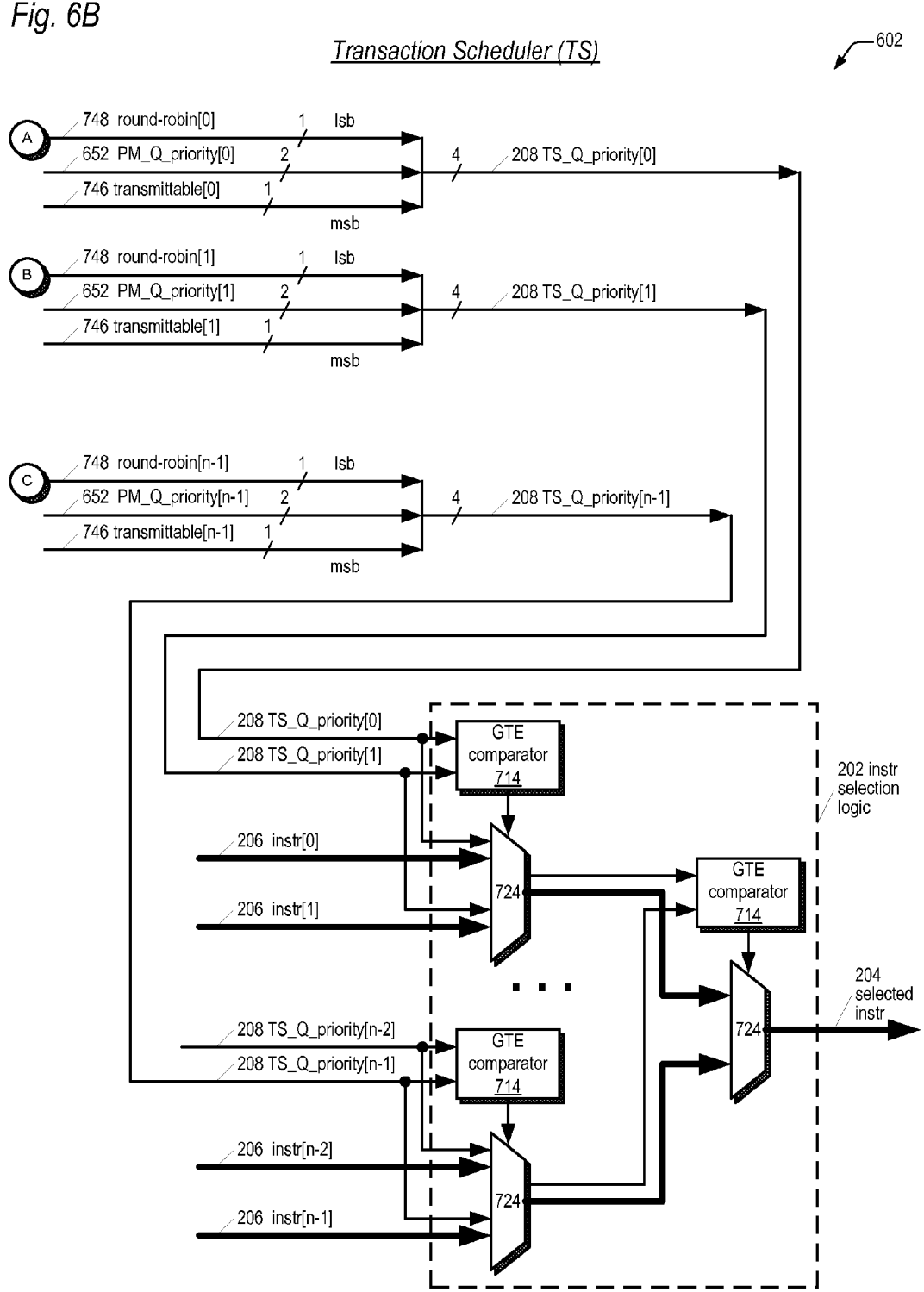

Referring now to FIG. 6, a block diagram illustrating the transaction scheduler 602 of FIG. 3 including round-robin logic 712 of FIG. 4 according to one embodiment of the present invention is shown. FIG. 6 comprises FIGS. 6A and 6B.

FIG. 6A illustrates the round-robin logic 712 of FIG. 4 according to one embodiment of the present invention. The round-robin logic 712 includes four round-robin generators 1606: one for each of the four PM_Q_priority levels 652. Each of the round-robin generators 1606 receives an E vector 1646. The E vector 1646 is an n-bit vector, where n is the number of transaction queues 106 and each of the transaction queues 106 has a corresponding bit in the E vector 1646. A set bit in the E vector 1646 indicates that the corresponding transaction queue 106 is enabled for transaction transmitting. In one embodiment, the E vector 1646 bits are the transmittable bits 746 of FIG. 4.

Each of the round-robin generators 1606 also receives an L vector 1602 that is unique to the corresponding PM_Q_priority 652. That is, there is an L vector 1602 for each of the four PM_Q_priority 652 levels. The L vectors 1602 are also n-bit vectors, where n is the number of transaction queues 106 and each of the transaction queues 106 has a corresponding bit in each of the four L vectors 1602. A set bit in an L vector 1602 indicates that the corresponding transaction queue 106 was the last transaction queue 106 at the corresponding PM_Q_priority 652 actually selected for transaction transmitting by the transaction scheduler 602. Thus, for example, if the number of transaction queues 106 is eight, an L vector 1602 value of 00000100 for PM_Q_priority 652 level 1 indicates transaction queue 2 106 was the last transaction queue 106 transmitted at PM_Q_priority 652 level 1. In one embodiment, the L vector 1602 is generated by the transaction selection logic 202 and stored for provision to the round-robin logic 712. In one embodiment, each L vector 1602 is updated only when the transaction scheduler 602 selects for transmission a transaction from a transaction queue 106 at the corresponding PM_Q_priority 652. Thus, advantageously, the L vector 1602 is maintained for each PM_Q_priority 652 level so that round-robin fairness is accomplished at each PM_Q_priority 652 level independent of the other PM_Q_priority 652 levels.

Each of the round-robin generators 1606 generates an N vector 1604 that is unique to the corresponding PM_Q_priority 652. The N vectors 1604 are also n-bit vectors, where n is the number of transaction queues 106 and each of the transaction queues 106 has a corresponding bit in each of the four N vectors 1604. A set bit in an N vector 1604 indicates that the corresponding transaction queue 106 is the next transaction queue 106 in round-robin order to be selected at the corresponding PM_Q_priority 652.

The round-robin logic 712 includes n four-input muxes 1608: one for each of the n transaction queues 106. Each mux 1608 receives its corresponding bit from each of the four N vectors 1604. That is, the mux 1608 for transaction queue 0 106 receives bit 0 from each of the N vectors 1604; the mux 1608 for transaction queue 1 106 receives bit 1 from each of the N vectors 1604; and so forth, to the mux 1608 for transaction queue 106 n−1 that receives bit n−1 from each of the N vectors 1604. Each mux 1608 also receives as a select control input the PM_Q_priority 652 value for its respective transaction queue 106. Each of the muxes 1608 selects the input specified by the PM_Q_priority 652 value. The output of each of the muxes 1608 is the corresponding round-robin bit 748 of FIG. 4. The round-robin bits 748 are provided to the selection logic 202 of FIG. 6B.

Referring now to FIG. 6B, the round-robin bit 748 of each transaction queue 106 is combined with its corresponding PM_Q_priority 652 bits and transmittable bit 746 to form its corresponding TS_Q_priority 208 of FIG. 4. FIG. 6B also includes the selection logic 202 of FIG. 4. In one embodiment, the comparators 714 of FIG. 4 are greater-than-or-equal (GTE) comparators. That is, the GTE comparators 714 compare the two TS_Q_priority 208 input values and if the top value is greater-than-or-equal to the bottom value, the GTE comparator 714 outputs a control signal to cause its respective mux 724 to select the top value. The selection logic 202 is configured such that the top value always corresponds to a lower enumerated transaction queue 106, i.e., a transaction queue 106 which has a bit in the L vectors 1602, N vectors 1604, and E vector 1646 that is more to the right, i.e., a less significant bit, than the bottom value. Thus, for example, in FIG. 6B, one of the comparators 714 receives the TS_Q_priority 208 for transaction queue 0 106 and transaction queue 1 106; if the TS_Q_priority 208 for transaction queue 0 106 is greater than or equal to the TS_Q_priority 208 for transaction queue 1 106, then the comparator 714 will control its mux 724 to select the transaction 206 and TS_Q_priority 208 for transaction queue 0 106; otherwise (i.e., only if the TS_Q_priority 208 for transaction queue 0 106 is less than the TS_Q_priority 208 for transaction queue 1 106), the comparator 714 will control its mux 724 to select the transaction 206 and TS_Q_priority 208 for transaction queue 1 106.

Figure 7:
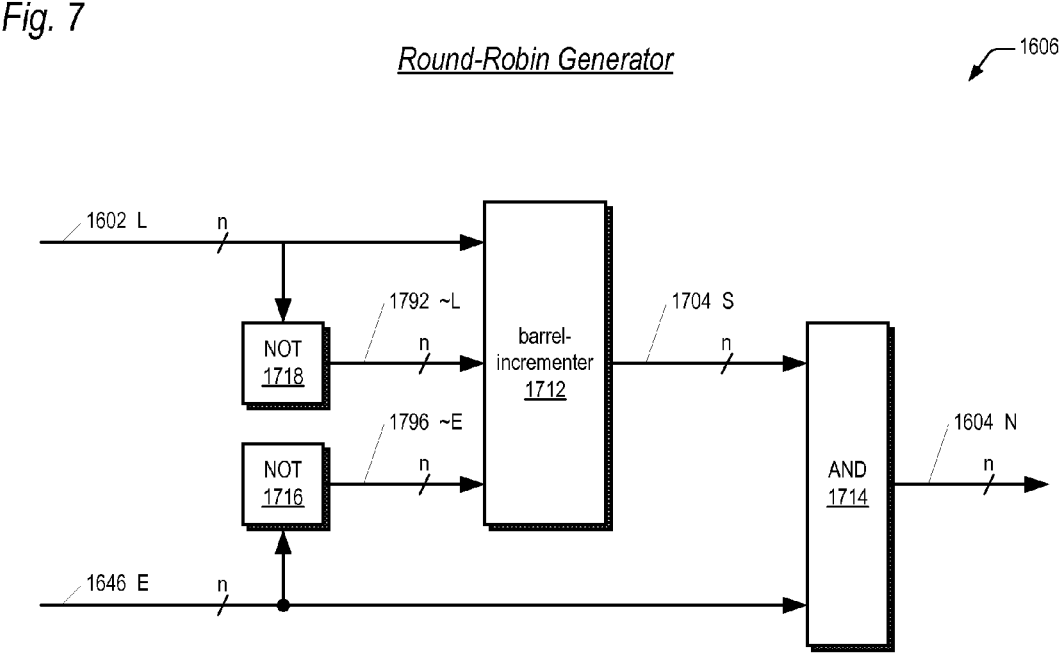
FIG. 7 is a block diagram illustrating a round-robin generator of FIG. 6 according to one embodiment of the present invention.

Referring now to FIG. 7, a block diagram illustrating a round-robin generator 1606 of FIG. 6 according to one embodiment of the present invention is shown. Although only one round-robin generator 1606 is shown in FIG. 7, the transaction scheduler 602 comprises one round-robin generator 1606 for each PM_Q_priority 652, as shown in FIG. 6A.

The round-robin generator 1606 includes a first set of inverters 1718 that receive the L vector 1602 of FIG. 6 and generate an n-bit ~L vector 1792. The round-robin generator 1606 also includes a second set of inverters 1716 that receive the E vector 1646 of FIG. 6 and generate an n-bit ~E vector 1796.

The round-robin generator 1606 also includes a barrel-incrementer 1712 that receives the L vector 1602, the ~L vector 1792, and the ~E vector 1796. The barrel-incrementer 1712 generates an S vector 1704, which is the sum of the L vector 1602 rotated left 1-bit and the Boolean AND of the ~E vector 1796 and the ~L vector 1792, according to two embodiments, as described in more detail below with respect to FIGS. 8A and 8B. In two other embodiments, the barrel-incrementer 1712 generates an S vector 1704, which is the sum of the L vector 1602 rotated left 1-bit and the ~E vector 1796, as described in more detail below with respect to FIGS. 8C and 8D.

The round-robin generator 1606 also includes a set of AND gates 1714 that perform the Boolean AND of the S vector 1704 and the E vector 1646 to generate the N vector 1604 of FIG. 6.

Figure 8A:
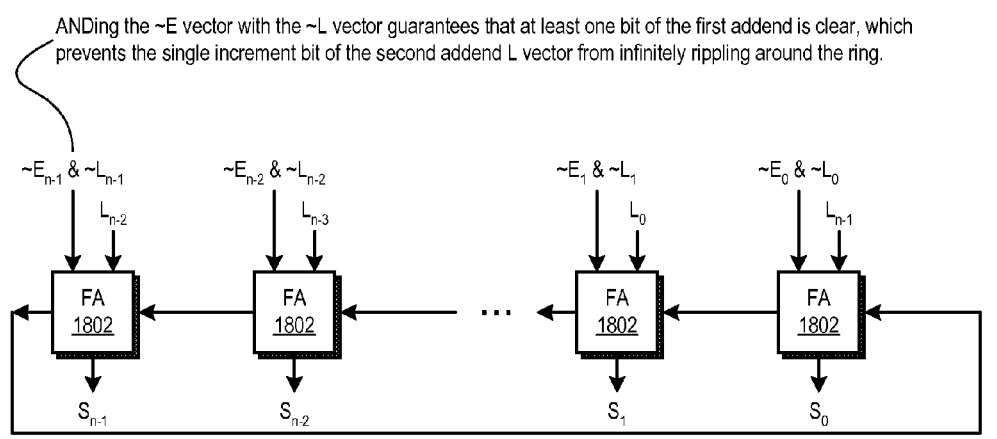
FIGS. 8A through 8D are block diagrams illustrating the barrel-incrementer of FIG. 7 according to one embodiment of the present invention.

Referring now to FIG. 8A, a block diagram illustrating the barrel-incrementer 1712 of FIG. 7 according to one embodiment of the present invention is shown. The barrel-incrementer 1712 includes a plurality of full-adders 1802 coupled in series. In the embodiment illustrated in FIG. 8A, the full-adders 1802 are 1-bit full-adders, and the number of 1-bit full-adders 1802 is n, where n is the number of transaction queues 106. However, the barrel-incrementer 1712 may be incremented with fewer full-adders capable of adding larger addends, depending upon the number of transaction queues 106 and speed and power requirements.

In the barrel-incrementer 1712 of FIG. 8A, each full-adder 1802 receives two addend bits and a carry-in bit and generates a corresponding sum bit of the S vector 1704 and a carry-out bit. Each full-adder 1802 receives as its carry-in the carry-out of the full-adder 1802 rotatively to its right. Thus, the right-most full-adder 1802 receives as its carry-in the carry-out of the left-most full-adder 1802. The first addend input to each of the full-adders 1802 is the Boolean AND of the corresponding ~E vector 1796 and ~L vector 1792 bits. The second addend input to each of the full-adders 1802 is the 1-bit left rotated version of the corresponding L vector 1602 bit. In the embodiment of FIG. 8A, the ~E vector 1796 is Boolean ANDed with the ~L vector 1792 to guarantee that at least one bit of the first addend to the full adders 1802 is clear. This prevents the single set increment bit of the second addend (the 1-bit left rotated L vector 1602) from infinitely rippling around the ring of full-adders 1802 of the barrel-incrementer 1712. As may be observed from FIG. 8A, the apparatus is aptly referred to as a "barrel-incrementer" because it increments one addend, namely the ~E vector 1796 (modified to guarantee at least one clear bit), by a single set bit in a left-rotative manner; furthermore, the single increment bit may increment the addend at any position in the addend.

By rotating left 1-bit the single set bit L vector 1602, the single set bit will be in the bit position with respect to the full-adders 1802 corresponding to the next transaction queue 106 1-bit rotatively left of the last transaction queue 106 at the corresponding PM_Q_priority 652 for which the transaction scheduler 602 transmitted a transaction. By using the ~E vector 1796 as the first addend input, the first addend has a set bit in each transaction queue 106 position that is not enabled and a clear bit in each transaction queue 106 position that is enabled. Consequently, the single set bit of the 1-bit left-rotated L vector 1602 addend will rotatively ripple left from its bit position until it reaches a clear bit position, i.e., a bit position of a transaction queue 106 that is enabled. This is illustrated by the example here, in which only transaction queues 1 and 3 are enabled, and transaction queue 3 106 was the last transmitted transaction queue 106 at the PM_Q_priority 652:

$\sim E = 11110101$ $L = 00001000$ $L' = 00010000$ (L left-rotated 1-bit)

$\sim E\ \&\ \sim L = 11110101$ $S = 00000110$ ( $\sim E\ \&\ \sim L$ barrel-incremented by $L'$)

However, if no transaction queues 106 are enabled, the single set bit of the 1-bit left-rotated L vector 1602 addend will ripple left from its bit position until it returns where it started and stop there, as shown here:

$\sim E = 11111111$ $L = 00001000$ $L' = 00010000$ (L left-rotated 1-bit)

$\sim E\ \&\ \sim L = 11110111$ $S = 00001000$ ( $\sim E\ \&\ \sim L$ barrel-incremented by $L'$)

Further, if the single set bit of the 1-bit left-rotated L vector 1602 addend is clear in the ~E vector 1796, such as bit 4 here below, then bit 4 of the S vector 1704 will be set and the rotated L vector 1602 set bit will not ripple any further:

$\sim E = 11100011$ $L = 00001000$ $L' = 00010000$ (L left-rotated 1-bit)

$\sim E\ \&\ \sim L = 11100011$ $S = 11110011$( $\sim E\ \&\ \sim L$ barrel-incremented by $L'$)

Furthermore, the AND gate 1714 of FIG. 7 functions to guarantee that only one bit of the N vector 1604 is set. A bit vector in which only one bit is set is commonly referred to as a 1-hot, or one-hot, vector. For example, in the last example above, even though the S vector 1704 has multiple bits set, the AND gate 1714 generates a resulting N vector 1604 with a single set bit, as here:

$\sim E = 11100011$ $L = 00001000$ $L' = 00010000$ $\sim E\ \&\ \sim L = 11100011$ $S = 11110011$ $E = 00011100$ $N = 00010000$ Generally, the barrel-incrementer 1712 of FIG. 8A may be described by the following equation:

{Cout.i,Sum.i}=$A.i+B.i+Cin.i$, where A.i is one of the n bits of the ~E vector 1796 Boolean ANDed with the corresponding bit of the ~L vector 1792, B.i is a 1-bit left rotated corresponding one of the n bits of the L vector 1602, Sum.i is a binary sum of (A.i+B.i+Cin.i), Cout.i is the carry out of (A.i+B.i+Cin.i), Cin.i=Cout.i−1, and Cin.0=Cout.n−1.

As may be observed from the foregoing, an advantage of the round-robin generator 1606 of FIG. 7 employing the barrel-incrementer 1712 of FIG. 8A is that its complexity is n, where n is the number of transaction queues 106, rather than $n^2$, as the conventional round-robin circuit. That is, the round-robin generator 1606 built around the barrel-incrementer 1712 of FIG. 8A scales linearly with the number of transaction queues 106. The same is true of the barrel-incrementer 1712 of FIGS. 8B-8D below.

Figure 8B:
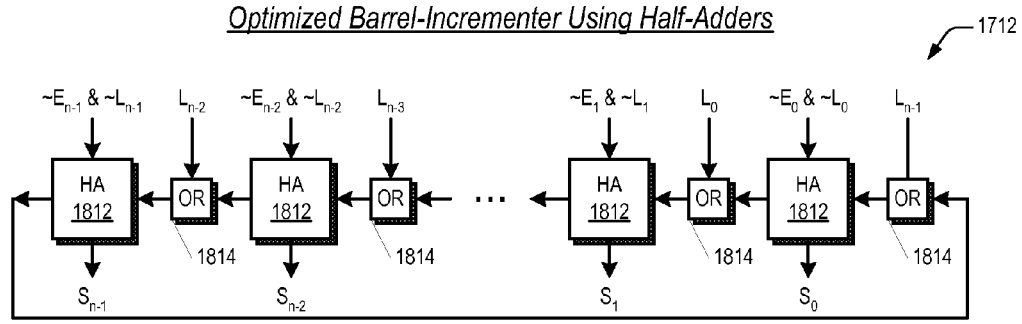

Referring now to FIG. 8B, a block diagram illustrating the barrel-incrementer 1712 of FIG. 7 according to an alternate embodiment of the present invention is shown. The barrel-incrementer 1712 of FIG. 8B is an optimized version of the barrel-incrementer 1712 of FIG. 8A in which the full-adders 1802 are replaced with the combination of a half-adder 1812 and an OR gate 1814. The half-adder 1812 receives as its carry-in the output of the OR gate 1814. The OR gate 1814 receives as its two inputs the carry-out of the half-adder 1812 to its right and the corresponding 1-bit left-rotated L vector 1602 bit. Thus, collectively, the half-adder 1812 and OR gate 1814 combination performs the same function as the full-adder 1802 of the barrel-incrementer 1712 of FIG. 8A. The optimization of replacing the full-adder 1802 will a half-adder 1812 and OR gate 1814 is possible due to the fact that it is known that only one of the inputs to the OR gate 1814, if at all, will be true. That is, only one of the L vector 1602 input bit or the carry-out of the half-adder 1812 to the right will be true. An advantage of the barrel-incrementer 1712 of FIG. 8B is that it may be smaller and consume less power than the barrel-incrementer 1712 of FIG. 8A since it is optimized to take advantage of the fact that only one of the inputs to the OR gate 1814 will be true.

Generally, the barrel-incrementer 1712 of FIG. 8B may be described by the following equation:

{Cout.i, Sum.i}=$A.i+(B.i$ OR $Cin.i)$, where A.i is one of the n bits of the ~E vector 1796 Boolean ANDed with the corresponding bit of the ~L vector 1792, B.i is a 1-bit left rotated corresponding one of the n bits of the L vector 1602, Sum.i is a binary sum of A.i+(B.i OR Cin.i), Cout.i is the carry out of A.i+(B.i OR Cin.i), Cin.i=Cout.i−1, and Cin.0=Cout.n−1.

Because the embodiments of the barrel-incrementers 1712 of FIGS. 8A and 8B comprise a ring of adders in series, some automated logic synthesis tools may have difficulty synthesizing the circuit. In particular, they may generate a timing loop. To alleviate this problem, the embodiments of FIGS. 8C and 8D break the ring of adders by employing two rows of adders, as will now be described.

Figure 8C:
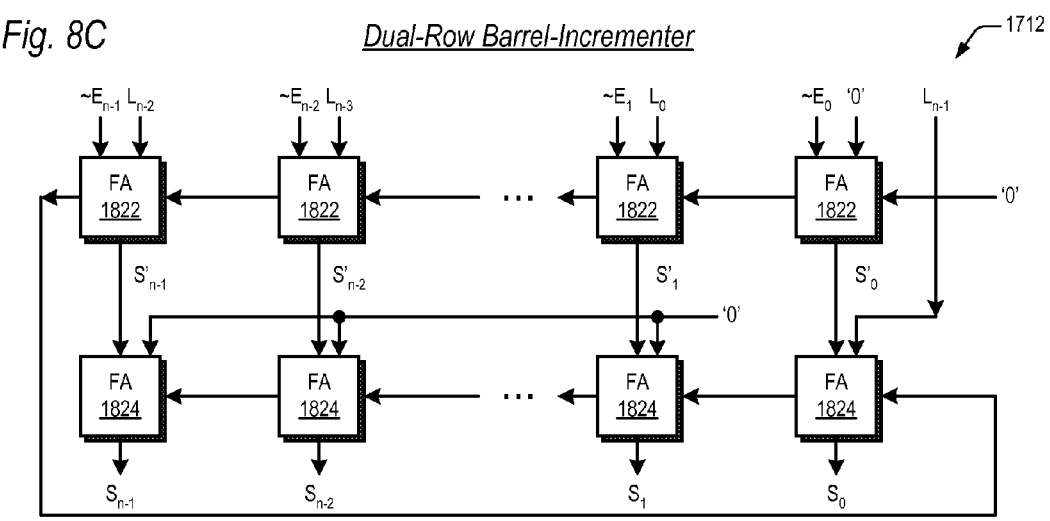

Referring now to FIG. 8C, a block diagram illustrating the barrel-incrementer 1712 of FIG. 7 according to an alternate embodiment of the present invention is shown. The embodiment of FIG. 8C employs a first row of full-adders 1822 and a second row of full-adders 1824 coupled in series, but not in a ring. That is, the carry-out of the left-most full-adder 1824 of the second row is not provided to the carry-in of the right-most full-adder 1822 of the first row. Rather, the first row of full-adders 1822 is coupled in series, and receives the same inputs as the full-adders 1802 of FIG. 8A; however, a binary zero value is provided to the carry-in of the right-most full-adder 1822 of the first row, the carry-out of the left-most full-adder 1822 of the first row is provided as the carry in the of the right-most full-adder 1824 of the second row, and the carry-out of the left-most full-adder 1824 of the second row is discarded. Furthermore, the sum output of the first row full-adders 1822, referred to as intermediate n-bit sum S' in FIG. 8C, is provided as the first addend input to the second row full-adders 1824. Still further, the second addend input to the second row full-adders 1824 is a binary zero, except for the right-most second row full-adder 1824, which receives the left-most bit of the L vector 1602. The second row of full-adders 1824 generates the S vector 1704. As may be observed, advantageously, the barrel-incrementer 1712 of FIG. 8C does not include a ring and therefore may be synthesized more successfully by some synthesis software tools than the embodiments of FIGS. 8A and 8B. However, a disadvantage of the barrel-incrementer 1712 of FIG. 8C is that it is larger than the embodiments of FIGS. 8A and 18B, and consumes more power, although its complexity is advantageously still n, rather than $n^2$. It is also noted that the embodiments of FIGS. 8C and 8D do not need the ~L vector 1792 input since there is not a ring of adders for the single increment bit of the second addend (i.e., the L vector 1602) to infinitely ripple around.

Figure 8D:
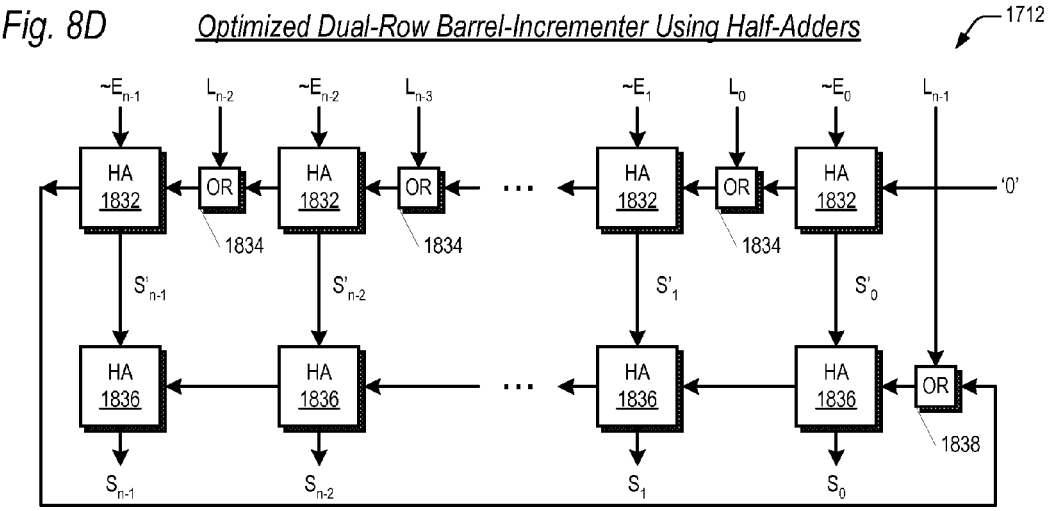

Referring now to FIG. 8D, a block diagram illustrating the barrel-incrementer 1712 of FIG. 7 according to an alternate embodiment of the present invention is shown. The barrel-incrementer 1712 of FIG. 8D is an optimized version of the barrel-incrementer 1712 of FIG. 8C in which each of the first row of full-adders 1822 is replaced with the combination of a half-adder 1832 and an OR gate 1834, similar to the embodiment of FIG. 8B; and, each of the second row full-adders 1824 is replaced with a half-adder 1836. Additionally, the second row includes a single OR gate 1838 that receives the left-most bit of the L vector 1602 and the carry-out of the left-most half-adder 1832 of the first row; the OR gate 1838 provides its output to the carry-in of the right-most half-adder 1836 of the second row. Thus, the barrel-incrementer 1712 of FIG. 8D enjoys the optimization benefits of the barrel-incrementer 1712 of FIG. 8B and the synthesis tool benefits of the barrel-incrementer 1712 of FIG. 8C.

Figure 9A:
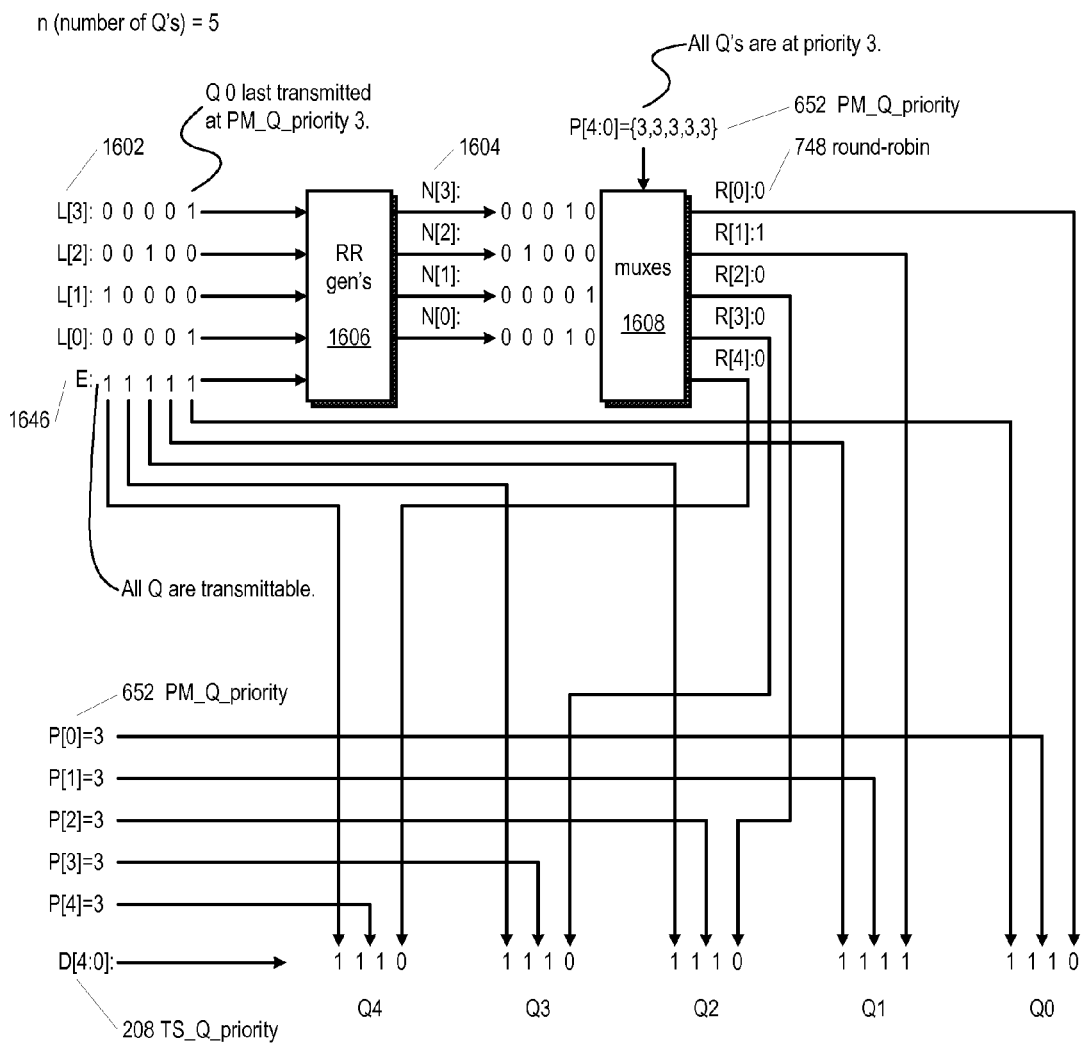

Referring now to FIG. 9A, a block diagram illustrating an example of operation of the transaction scheduler 602 employing the round-robin generators 1606 of FIG. 6 according the present invention is shown. FIG. 9A includes collectively the round-robin generators 1606 and muxes 1608 of FIG. 6A. In the example, the number of transaction queues 106 (denoted n) is 5, and the transaction queues 106 are denoted 0 through 4. In the example, the number of PM_Q_priority 652 levels is 4, denoted 0 through 3.

In the example of FIG. 9A, all bits of the E vector 1646 are set, i.e., all transaction queues 106 are enabled for transmitting a transaction; all of the transaction queues 106 are at PM_Q_priority 652 level 3; the L vector 1602 for PM_Q_priority 652 level 3 is 00001, indicating the last transaction queue 106 from which the transaction scheduler 602 transmitted a transaction at PM_Q_priority 652 level 3 was transaction queue 0 106. The L vector 1602 for PM_Q_priority 652 levels 2, 1, and 0, are 00100, 10000, and 00001, respectively.

Given the inputs just described, the round-robin generators 1606 generate an N vector 1604 for PM_Q_priority 652 level 3 with a value of 00010, indicating that transaction queue 1 106 is selected as the next transaction queue 106 in round-robin order for transmission at PM_Q_priority 652 level 3. Transaction queue 1 106 is selected since it is the first transaction queue 106 rotatively left of transaction queue 0 106 that is enabled, as indicated by a set bit in the E vector 1646. The round-robin generators 1606 generate an N vector 1604 value of 01000, 00001, and 00010 for PM_Q_priority 652 levels 2, 1, and 0, respectively.

Because each of the transaction queues 106 are at PM_Q_priority 652 level 3, the corresponding mux 1608 for each transaction queue 106 selects the corresponding bit of the N vector 1604 of PM_Q_priority 652 level 3. Consequently, the round-robin bit 748 for transaction queue 0 106 (denoted R[0] in FIG. 9A) is 0; the round-robin bit 748 for transaction queue 1 106 is 1; the round-robin bit 748 for transaction queue 2 106 is 0; the round-robin bit 748 for transaction queue 3 106 is 0; and the round-robin bit 748 for transaction queue 4 106 is 0. Therefore, the resulting TS_Q_priority 208 for transaction queues 106 0 through 4 are: 1110, 1111, 1110, 1110, and 1110, respectively. Consequently, the selection logic 202 selects transaction queue 1 106 for transaction transmission because it has the greatest TS_Q_priority 208. It is noted that although all the transaction queues 106 are enabled and all are at the same PM_Q_priority 652, transaction queue 1 106 is selected because it is the next transaction queue 106 in left-rotative round-robin order from the last selected transaction queue 106 (which was transaction queue 0 106) at the highest enabled PM_Q_priority 652 level.

Referring now to FIG. 9B, a block diagram illustrating a second example of operation of the transaction scheduler 602 employing the round-robin generators 1606 of FIG. 6 according the present invention is shown. FIG. 9B is similar to FIG. 9A; however, the input conditions are different. In the example of FIG. 9B, the E vector 1646 value is 01011, i.e., only transaction queues 0, 1, and 3 are enabled for transmitting a transaction; transaction queues 2 and 4 are at PM_Q_priority 652 level 3, transaction queues 1 and 3 are at PM_Q_priority 652 level 2, and transaction queue 0 106 is at PM_Q_priority 652 level 1; the L vector 1602 for PM_Q_priority 652 levels 3 through 0 are 01000, 00010, 10000, 00010, indicating the last transaction queue 106 from which the transaction scheduler 602 transmitted a transaction at PM_Q_priority 652 levels 3 through 0 are 3, 1, 4, and 1, respectively.

Given the inputs just described, the round-robin generators 1606 generate an N vector 1604 for PM_Q_priority 652 levels 3 through 0 with a value of 00001, 01000, 00001, and 01000, respectively, indicating that transaction queues 0, 3, 0, and 3, respectively, are selected as the next transaction queue 106 in round-robin order for transmission within PM_Q_priority 652 levels 3 through 0, respectively. It is noted that transaction queue 4 106 is skipped over in the PM_Q_priority 652 level 3 N vector 1604 since transaction queue 4 106 is not enabled, even though transaction queue 4 106 is the next transaction queue 106 rotatively-left of transaction queue 3 106, which was the last selected transaction queue 106 at PM_Q_priority 652 level 3; similarly, transaction queue 2 106 is skipped over in PM_Q_priority 652 levels 2 and 0 since transaction queue 2 106 is not enabled.

Because transaction queues 2 and 4 are at PM_Q_priority 652 level 3, the corresponding muxes 1608 select the corresponding bit of the N vector 1604 of PM_Q_priority 652 level 3; because transaction queues 1 and 3 are at PM_Q_priority 652 level 2, the corresponding muxes 1608 select the corresponding bit of the N vector 1604 of PM_Q_priority 652 level 2; because transaction queue 0 is at PM_Q_priority 652 level 1, the corresponding mux 1608 selects the corresponding bit of the N vector 1604 of PM_Q_priority 652 level 1. Consequently, the round-robin bit 748 for transaction queues 0 through 4 are 1, 0, 0, 1, and 0, respectively. Therefore, the resulting TS_Q_priority 208 for transaction queues 0 through 4 are: 1011, 1100, 0110, 1101, and 0110, respectively. Consequently, the selection logic 202 selects transaction queue 3 106 for transaction transmission because it has the greatest TS_Q_priority 208. It is noted that although transaction queue 1 106 is also enabled and at the highest PM_Q_priority 652 that is enabled (PM_Q_priority 652 level 2), transaction queue 3 106 is selected because the bit corresponding to transaction queue 3 106 in the N vector 1604 for PM_Q_priority 652 level 2 is set (hence the round-robin bit 748 for transaction queue 3 106 is set) and the bit corresponding to transaction queue 1 106 is clear (hence the round-robin bit 748 for transaction queue 1 106 is clear).

Referring now to FIG. 10, a block diagram illustrating the transaction scheduler 602 of FIG. 3 including round-robin logic 712 of FIG. 4 according to an alternate embodiment of the present invention is shown. The transaction scheduler 602 of FIG. 10 is similar to the transaction scheduler 602 of FIG. 6, except that the round-robin generators 2006 of FIG. 10 are different from the round-robin generators 1606 of FIG. 6, as described below with respect to FIGS. 11 and 12. The portion of the transaction scheduler 602 shown in FIG. 6B is similar to a like portion of the alternate embodiment of FIG. 10, and is therefore not duplicated in the Figures.

In one aspect, the round-robin generators 2006 of FIG. 10 are different from the round-robin generators 1606 of FIG. 6 because they do not receive the E vector 1646. In another aspect, the round-robin generators 2006 each generate a corresponding NSE vector 2004, rather than the N vector 1604 generated by the round-robin generators 1606 of FIG. 6. The NSE vectors 2004 are similar to the N vectors 1604, however, the NSE vectors 2004 are sign-extended; thus, the NSE vectors 2004 are not 1-hot. Consequently, by design, two or more transaction queues 106 may have an equal highest TS_Q_priority 208. The greater-than-or-equal comparators 714 of FIG. 6B work in conjunction with the round-robin bits 748 selected from the NSE vectors 2004 to select the desired round-robin transaction queue 106 in the highest enabled PM_Q_priority 652, as described below. For example, assume the NSE vector 2004 at one of the PM_Q_priority 652 levels is 11100. This value indicates that transaction queues 4, 3, and 2 have priority over transaction queues 1 and 0 with respect to round-robin order selection. If, for example, all of the transaction queues 106 are at this PM_Q_priority 652 level, the GTE comparators 714 of the transaction scheduler 602 will search for a transmittable transaction queue 106 in the order 2, 3, 4, 0, 1.

Referring now to FIG. 11, a block diagram illustrating the round-robin generator 2006 of FIG. 10 according to one embodiment of the present invention is shown. Although only one round-robin generator 2006 is shown in FIG. 11, the transaction scheduler 602 comprises one round-robin generator 2006 for each PM_Q_priority 652, as shown in FIG. 10. An advantage of the alternate embodiment of the round-robin generator 2006 of FIG. 11 that employs the sign-extended character of the NSE vector 2004 is that the NSE vectors 2004 may be calculated independent of the E vector 1646, i.e., independent of the transaction transmitability of the transaction queues 106, unlike the round-robin generator 1606 embodiment of FIG. 7.

The round-robin generator 2006 includes a mux 2102 that receives as its two inputs the L vector 1602 and the output of a register 2124. The register 2124 receives and stores the output of the mux 2102. The mux 2102 also receives a transaction_transmitted control signal 2158 that is true if a transaction is transmitted from the corresponding PM_Q_priority 652 during the current transmission cycle; otherwise, the transaction_transmitted control signal 2158 is false. In one embodiment, the transaction_transmitted signal 2158 may be false for all PM_Q_priority 652 levels, such as if no transaction queues 106 have a transmittable transaction or if the external device connected to the port 102 is currently unable to receive transactions. The mux 2102 selects the L vector 1602 input if the transaction_transmitted control signal 2158 is true; otherwise, the mux 2102 selects the register 2124 output. Thus, mux 2102 and register 2124 work in combination to retain the old L vector 1602 value until a transaction is transmitted by the transaction scheduler 602 at the corresponding PM_Q_priority 652 level. Thus, advantageously, round-robin order is retained within the PM_Q_priority 652 level independent of the other PM_Q_priority 652 levels.

The round-robin generator 2006 also includes a rotate left 1-bit function 2106 configured to receive and rotate the output of the register 2124 left 1-bit. Hence, the output of the rotate left 1-bit function 2106 is a 1-hot vector pointing to the transaction queue 106 rotatively-left of the last transmitted transaction queue 106 bit. For example, if n is 8, and if the L vector 1602 value is 10000000, then the output of the rotate left 1-bit function 2106 is 00000001.

The round-robin generator 2006 also includes a sign-extender 2108 configured to receive the output of the rotate left 1-bit function 2106 and to sign-extend it to generate the NSE vector 2004 of FIG. 10. For example, if the L vector 1602 value is 00000100, then the output of the sign-extender 2108 is 11111000. In one embodiment, the rotate left 1-bit function 2106 does not include any active logic, but simply comprises signal wires routed appropriately from the register 2124 output to the sign-extender 2108 input to accomplish the 1-bit left rotation.

Referring now to FIG. 12A, a block diagram illustrating a first example of operation of the transaction scheduler 602 having round-robin generators 2006 of FIG. 10 according the present invention is shown. FIG. 12A is similar to FIG. 9A; however, FIG. 12A illustrates collectively the round-robin generators 2006 of FIG. 10, rather than the round-robin generators 1606 of FIG. 6. Additionally, the L vector 1602 input for PM_Q_priority 652 level 3 is 00010, rather than 00001. Finally, the round-robin generators 2006 do not receive the E vector 1646.

Given the inputs of FIG. 12A, the round-robin generators 2006 generate an NSE vector 2004 for PM_Q_priority 652 level 3 with a value of 11100, indicating that transaction queue 2 106 is selected as the next transaction queue 106 in round-robin order for transmission at PM_Q_priority 652 level 3. Transaction queue 2 106 is selected since it is the first transaction queue 106 rotatively left of transaction queue 1 106. The round-robin generators 2006 generate an NSE vector 2004 value of 11000, 11111, and 11110 for PM_Q_priority 652 levels 2, 1, and 0, respectively.

Because each of the transaction queues 106 are at PM_Q_priority 652 level 3, the corresponding mux 1608 for each transaction queue 106 selects the corresponding bit of the N vector 2004 of PM_Q_priority 652 level 3. Consequently, the round-robin bit 748 for transaction queue 0 106 is 0; the round-robin bit 748 for transaction queue 1 106 is 0; the round-robin bit 748 for transaction queue 2 106 is 1; the round-robin bit 748 for transaction queue 3 106 is 1; and the round-robin bit 748 for transaction queue 4 106 is 1. Therefore, the resulting TS_Q_priority 208 for transaction queues 106 0 through 4 are: 1110, 1110, 1111, 1111, and 1111, respectively. Consequently, the selection logic 202 selects transaction queue 2 106 for transaction transmission because it has the greatest or equal TS_Q_priority 208. More specifically, transaction queue 2 106 is the highest transaction queue 106 in the transaction selection logic 202 mux tree (i.e., it has the right-most bit in the NSE vector 2004) that has the greatest or equal TS_Q_priority 208. It is noted that although all transaction queues 106 are enabled and all are at the same PM_Q_priority 652, transaction queue 2 106 is selected because it is the next transaction queue 106 in left-rotative round-robin order from the last selected transaction queue 106 (which was transaction queue 1 106) at the highest enabled PM_Q_priority 652 level.

Figure 12B:
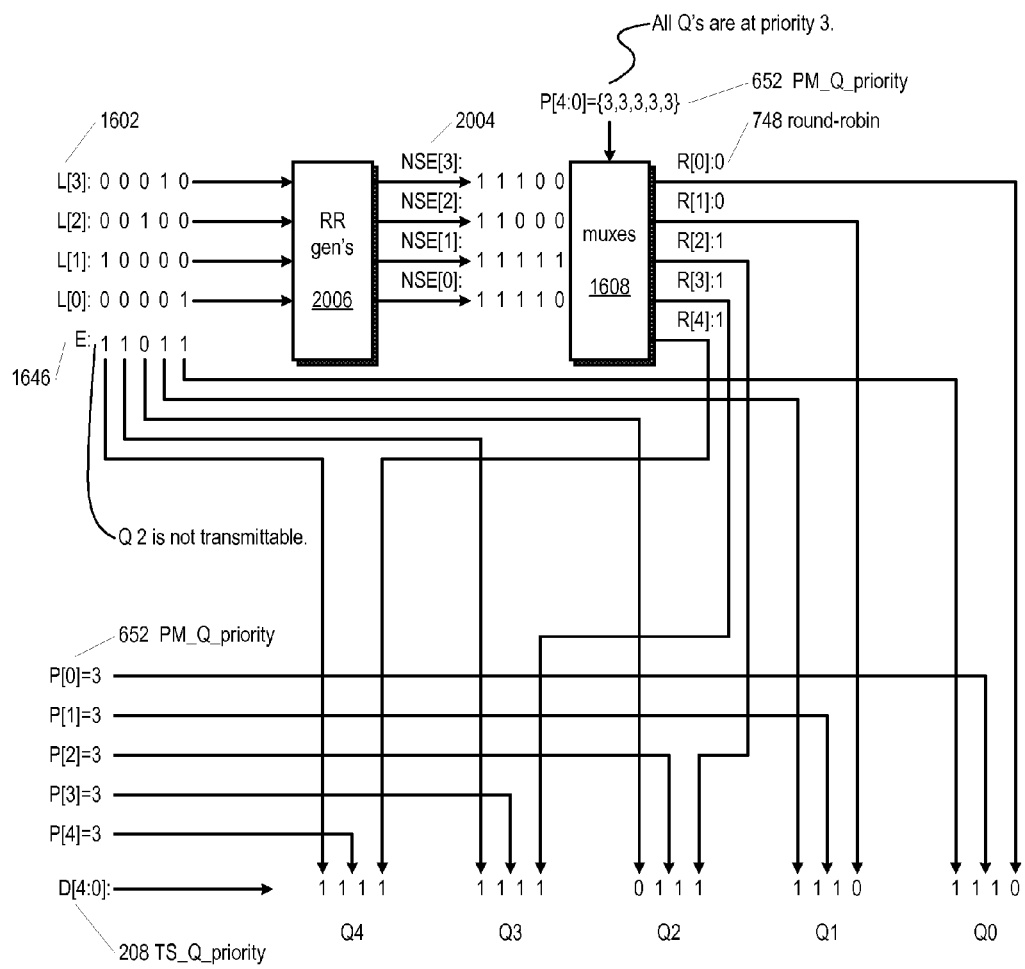

Referring now to FIG. 12B, a block diagram illustrating a second example of operation of the transaction scheduler 602 employing the round-robin generators 2006 of FIG. 10 according the present invention is shown. FIG. 12B is similar to FIG. 12A; however, the input conditions are different. In the example of FIG. 12B, the E vector 1646 value is 11011, i.e., transaction queue 2 106 is disabled for transmitting a transaction.

Given the inputs just described, the round-robin generators 2006 generate an NSE vector 2004 for PM_Q_priority 652 levels 3 through 0 with a value of 11100, 11000, 11111, and 11110, respectively, indicating that transaction queues 2, 3, 0, and 1, respectively, are the next transaction queue 106 in round-robin order for transmission within PM_Q_priority 652 levels 3 through 0, respectively.

Because all the transaction queues 106 are at PM_Q_priority 652 level 3, the corresponding muxes 1608 select the corresponding bit of the NSE vector 2004 of PM_Q_priority 652 level 3. Consequently, the round-robin bit 748 for transaction queues 0 through 4 are 0, 0, 1, 1, and 1, respectively. Therefore, the resulting TS_Q_priority 208 for transaction queues 0 through 4 are: 1110, 1110, 0111, 1111, and 1111, respectively. Consequently, the selection logic 202 selects transaction queue 3 106 for transaction transmission because it is the highest transaction queue 106 in the transaction selection logic 202 mux tree that has the greatest or equal TS_Q_priority 208. It is noted that although transaction queue 2 106 is also at PM_Q_priority 652 level 3 and has its round-robin bit 748 set and is higher in the transaction selection logic 202 mux tree, it is not selected because it is not enabled.

Figure 12C:
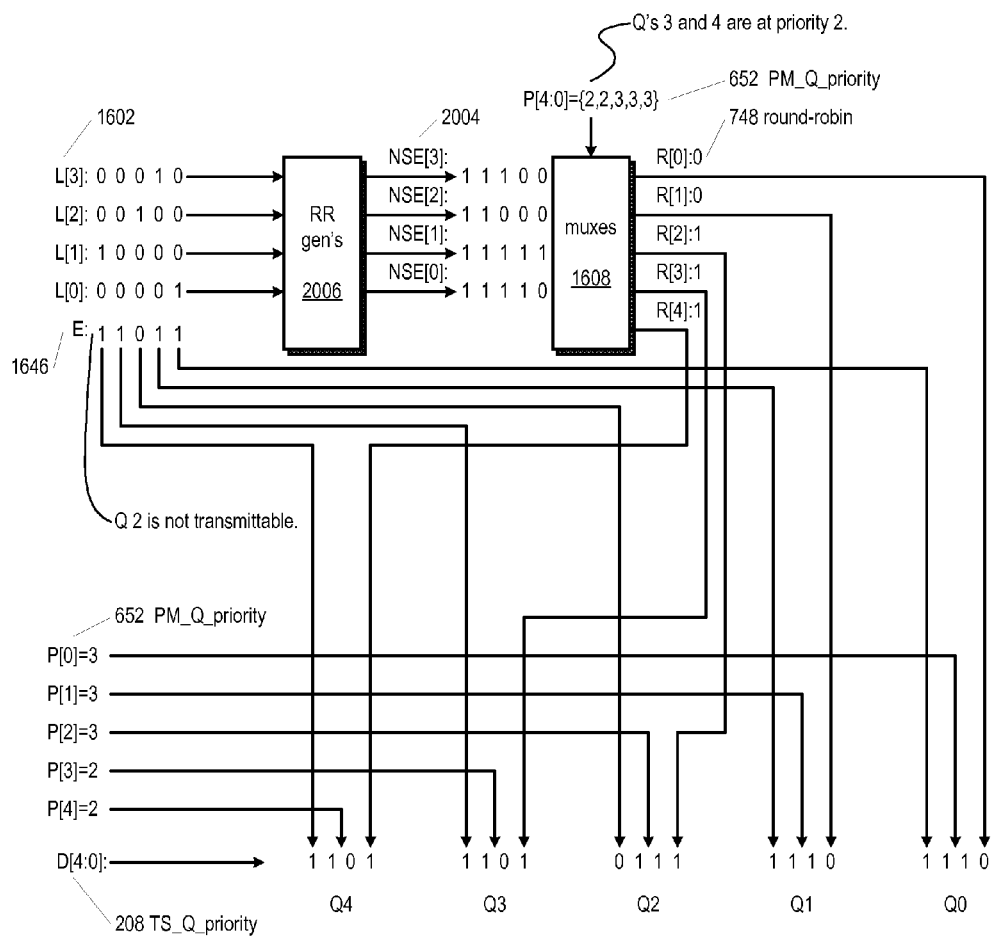

Referring now to FIG. 12C, a block diagram illustrating a third example of operation of the transaction scheduler 602 employing the round-robin generators 2006 of FIG. 10 according the present invention is shown. FIG. 12C is similar to FIG. 12B; however, the input conditions are different: transaction queues 3 and 4 are at PM_Q_priority 652 level 2 instead of level 3.

Given the inputs to FIG. 12C, the round-robin generators 2006 generate an NSE vector 2004 for PM_Q_priority 652 levels 3 through 0 with a value of 11100, 11000, 11111, and 11110, respectively, indicating that transaction queues 2, 3, 0, and 1, respectively, are the next transaction queue 106 in round-robin order for transmission within PM_Q_priority 652 levels 3 through 0, respectively.

Because transaction queues 0, 1, and 2, are at PM_Q_priority 652 level 3, the corresponding muxes 1608 select the corresponding bit of the NSE vector 2004 of PM_Q_priority 652 level 3; because transaction queues 3 and 4 are at PM_Q_priority 652 level 2, the corresponding muxes 1608 select the corresponding bit of the NSE vector 2004 of PM_Q_priority 652 level 2. Consequently, the round-robin bit 748 for transaction queues 0 through 4 are 0, 0, 1, 1, and 1, respectively. Therefore, the resulting TS_Q_priority 208 for transaction queues 0 through 4 are: 1110, 1110, 0111, 1101, and 1101, respectively. Consequently, the selection logic 202 selects transaction queue 0 106 for transaction transmission because it is the highest transaction queue 106 in the transaction selection logic 202 mux tree that has the greatest or equal TS_Q_priority 208. It is noted that although transaction queue 2 106 is also at PM_Q_priority 652 level 3 and has its round-robin bit 748 set and is higher in the transaction selection logic 202 mux tree, it is not selected because it is not enabled. Furthermore, although transaction queues 3 and 4 also have their round-robin bits 748 set and are enabled, they are at PM_Q_priority 652 level 2, which is lower than transaction queue 0 106, which is at PM_Q_priority 652 level 3.

Figure 12D:
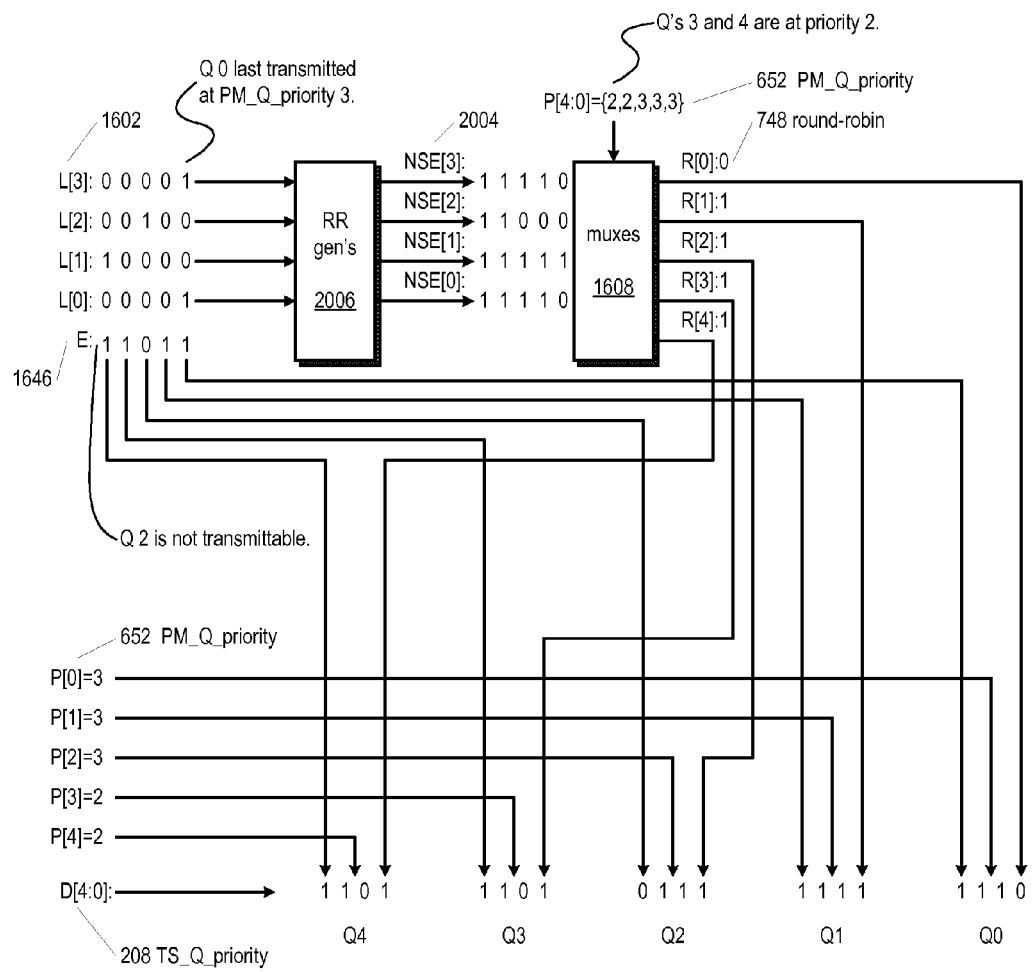

Referring now to FIG. 12D, a block diagram illustrating a fourth example of operation of the transaction scheduler 602 employing the round-robin generators 2006 of FIG. 10 according the present invention is shown. FIG. 12D is similar to FIG. 12C; however, the input conditions are different: the L vector 1602 for PM_Q_priority 652 level 3 is 00001, indicating that transaction queue 0 106 was the last transaction queue 106 transmitted at PM_Q_priority 652 level 3, rather than transaction queue 1 106 as in FIG. 12C.

Given the inputs to FIG. 12D, the round-robin generators 2006 generate an NSE vector 2004 for PM_Q_priority 652 levels 3 through 0 with a value of 11110, 11000, 11111, and 11110, respectively, indicating that transaction queues 1, 3, 0, and 1, respectively, are the next transaction queue 106 in round-robin order for transmission within PM_Q_priority 652 levels 3 through 0, respectively.

Because transaction queues 0, 1, and 2, are at PM_Q_priority 652 level 3, the corresponding mux 1608 for each selects the corresponding bit of the NSE vector 2004 of PM_Q_priority 652 level 3; because transaction queues 3 and 4 are at PM_Q_priority 652 level 2, the corresponding mux 1608 for each selects the corresponding bit of the NSE vector 2004 of PM_Q_priority 652 level 2. Consequently, the round-robin bit 748 for transaction queues 0 through 4 are 0, 1, 1, 1, and 1, respectively. Therefore, the resulting TS_Q_priority 208 for transaction queues 0 through 4 are: 1110, 1111, 0111, 1101, and 1101, respectively. Consequently, the selection logic 202 selects transaction queue 1 106 for transaction transmission because it is the highest transaction queue 106 in the transaction selection logic 202 mux tree that has the greatest or equal TS_Q_priority 208. It is noted that although transaction queue 0 106 is also at PM_Q_priority 652 level 3 and is enabled, its round-robin bit 748 is clear, whereas the round-robin bit 748 for transaction queue 1 106 is set, which causes the transaction selection logic 202 to select transaction queue 1 106 for transmission.

Referring now to FIG. 13, a block diagram of an example application system 1300 for use of the switch 100 of FIG. 1 according to the present invention is shown. The system 1300 of FIG. 13 includes a switch 100 of FIG. 1. The switch 100 of FIG. 13 includes four ports 102, although the present invention is not limited to a particular number of ports 102. Rather, the switch 100, ports 102, and transaction selector 108 embodiments described herein advantageously accommodate a relatively large number of transaction queues 106 requesting access to the transaction transmission bandwidth of a given port 102. A CPU 1302 is coupled to one port 102 of the switch 100; a memory 1304 is coupled to another port 102 of the switch 100; a PCI bus bridge 1306 is coupled to another port 102 of the switch 100; an AGP bus bridge 1308 is coupled to another port 102 of the switch 100. Thus, the system 1300 may comprise a simple personal computer on a chip. The devices which may be coupled to the switch 100 of the present invention are not limited to the devices shown in FIG. 13, but instead may include other building blocks employed in a system, such as a system-on-chip (SOC), including but not limited to, direct memory access controllers (DMACs), ports of other switches, digital signal processors (DSPs), network controllers, universal serial bus (USB) controllers, analog-to-digital converters, digital-to-analog converters, and the like. Advantageously, for each of the ports 102 of a switch 100 as described herein, the transaction transmission policy of the transaction selector 108 may be customized to fit the need of the particular port 102.

Figure 14:
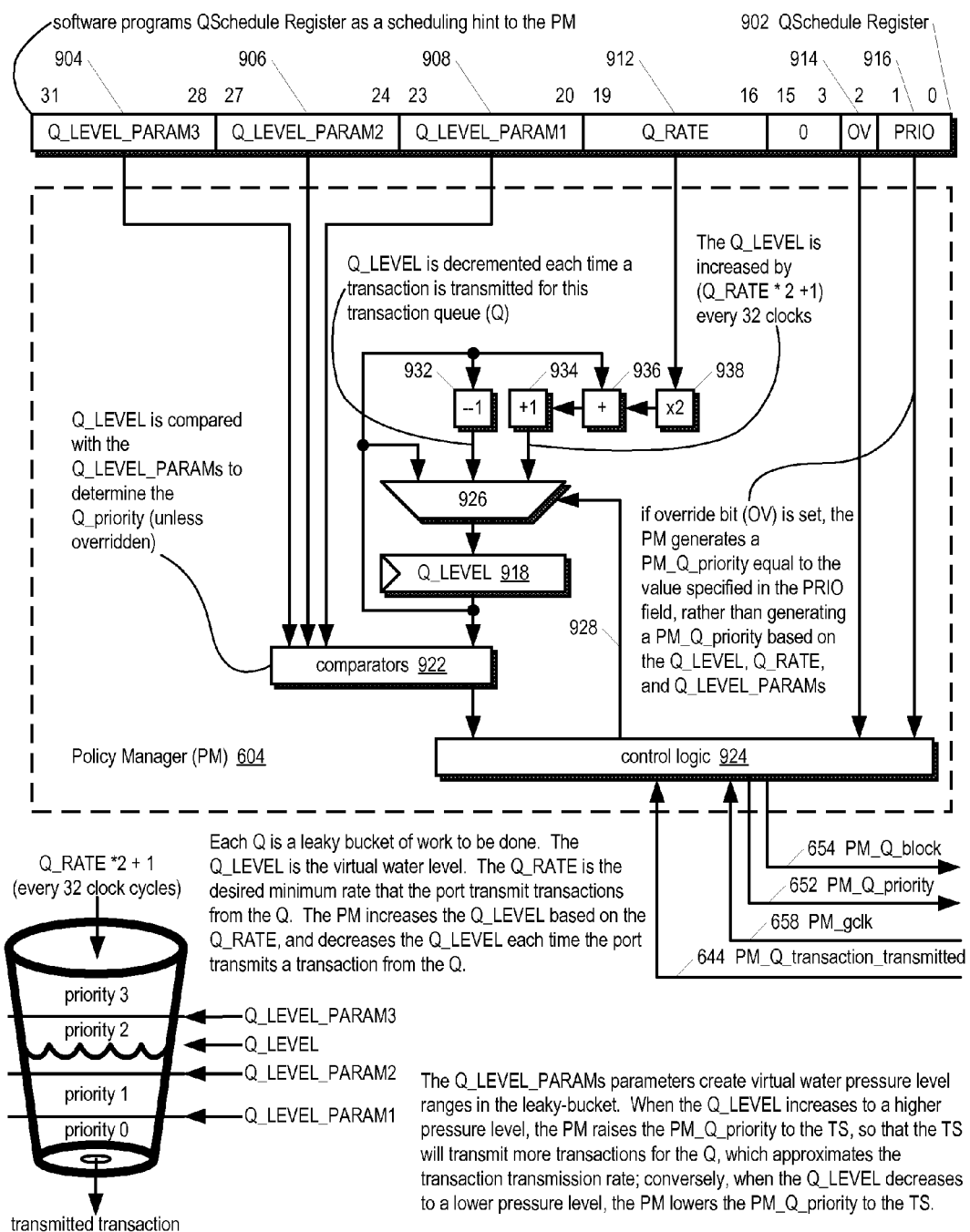
FIG. 14 is a block diagram illustrating the policy manager of FIG. 3 and a QSchedule register according to the present invention.

Referring now to FIG. 14, a block diagram illustrating the policy manager 604 of FIG. 3 and a QSchedule register 902 according to the present invention is shown.

The switch 100 includes a QSchedule register 902 for each transaction queue 106. The QSchedule register 902 is software-programmable and provides a means for software to provide a transaction scheduling hint to the policy manager 604. In one embodiment, the QSchedule register 902 is comprised within the policy manager 604 of each port 102 and is accessed via the signals described in Table 1 that enable the reading and writing of control registers. The QSchedule register 902 includes six fields: Q_LEVEL_PARAM1 908, Q_LEVEL_PARAM2 906, Q_LEVEL_PARAM3 904, Q_RATE 912, OV 914, and PRIO 916. In the embodiment of FIG. 14, the Q_LEVEL_PARAM1 908, Q_LEVEL_PARAM2 906, Q_LEVEL_PARAM3 904, and Q_RATE 912 fields comprise four bits, the PRIO 916 field comprises two bits, and the OV 914 field is a single bit.

The policy manager 604 logic shown in FIG. 14 comprises control logic 924; comparators 922 coupled to provide their output to the control logic 924; a Q_LEVEL 918 register coupled to provide its output as an input to the comparators 922; and a three-input mux 926 that is coupled to provide its output as the input to the Q_LEVEL 918 register. The mux 926 receives on its first input the output of the Q_LEVEL 918 register for retaining the correct value. The mux 926 receives on its second input the output of a decrementer 932 whose input is the output of the Q_LEVEL 918 register. The mux 926 receives on its third input the output of an incrementer 934 whose input is the output of an adder 936 that adds the output of the Q_LEVEL 918 register and the output of a multiplier 938 that multiplies the Q_RATE 912 by 2. The Q_RATE 912 is an indication of the desired transmission rate of the transaction queue 106, i.e., the number of transactions to be completed per unit time. In the embodiment of FIG. 14, the Q_RATE 912 indicates the number of transactions of the transaction queue 106 that should be completed every 16 clock cycles. Although the logic just listed is shown only once in FIG. 14, the logic is replicated within the policy manager 604 for each transaction queue 106 to generate the PM_Q_block 654 and PM_Q_priority 652 signals and to receive the PM_Q_transaction_transmitted 644 and PM_gclk 658 signals for each transaction queue 106.

The policy manager 604 employs a modified leaky-bucket algorithm to accomplish the high-level transaction scheduling policy of the transaction selector 108. The Q_LEVEL 918 register is analogous to the water level in a bucket. The Q_LEVEL 918 is essentially a measure of the amount of work that needs to be done by the transaction queue 106. In one embodiment, the Q_LEVEL 918 register comprises a 12-bit register initialized to zero. The control logic 924 generates a control signal 928 to control which input the mux 926 selects. Every 32 clock cycles, the mux 926 selects the output of the incrementer 936 for storing in the Q_LEVEL 918 register, which increases the Q_LEVEL 918 by the quantity (Q_RATE*2+1). In one embodiment, the number of clock cycles between updates of the Q_LEVEL 918 based on the Q_RATE 912 is also programmable. On other clock cycles, the mux 926 selects the output of the decrementer 932 to decrement the Q_LEVEL 918 if the PM_Q_transaction_transmitted signal 644 indicates a transaction for the transaction queue 106 has been committed for transmission. Thus, software can affect the virtual water level in the transaction queue's 106 bucket by adjusting the Q_RATE 912 value of the transaction queue's 106 QSchedule register 902. In the embodiment of FIG. 14, the value of the Q_RATE 912 indicates the number of transactions per 16 clock cycles it is desired for the switch 100 to transmit for the transaction queue 106.

As the water level in a leaky bucket increases, so does the water pressure, which causes the water to leak out at a higher rate. Analogously, the Q_LEVEL_PARAM fields 904/906/908 are programmed with monotonically increasing values that define virtual water pressure ranges. The comparators 922 compare the Q_LEVEL 918 with the Q_LEVEL_PARAMs 904/906/908 and provide their result to the control logic 924, which generates the PM_Q_priority 652 based on which of the virtual water pressure ranges the Q_LEVEL 918 falls in. As illustrated by the leaky bucket of FIG. 14, the control logic 924 generates a PM_Q_priority 652 value of 3 (the highest priority) if the most significant nibble of the Q_LEVEL 918 is above the Q_LEVEL_PARAM3 904 value; the control logic 924 generates a PM_Q_priority 652 value of 2 if the most significant nibble of the Q_LEVEL 918 is between the Q_LEVEL_PARAM3 904 value and the Q_LEVEL_PARAM2 906 value; the control logic 924 generates a PM_Q_priority 652 value of 1 if the most significant nibble of the Q_LEVEL 918 is between the Q_LEVEL_PARAM2 906 value and the Q_LEVEL_PARAM1 908 value; and the control logic 924 generates a PM_Q_priority 652 value of 0 (the lowest priority) if the most significant nibble of the Q_LEVEL 918 is below the Q_LEVEL_PARAM1 908 value. Analogously, increasing the PM_Q_priority 652 level increases the pressure on the transaction scheduler 602 to transmit transactions for the transaction queue 106, while decreasing the PM_Q_priority 652 level decreases the pressure on the transaction scheduler 602 to transmit transactions for the transaction queue 106.

As discussed above, in some applications using the switch 100, different transaction queues 106 may require different transaction transmission rates, which is programmable using the Q_RATE 912 field. Furthermore, different transaction queues 106 may require different resolutions, i.e., the period of time over which the transaction transmission rate is measured. That is, some transaction queues 106, although perhaps not requiring a high transmission rate, may not be starved for transaction transmission beyond a minimum time period. That is, the transaction queue 106 requires a particular quality-of-service (QOS). As may be observed from FIG. 14 and the explanation thereof, the Q_LEVEL_PARAMs 904/906/908 may be employed to accomplish a required resolution for each transaction queue 106. By assigning Q_LEVEL_PARAMs 904/906/908 that are relatively close to one another, a higher resolution may be accomplished; whereas, assigning Q_LEVEL_PARAMs 904/906/908 that are relatively far apart, creates a lower resolution. Thus, software may achieve the desired quality-of-service goals via the policy manager 604 by adjusting the Q_LEVEL_PARAMs 904/906/908 for each transaction queue 106 to achieve the needed resolution on the transaction transmission rate.

If the OV bit 914 is set, the control logic 924 ignores the values of the Q_LEVEL_PARAMs 904/906/908, Q_RATE 912, and Q_LEVEL 918, and instead generates a value on the PM_Q_priority 652 signal equal to the value specified in the PRIO field 916. This allows software to bypass the leaky bucket policy and directly control the priority of one or more of the transaction queues 106, if necessary.

In one embodiment, if the Q_LEVEL 918 saturates to its maximum value for a predetermined number of clock cycles, then the switch 100 signals an interrupt to enable software to make transaction queue 106 scheduling adjustments at a higher level, in particular by changing the values in one or more of the QSchedule registers 902. In one embodiment, the interrupt may be masked by software.

It should be understood that although an embodiment is described in which specific numbers of bits are used to specify the PM_Q_priority 652, Q_LEVEL_PARAMs 904/906/908, Q_RATE 912, Q_LEVEL 918, etc., the transaction selector 108 is not limited in any way to the values used in the embodiment; rather, the transaction selector 108 may be configured to use various different number of bits, priorities, levels, rates, etc. as required by the particular application in which the switch 100 is to be used. Furthermore, although a policy manager 604 has been described which employs a modified leaky-bucket transaction queue 106 scheduling policy, it should be understood that the policy manager 604 may be configured to employ any of various transaction queue 106 scheduling policies while still enjoying the benefits of a bifurcated transaction selector 108. For example, in one embodiment, the policy manager 604 employs a simple round-robin transaction queue 106 scheduling policy in which the PM_Q_priority 652 outputs for all the transaction queues 106 are tied to the same value. In another embodiment, the policy manager 604 employs a time-sliced transaction queue 106 scheduling policy in which the PM_Q_priority 652 output is raised to the highest priority for one transaction queue 106 for a number of consecutive clock cycles specified in the QSchedule register 902 of the transaction queue 106, then the PM_Q_priority 652 output is raised to the highest priority for another transaction queue 106 for a, perhaps different, number of consecutive clock cycles specified in the QSchedule register 902 of the transaction queue 106, and so on for each transaction queue 106 in a time-sliced fashion.

As may be observed from the foregoing, bifurcating the transaction selector 108 enables the transaction scheduler 602, which is included in the switch core 606, to be relatively simple, which enables the transaction scheduler 602 to be relatively small in terms of area and power, and places the application-specific complexity of the transaction queue 106 scheduling policy in the policy manager 604, which is outside the switch core 606. This is advantageous since some applications may not require a complex policy manager 604 and can therefore not be burdened with the additional area and power requirements that would be imposed upon all applications if the transaction selector 108 were not bifurcated, as described herein.

Figure 15:
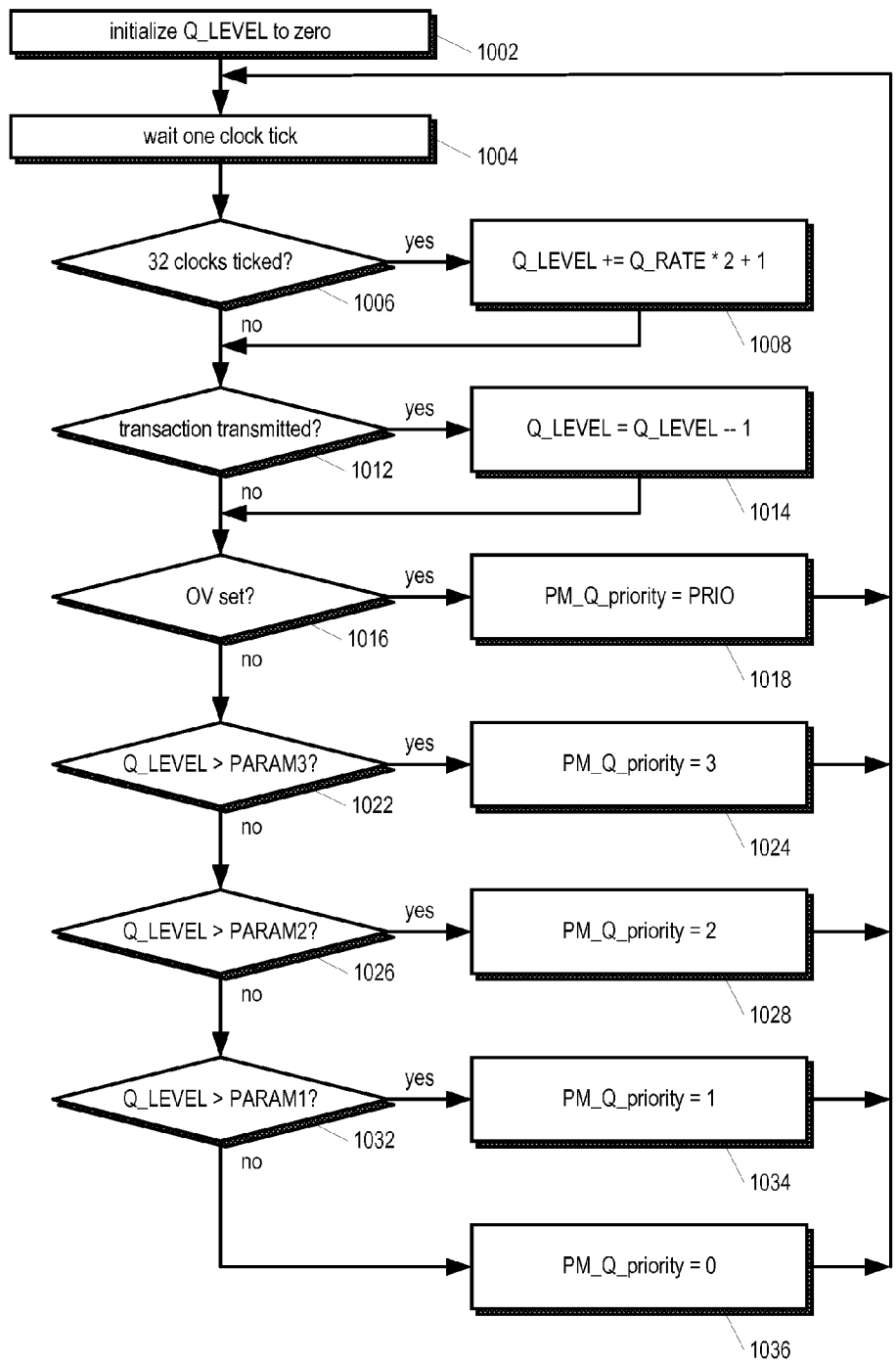
FIG. 15 is a flowchart illustrating operation of the policy manager of FIG. 14 according to the present invention.

Referring now to FIG. 15, a flowchart illustrating operation of the policy manager 604 of FIG. 14 according to the present invention is shown. Although operation is shown for only a single transaction queue 106 in FIG. 15, the operation specified in FIG. 15 occurs within the policy manager 604 for each transaction queue 106. Flow begins at block 1002.

At block 1002, the policy manager 604 initializes the Q_LEVEL 918 to zero. Flow proceeds to block 1004.

At block 1004, the policy manager 604 waits one tick of the PM_gclk 658. Flow proceeds to decision block 1006.

At decision block 1006, the policy manager 604 determines whether 32 PM_gclks 658 have ticked since the last time flow arrived at decision block 1006. If not flow proceeds to decision block 1012; otherwise, flow proceeds to block 1008.

At block 1008, the Q_LEVEL 918 is increased by twice the value of Q_RATE 912 plus one. Flow proceeds to decision block 1012.

At decision block 1012, the policy manager 604 determines whether PM_Q_transaction_transmitted 644 is true. If not, flow proceeds to decision block 1016; otherwise, flow proceeds to block 1014.

At block 1014, the Q_LEVEL 918 is decremented. Flow proceeds to decision block 1016.

At decision block 1016, the policy manager 604 determines whether the OV bit 914 is set. If not, flow proceeds to decision block 1022; otherwise, flow proceeds to block 1018.

At block 1018, the policy manager 604 generates a value on PM_Q_priority 652 equal to the value of the PRIO 916 field. Flow returns to block 1004.

At decision block 1022, the policy manager 604 determines whether the Q_LEVEL 918 is greater than the Q_LEVEL_PARAM3 904 value. If not, flow proceeds to decision block 1026; otherwise, flow proceeds to block 1024.

At block 1024, the policy manager 604 generates a value of 3 (the highest priority) on PM_Q_priority 652. Flow returns to block 1004.

At decision block 1026, the policy manager 604 determines whether the Q_LEVEL 918 is greater than the Q_LEVEL_PARAM2 906 value. If not, flow proceeds to decision block 1032; otherwise, flow proceeds to block 1028.

At block 1028, the policy manager 604 generates a value of 2 on PM_Q_priority 652. Flow returns to block 1004.

At decision block 1032, the policy manager 604 determines whether the Q_LEVEL 918 is greater than the Q_LEVEL_PARAM1 908 value. If not, flow proceeds to block 1036; otherwise, flow proceeds to block 1034.

At block 1034, the policy manager 604 generates a value of 1 on PM_Q_priority 652. Flow returns to block 1004.

At block 1036, the policy manager 604 generates a value of 0 (lowest priority) on PM_Q_priority 652. Flow returns to block 1004.

Referring now to FIGS. 16 through 24, an alternate embodiment of the bifurcated transaction selector 108 of FIG. 1 that differs from the bifurcated transaction selector 108 of FIG. 3 is described. With respect to FIG. 3, it is noted that the policy manager 604 may specify the priority level of each transaction queue 106 directly, via the PM_Q_priority 652. With respect to FIGS. 4 and 5, it is noted that the round-robin order is maintained on a per-PM_Q_priority 652 level basis.

It has been observed, however, that it is desirable to change the PM_Q_priority 652 level for the various transaction queues 106 relatively frequently, e.g., every clock cycle or every few clock cycles. Otherwise, an undesirable affect may occur, depending upon the composition of transaction queues 106. In particular, if the highest priority transaction queues 106 are kept at highest priority for a relatively long time and continue to have transmittable transactions, then they may completely starve the other lower priority transaction queues 106 from having any transmission bandwidth during the relatively long time.

As mentioned above, changing the PM_Q_priority 652 level for the various transaction queues 106 relatively frequently so that all transaction queues 106 may be highest priority at least some percentage of the time may avoid starvation of transaction queues 106 to accomplish the required quality-of-service. However, an undesirable side effect of changing the PM_Q_priority 652 levels frequently is that the per-PM_Q_priority 652 level round-robin order is not obtained. That is, if the PM_Q_priorities 652 of the transaction queues 106 are changed relatively frequently, then the round-robin generators of the embodiments of FIGS. 6 and 10 may not provide fair round-robin vectors.

To solve this problem, the embodiments of FIGS. 16 through 22 provide a mechanism for grouping transaction queues 106 and specifying a priority for each group. Round-robin generators are employed to maintain round-robin order within each group. This enables the group priorities to change frequently, such as each clock cycle, to address the quality-of-service problems discussed above; however, as long as the populations of the transaction queue 106 groups change relatively infrequently, the fair round-robin order will be maintained for each group, as will now be described.

Referring now to FIG. 16, a block diagram illustrating the transaction selector 108 within the switch 100 of FIG. 1 according to an alternate embodiment of the present invention in which the transaction selector 108 is bifurcated is shown. The transaction selector 108 of FIG. 16 includes a PM interface 628 similar to that of FIG. 3; however, as may be observed by comparing FIGS. 6 and 16 and by comparing Table 1 above with Table 2 below, the PM_Q_priority 652 outputs of FIG. 3 and Table 1 are replaced with the PM_group priority 2602 and PM_Q_group 2604 outputs in FIG. 16 and Table 2. In the embodiment of FIG. 16, the two-bit PM_Q_group 2604 signal exists for each transaction queue 106 and identifies one of four possible transaction queue 106 groups to which the transaction queue 106 belongs. The groups are denoted 0, 1, 2, and 3 or G0, G1, G2, G3. In the embodiment of FIG. 16, the two-bit PM_group priority 2602 signal exists for each group and indicates one of four possible priority levels for each of the transaction queues 106 in the group. The group priorities are denoted 0, 1, 2, and 3.

TABLE 2

| Signal Name | Direction | Description |
| --- | --- | --- |
| PM_gclk | Input | switch clock |
| PM_gfclk | Input | Free running switch clock |
| PM_greset | Input | Global Reset |
| PM_scanenable | Input | Global Scan Enable. |
| PM_rd_reg | Input | Register number for reads |
| PM_rd | Input | Read strobe |
| PM_rdata | Output | Read data |
| PM_wr_reg | Input | Register number for writes |
| PM_wr | Input | Write strobe |
| PM_wdata | Input | Write data |
| PM_Q_transaction_transmitted[8:0] | Input | A transaction was transmitted for the specified transaction queue. |
| PM_Q_group_0[1:0] | Output | Group to which transaction queue 0 belongs. |
| PM_Q_group_1[1:0] | Output | Group to which transaction queue 1 belongs. |
| PM_Q_group_2[1:0] | Output | Group to which transaction queue 2 belongs. |
| PM_Q_group_3[1:0] | Output | Group to which transaction queue 3 belongs. |
| PM_Q_group_4[1:0] | Output | Group to which transaction queue 4 belongs. |
| PM_Q_group_5[1:0] | Output | Group to which transaction queue 5 belongs. |
| PM_Q_group_6[1:0] | Output | Group to which transaction queue 6 belongs. |
| PM_Q_group_7[1:0] | Output | Group to which transaction queue 7 belongs. |
| PM_Q_group_8[1:0] | Output | Group to which transaction queue 8 belongs. |
| PM_group_priority_0[1:0] | Output | Priority level of transaction queues in group 0. |
| PM_group_priority_1[1:0] | Output | Priority level of transaction queues in group 1. |
| PM_group_priority_2[1:0] | Output | Priority level of transaction queues in group 2. |
| PM_group_priority_3[1:0] | Output | Priority level of transaction queues in group 3. |
| PM_Q_block[8:0] | Output | Prevent the transaction scheduler from transmitting transactions for specified transaction queues. |

Figure 17A:
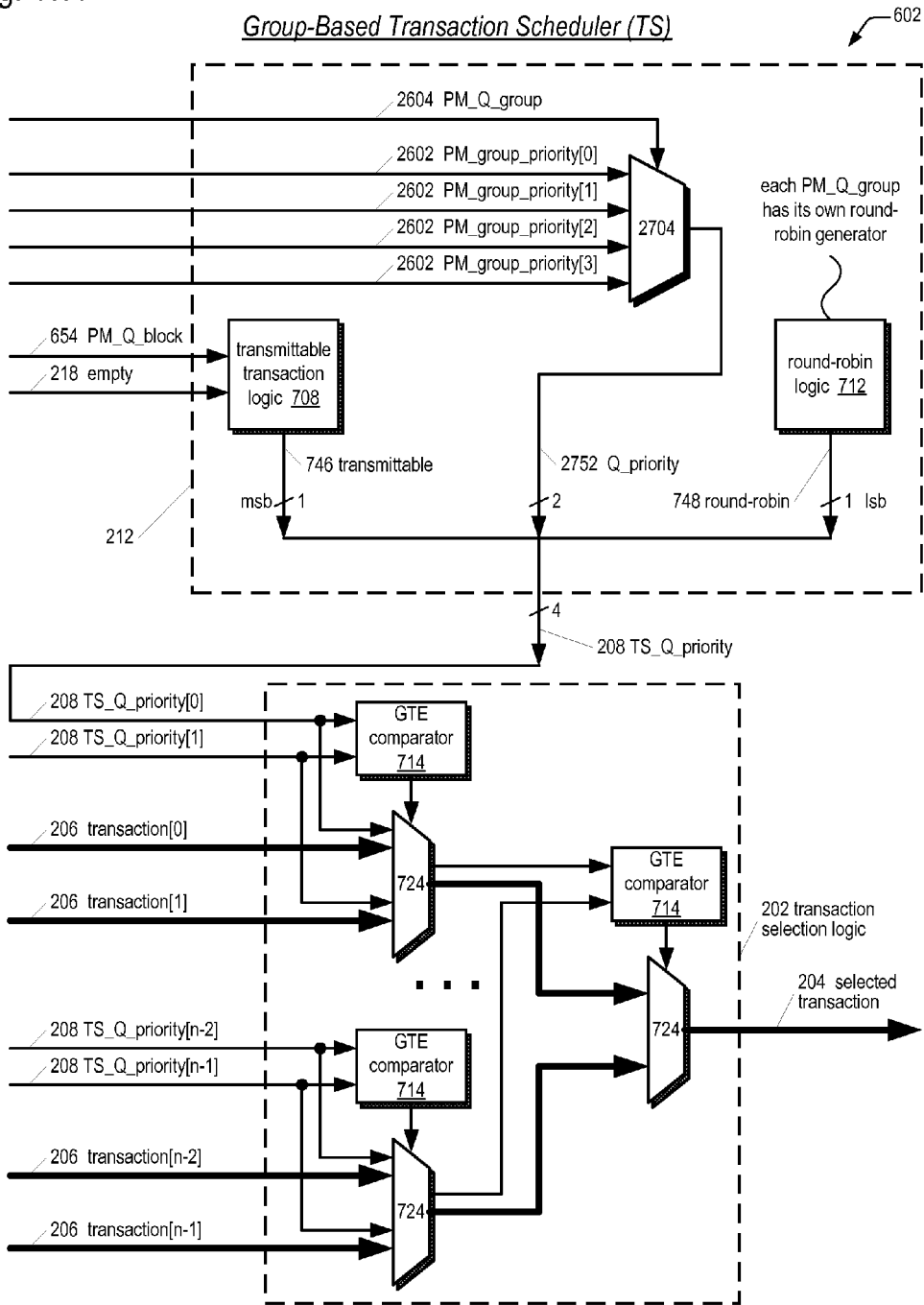
FIG. 17A is a block diagram illustrating in more detail the transaction scheduler of FIG. 16 according to one embodiment of the present invention.

Referring now to FIG. 17A, a block diagram illustrating in more detail the transaction scheduler 602 of FIG. 16 according to one embodiment of the present invention is shown. FIG. 17A is similar to FIG. 4; however, FIG. 17A includes a four-input mux 2704 that receives the four PM_group_priority 2602 outputs of FIG. 16 on respective ones of its data inputs. Similarly to the transaction scheduler 602 of FIG. 4, in the transaction scheduler 602 of FIG. 17A, transmittable transaction logic 708 and mux 2704 are replicated within the transaction scheduler 602 for each transaction queue 106 to generate a TS_Q_priority 208 for each transaction queue 106. The mux 2704 also receives the PM_Q_group 2604 outputs of FIG. 16 of the associated transaction queue 106 as its select control input. Consequently, the mux 2704 outputs a two-bit Q_priority 2752 for the associated transaction queue 106 which functions similarly to the PM_Q_priority 652 of FIG. 4. That is, the Q_priority 2752 specifies the priority of the associated transaction queue 106; however, as may be observed, the Q_priority 2752, rather than being directly provided by the policy manager 604, is derived by mux 2704 from the policy manager 604 outputs PM_Q_group 2604 and PM_group_priority 2602 as shown. The Q_priority 2752 is combined with the transmittable bit 746 and the round-robin bit 748 to create the TS_Q_priority 208, which is provided to the transaction selection logic 202, similarly to the manner of FIG. 4.

Another difference between the transaction scheduler 602 of FIG. 17A and FIG. 4 is that a round-robin generator 712, or round-robin logic 712, of FIG. 17A exists for each transaction queue 106 group, rather than for each PM_Q_priority 652 as in FIG. 4. Two embodiments of the round-robin generator 712 of FIG. 17A are described in detail below with respect to FIGS. 18-19 and 21-22, respectively.

Figure 17B:
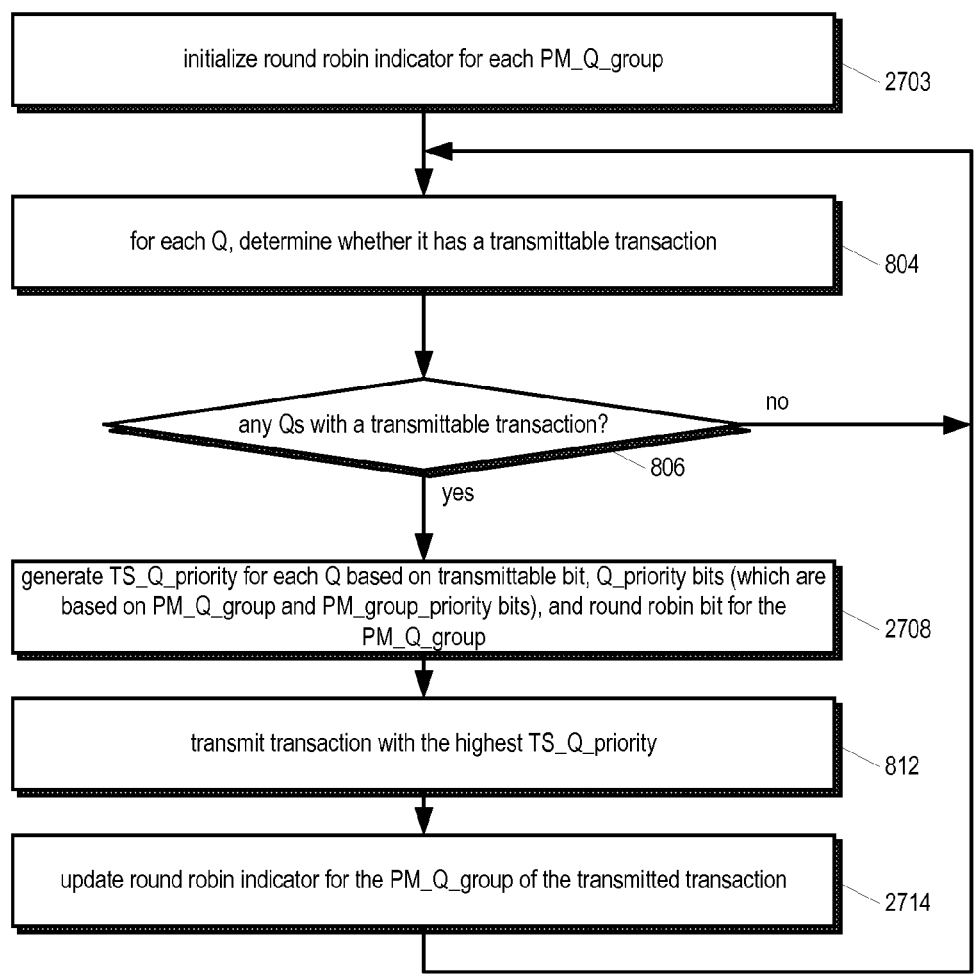
FIG. 17B is a flowchart illustrating operation of the transaction scheduler 602 of FIG. 17A according to the present invention.

Referring now to FIG. 17B, a flowchart illustrating operation of the transaction scheduler 602 of FIG. 17A according to the present invention is shown. Flow begins at block 2703.

At block 2703, the transaction scheduler 602 initializes each round-robin indicator for each transaction queue 106 group. Flow proceeds to block 804.

At block 804, the transaction scheduler 602 determines, for each transaction queue 106, whether the transaction queue 106 has a transmittable transaction 206. That is, the transmittable transaction logic 708 for each transaction queue 106 generates a value on the transmittable 746 signal. In one embodiment, the transmittable transaction logic 708 generates a true signal on the transmittable 746 signal only if the PM_Q_block 654 and empty 218 signals are false. Flow proceeds to decision block 806.

At decision block 806, the transaction scheduler 602 determines, by examining the transmittable 746 signal for each of the transaction queues 106, whether there are any transaction queues 106 that have a transmittable transaction 206. If not, flow returns to block 804 until at least one transaction queue 106 has a transmittable transaction 206; otherwise, flow proceeds to block 2708.

At block 2708, the transaction scheduler 602 generates the TS_Q_priority 208 for the transaction 206 of each transaction queue 106 based on the transmittable 746 bit of the transaction queue 106, the Q_priority 2752 of FIG. 17A of the transaction queue 106, and the round-robin bit 748 of the group of the transaction queue 106. As described above with respect to FIG. 17A, the mux 2704 generates the Q_priority 2752 for each transaction queue 106 based on the PM_Q_group 2604 of the transaction queue 106 and the PM_group_priority 2602 of FIG. 16 of the transaction queue's 106 group. Flow proceeds to block 812.

At block 812, the transaction scheduler 602 transmits the transaction 206 with the highest TS_Q_priority 208. In other words, the transaction scheduler 602 transmits the transaction from the transaction queue 106 that has a transmittable transaction and has the highest Q_priority 2752. That is, the transaction scheduler 602 transmits the transaction of a transaction queue 106 from the highest priority group containing a transmittable transaction queue 106. If multiple transmittable transaction queues 106 are in the highest priority group containing a transmittable transaction queue 106, the transaction scheduler 602 transmits the transaction from the transaction queue 106 whose turn it is to transmit as indicated by the round-robin bit 748 for the selected group. Flow proceeds to block 2714.

At block 2714, the round-robin logic 712 updates the round-robin indicator for the transaction queue 106 group to which the selected transaction queue 106 belongs. Flow returns to block 804.

Figure 18A:
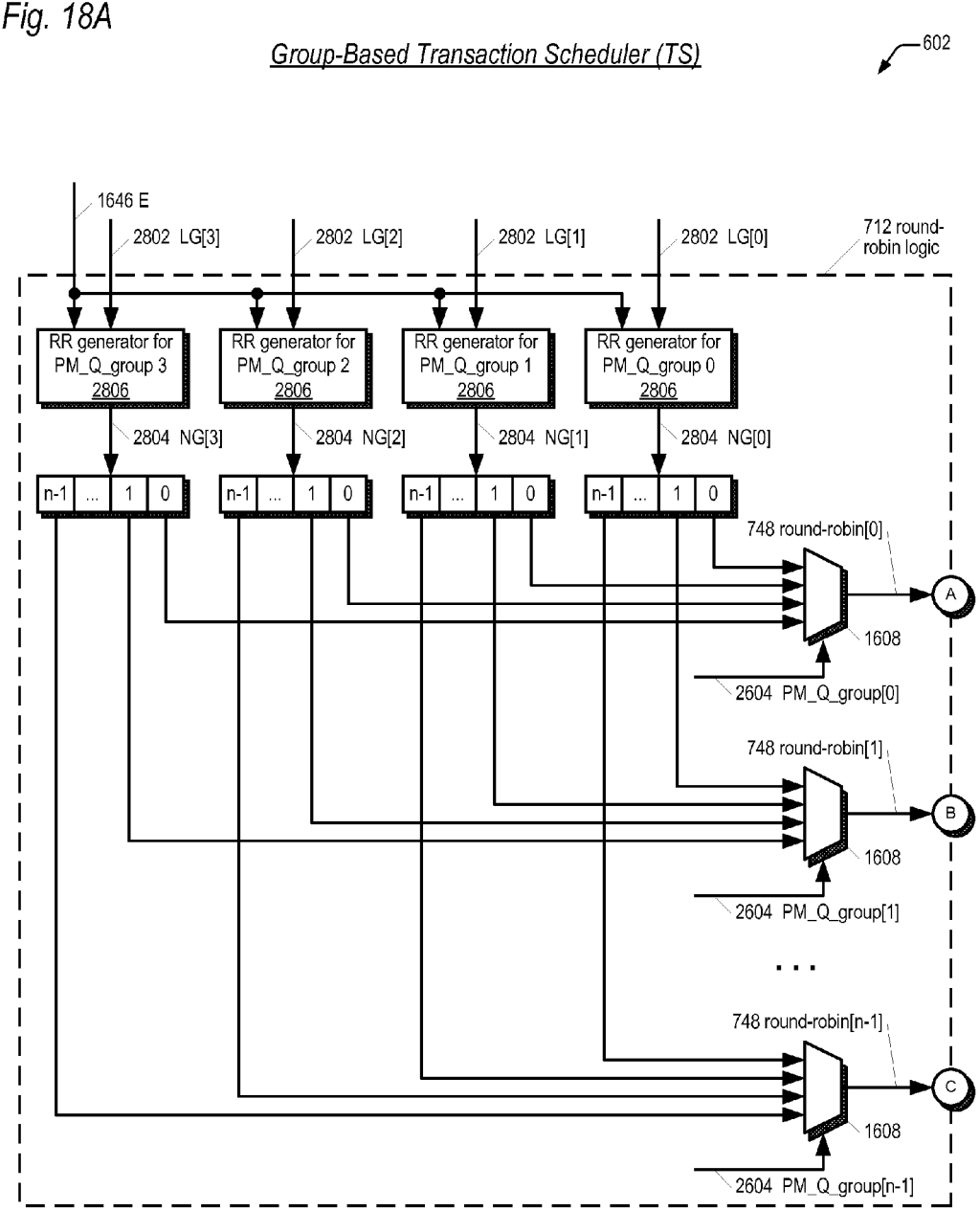
FIGS. 18A and 18B are a block diagram illustrating the transaction scheduler of FIG. 16 including round-robin logic of FIG. 17 according to one embodiment of the present invention.
Figure 18B:
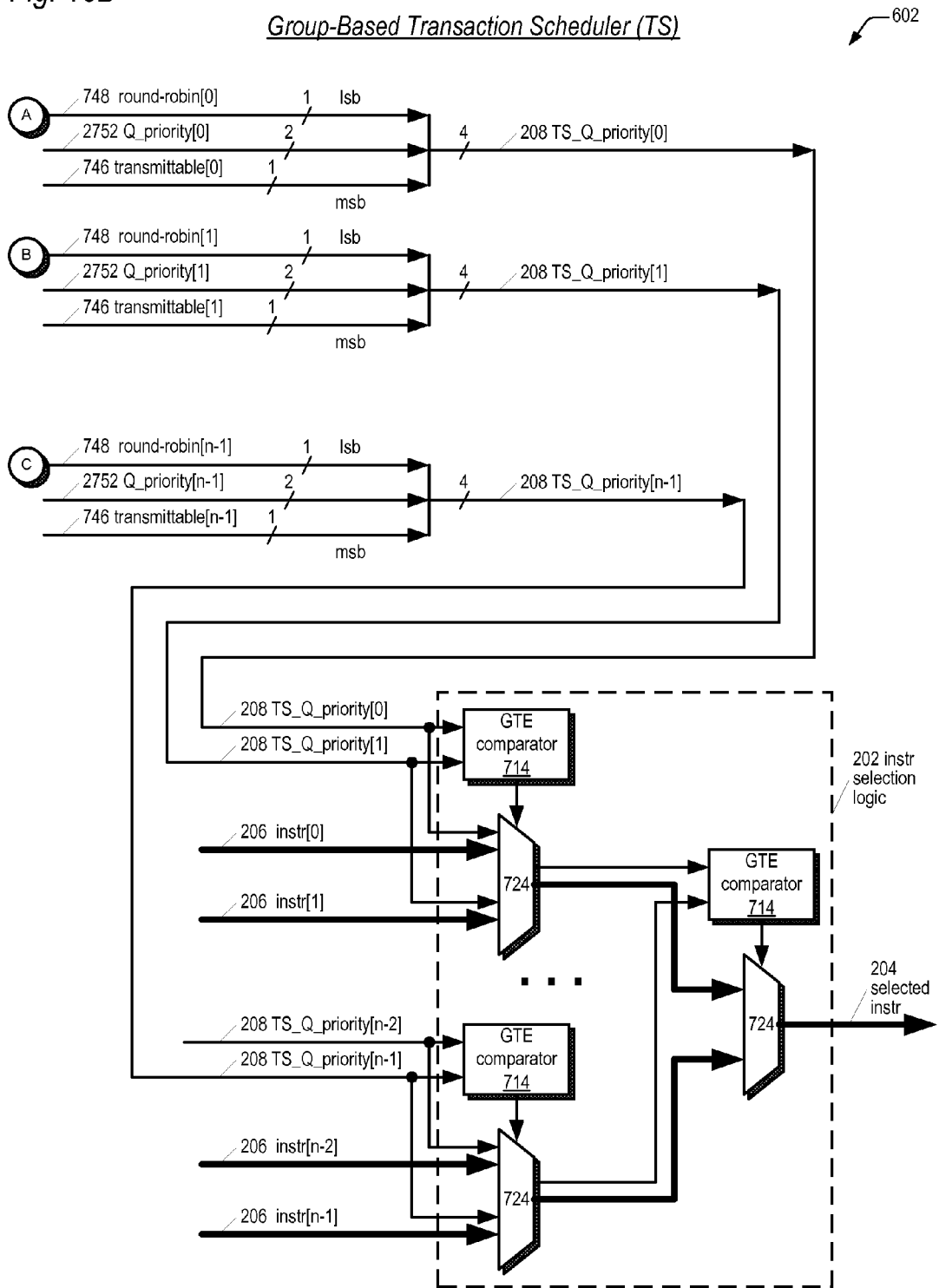

Referring now to FIG. 18, a block diagram illustrating the transaction scheduler 602 of FIG. 16 including round-robin logic 712 of FIG. 17A according to one embodiment of the present invention is shown. FIG. 18 comprises FIGS. 18A and 18B.

FIG. 18A illustrates the round-robin logic 712 of FIG. 17A according to one embodiment of the present invention. The round-robin logic 712 of FIG. 18A is similar to the round-robin logic 712 of FIG. 6A; however, the round-robin logic 712 of FIG. 18A includes four round-robin generators 2806: one for each of the four transaction queue 106 groups. Each of the round-robin group generators 2806 receives the E vector 1646 of FIG. 6. However, each of the round-robin generators 2806 also receives an LG vector 2802 that is unique to the corresponding transaction queue 106 group, rather than to the corresponding PM_Q_priority 652 of the embodiment of FIG. 6. That is, there is an LG vector 2802 for each of the four groups. Otherwise, the LG vectors 2802 are similar to the L vectors 1602 of FIG. 6. That is, the LG vectors 2802 are also n-bit vectors, where n is the number of transaction queues 106 and each of the transaction queues 106 has a corresponding bit in each of the four LG vectors 2802. A set bit in an LG vector 2802 indicates that the corresponding transaction queue 106 was the last transaction queue 106 in the corresponding transaction queue 106 group actually selected for transaction transmitting by the transaction scheduler 602. Thus, for example, if the number of transaction queues 106 is eight, an LG vector 2802 value of 00000100 for transaction queue 106 group 1 indicates transaction queue 2 106 was the last transaction queue 106 transmitted in transaction queue 106 group 1. In one embodiment, the LG vector 2802 is generated by the transaction selection logic 202 and stored for provision to the round-robin logic 712. In one embodiment, each LG vector 2802 is updated only when the transaction scheduler 602 selects for transmission a transaction from a transaction queue 106 in the corresponding transaction queue 106 group. Thus, advantageously, the LG vector 2802 is maintained for each transaction queue 106 group so that round-robin fairness is accomplished within each transaction queue 106 group independent of the other transaction queue 106 groups.

Each of the round-robin generators 2806 generates an NG vector 2804 that is unique to the corresponding transaction queue 106 group. The NG vectors 2804 are also n-bit vectors, where n is the number of transaction queues 106 and each of the transaction queues 106 has a corresponding bit in each of the four NG vectors 2804. A set bit in an NG vector 2804 indicates that the corresponding transaction queue 106 is the next transaction queue 106 in round-robin order to be selected in the corresponding transaction queue 106 group.

The round-robin logic 712 includes n four-input muxes 1608: one for each of the n transaction queues 106, similar to FIG. 6. Each mux 1608 receives its corresponding bit from each of the four NG vectors 2804. That is, the mux 1608 for transaction queue 0 106 receives bit 0 from each of the NG vectors 2804; mux 1608 for transaction queue 1 106 receives bit 1 from each of the NG vectors 2804; and so forth, to the mux 1608 for transaction queue 106 n−1 that receives bit n−1 from each of the NG vectors 2804. Each mux 1608 also receives as a select control input the PM_Q_group 2604 value for its respective transaction queue 106. Each of the muxes 1608 selects the input specified by the PM_Q_group 2604 value. The output of each of the muxes 1608 is the corresponding round-robin bit 748 of FIG. 17A. The round-robin bits 748 are provided to the selection logic 202 of FIG. 18B.

Referring now to FIG. 18B, the round-robin bit 748 of each transaction queue 106 is combined with its corresponding Q_priority 2752 bits of FIG. 17A and transmittable bit 746 to form its corresponding TS_Q_priority 208 of FIG. 17A. FIG. 18B also includes the selection logic 202 of FIG. 17A. In one embodiment, the comparators 714 of FIG. 17A are greater-than-or-equal (GTE) comparators. That is, the GTE comparators 714 compare the two TS_Q_priority 208 input values and if the top value is greater-than-or-equal to the lower value, the GTE comparator 714 outputs a control signal to cause its respective mux 724 to select the top value. The selection logic 202 is configured such that the top value always corresponds to a lower enumerated transaction queue 106, i.e., a transaction queue 106 which has a bit in the LG vectors 2802, NG vectors 2804, and E vector 1646 that is more to the right, i.e., a less significant bit, than the bottom value. Thus, for example, in FIG. 18B, one of the comparators 714 receives the TS_Q_priority 208 for transaction queue 0 106 and transaction queue 1 106; if the TS_Q_priority 208 for transaction queue 0 106 is greater than or equal to the TS_Q_priority 208 for transaction queue 1 106, then the comparator 714 will control its mux 724 to select the transaction 206 and TS_Q_priority 208 for transaction queue 0 106; otherwise (i.e., only if the TS_Q_priority 208 for transaction queue 0 106 is less than the TS_Q_priority 208 for transaction queue 1 106), the comparator 714 will control its mux 724 to select the transaction 206 and TS_Q_priority 208 for transaction queue 1 106.

Figure 19:
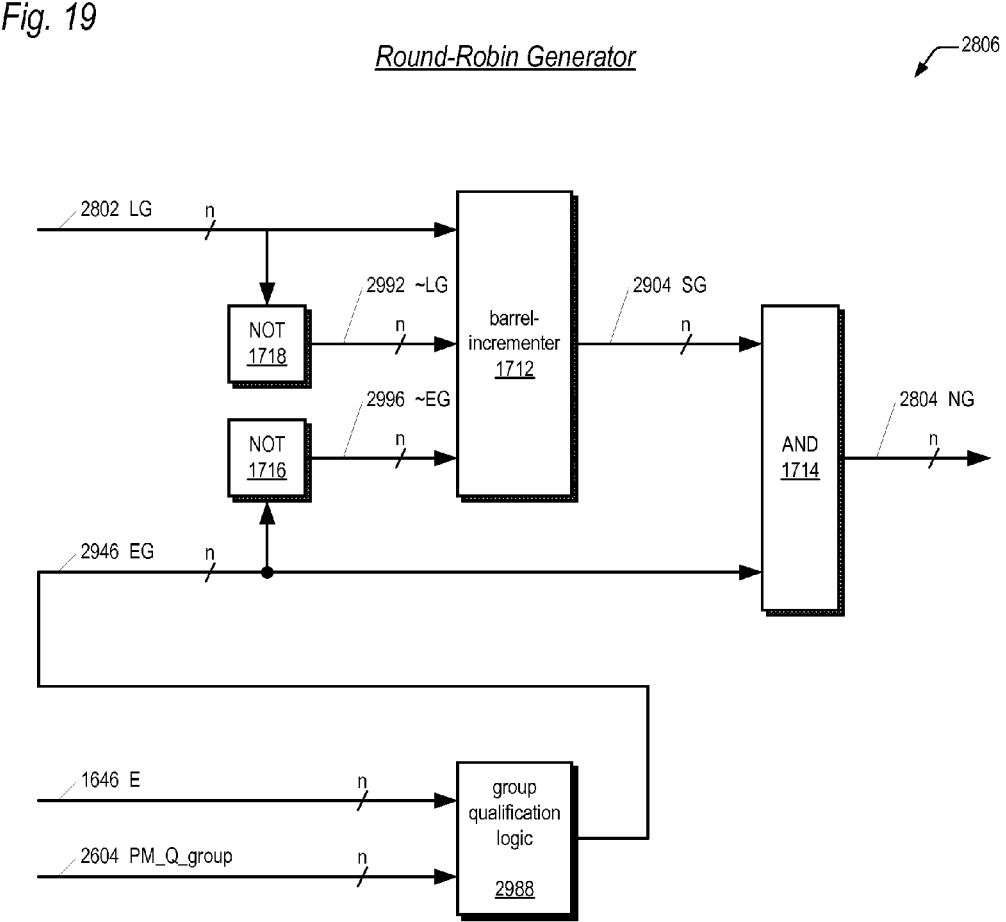
FIG. 19 is a block diagram illustrating a round-robin generator of FIG. 18 according to one embodiment of the present invention.

Referring now to FIG. 19, a block diagram illustrating a round-robin generator 2806 of FIG. 18 according to one embodiment of the present invention is shown. Although only one round-robin generator 2806 is shown in FIG. 19, the transaction scheduler 602 comprises one round-robin generator 2806 for each transaction queue 106 group, as shown in FIG. 18A. The round-robin generator 2806 of FIG. 19 is similar to the round-robin generator 1606 of FIG. 7, except as denoted below.

The round-robin generator 2806 includes a first set of inverters 1718 that receive the LG vector 2802 of FIG. 18 and generate an n-bit ~LG vector 2992. The round-robin generator 2806 also includes a second set of inverters 1716 that receive an EG vector 2946 and generate an n-bit ~EG vector 2996.

The round-robin generator 2806 also includes group qualification logic 2988 that receives the E vector 1646 of FIG. 6 and PM_Q_group signals 2604. In response thereto, the group qualification logic 2988 generates the EG vector 2946. The group qualification logic 2988 masks off each transaction queue's 106 bit of the E vector 1646 that is not included in the transaction queue 106 group associated with the respective round-robin generator 2806. Consequently, the round-robin generator 2806, and particularly the barrel-incrementer 1712, will skip any transaction queue 106 that does not belong to the transaction queue 106 group when calculating the next transaction queue 106 in round-robin order for the transaction queue 106 group.

The round-robin generator 2806 also includes a barrel-incrementer 1712 that receives the LG vector 2802, the ~LG vector 2992, and the ~EG vector 2996. The barrel-incrementer 1712 generates an SG vector 2904, which is the sum of the LG vector 2802 rotated left 1-bit and the Boolean AND of the ~EG vector 2996 and the ~LG vector 2992, according to two embodiments, as described above with respect to FIGS. 8A and 8B. In two other embodiments, the barrel-incrementer 1712 generates an SG vector 2904, which is the sum of the LG vector 2802 rotated left 1-bit and the ~EG vector 2996, as described above with respect to FIGS. 8C and 8D.

The round-robin generator 2806 also includes a set of AND gates 1714 that perform the Boolean AND of the SG vector 2904 and the EG vector 2946 to generate the NG vector 2804 of FIG. 18.

Figure 20:
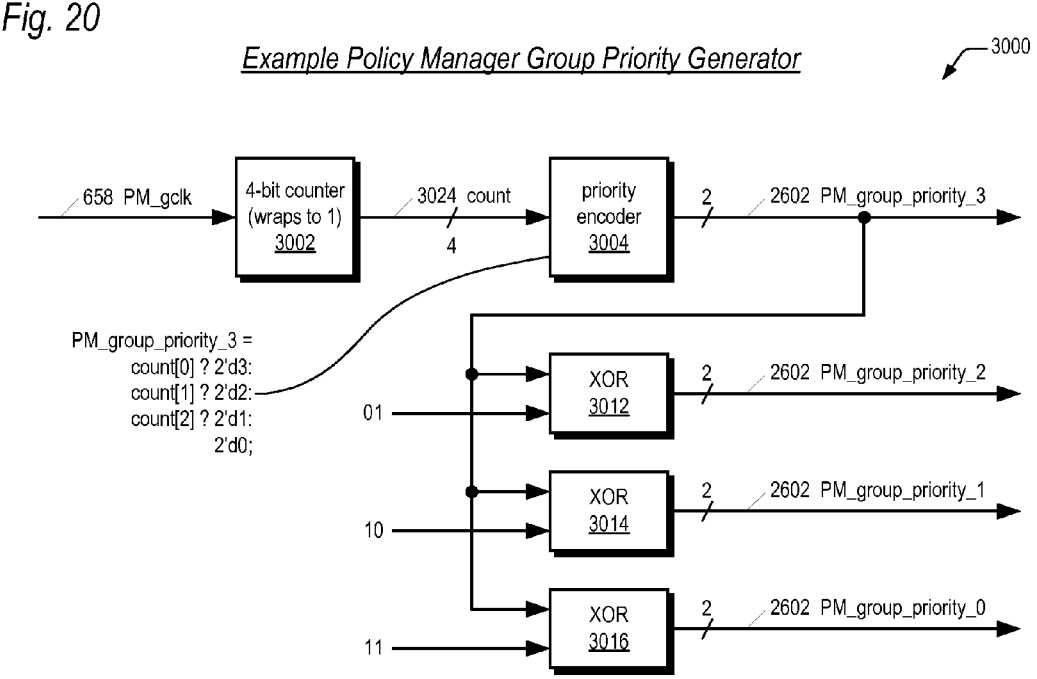
FIG. 20 is a block diagram illustrating an example of logic for generating the PM_group_priority signals within a policy manager of FIG. 16 according to the present invention.

Referring now to FIG. 20, a block diagram illustrating an example of logic for generating the PM_group_priority 2602 signals within a policy manager 604 of FIG. 16 according to the present invention is shown. The group priority generator 3000 embodiment of FIG. 20 comprises a reference design provided with a switch core that may be used in applications where appropriate or modified as needed for other applications. It should be understood that the embodiment shown in FIG. 20 is provided as an illustration of one method of dynamically generating PM_group_priorities 2602, but that within the general notion of providing an interface that enables a policy manager 604 to specify groups of transaction queues 106 and to specify a priority for each group, many methods of dynamically generating PM_group_priorities 2602 to meet the needs of a particular application may be employed. What should be appreciated is that by maintaining round-robin order within a group of transaction queues 106 (rather than within priority level) whose priority level as a group may change frequently (e.g., each clock cycle), but in which the population of the groups changes relatively infrequently (e.g., every 100 or more clock cycles), the invention provides the ability to maintain round-robin order fairness and to effectively interleave transactions of multiple transaction queues 106 to accomplish desired quality-of-service requirements and to avoid starvation of low priority transaction queues 106.

The group priority generator 3000 includes a 4-bit counter 3002 that receives an input clock signal and generates a 4-bit count 3024 in response to the input clock. In the embodiment of FIG. 20, the input clock signal is the PM_gclk signal 658 of FIG. 3 provided by the switch core 606. The counter 3002 counts up, i.e., increments, each input clock cycle. The counter 3002 counts up on count 3024 from a binary 0001 to a binary value 1111 and wraps back to a binary 0001 value. In one embodiment, the clock input to the counter 3002 is qualified with the Boolean OR of the PM_Q_transaction_transmitted signals 644 of FIG. 16; that is, the policy manager 604 group priority generator 3000 only changes the PM_group_priorities 2602 if the transaction scheduler 602 actually transmits a transaction.

The counter 3002 count 3024 output is provided to a priority encoder 3004. The priority encoder 3004 generates the two-bit PM_group_priority_3 value 2602 of FIG. 16 according to the following equation:

PM_group_priority_3=count[0]?2'd3:

count[1]?2'd2:

count[2]?2'd1:

2'd0;

The group priority generator 3000 also includes three two-input XOR gates 3012/3014/3016 that generate the PM_group_priority_2 2602, PM_group_priority_1 2602 and PM_group_priority_0 2602 signals, respectively. Each of the XOR gates 3012/3014/3016 receives on one input the PM_group_priority_3 2602 output of the priority encoder 3004. XOR gate 3012 receives on its second input a binary 01 value; XOR gate 3014 receives on its second input a binary 10 value; and XOR gate 3016 receives on its second input a binary 11 value.

The group priority generator 3000 generates the resulting PM_group_priority 2602 values shown in the table of FIG. 20. The table includes 15 rows specifying 15 consecutive cycles of the PM_gclk 658. The table includes 4 adjacent columns specifying which of the four groups of transaction queues 106 occupies each of the four group priority levels. The four groups are denoted G0, G1, G2, and G3. In particular, in cycles 1, 3, 5, 7, 9, 11, 13, and 15, G3 is at group priority level 3 (highest priority), G2 is at priority 2, G1 is at priority 1, and G0 is at priority 0 (lowest priority); in cycles 2, 6, 10, and 14, G2 is at priority 3, G3 is at priority 2, G0 is at priority 1, and G1 is at priority 0; in cycles 4 and 12, G1 is at priority 3, G0 is at priority 2, G3 is at priority 1, and G2 is at priority 0; and in cycle 8, G0 is at priority 3, G1 is at priority 2, G2 is at priority 1, and G3 is at priority 0.

As may be observed from the table of FIG. 20, by varying the instantaneous (i.e., cycle by cycle) group priorities specified on the PM_group_priority 2602 signals over a period of clock cycles, the policy manager 604 accomplishes a long-term, or aggregate, group priority for each transaction queue 106 group to provide more transaction transmit bandwidth to transaction queues 106 in some groups than others. In particular, the long-term group priority of G3 is greater than G2, the long-term group priority of G2 is greater than G1, and the long-term group priority of G1 is greater than G0, which is lowest long-term priority. That is, the scheduling policy enforced by the policy manager 604 of FIG. 20 intends to give the transaction queues 106 of G3 more transaction transmit bandwidth than the transaction queues 106 of G2, and G2 more bandwidth than G1, and G1 more bandwidth than G0. In particular, G3 is highest priority 8 of 15 clock cycles, G2 is highest priority 4 of 15 clock cycles, G1 is highest priority 2 of 15 clock cycles, and G0 is highest priority 1 of 15 clock cycles. More generally, each successive higher long-term priority group is given the highest instantaneous priority level twice as many clock cycles as its next adjacent lower group.

As may be further observed from the table of FIG. 20, a policy manager 604 that interleaves group priorities on a cycle by cycle basis—one example of which is shown in FIG. 20—advantageously tends to minimize the number of instances that transactions from the same transaction queue 106 are transmitted back to back. Additionally, the fact that the round-robin generators 2806 of FIG. 18 (and the round-robin generators 3106 of FIG. 21 below) maintain round-robin order within groups of transaction queues 106 further tends to minimize the number of instances that transactions from the same transaction queue 106 are transmitted back to back. In summary, the transaction selector 108 of FIG. 16 advantageously provides a mechanism for distributing the transaction transmit bandwidth in a port 102 between transaction queues 106 of different relative long-term priorities such that relatively low long-term priority transaction queues 106 are given some transaction transmit bandwidth to avoid starvation, while relatively high priority transaction queues 106 are given more bandwidth but are still interleaved with other transaction queues 106 so that the quality-of-service requirements may be achieved.

Figure 21:
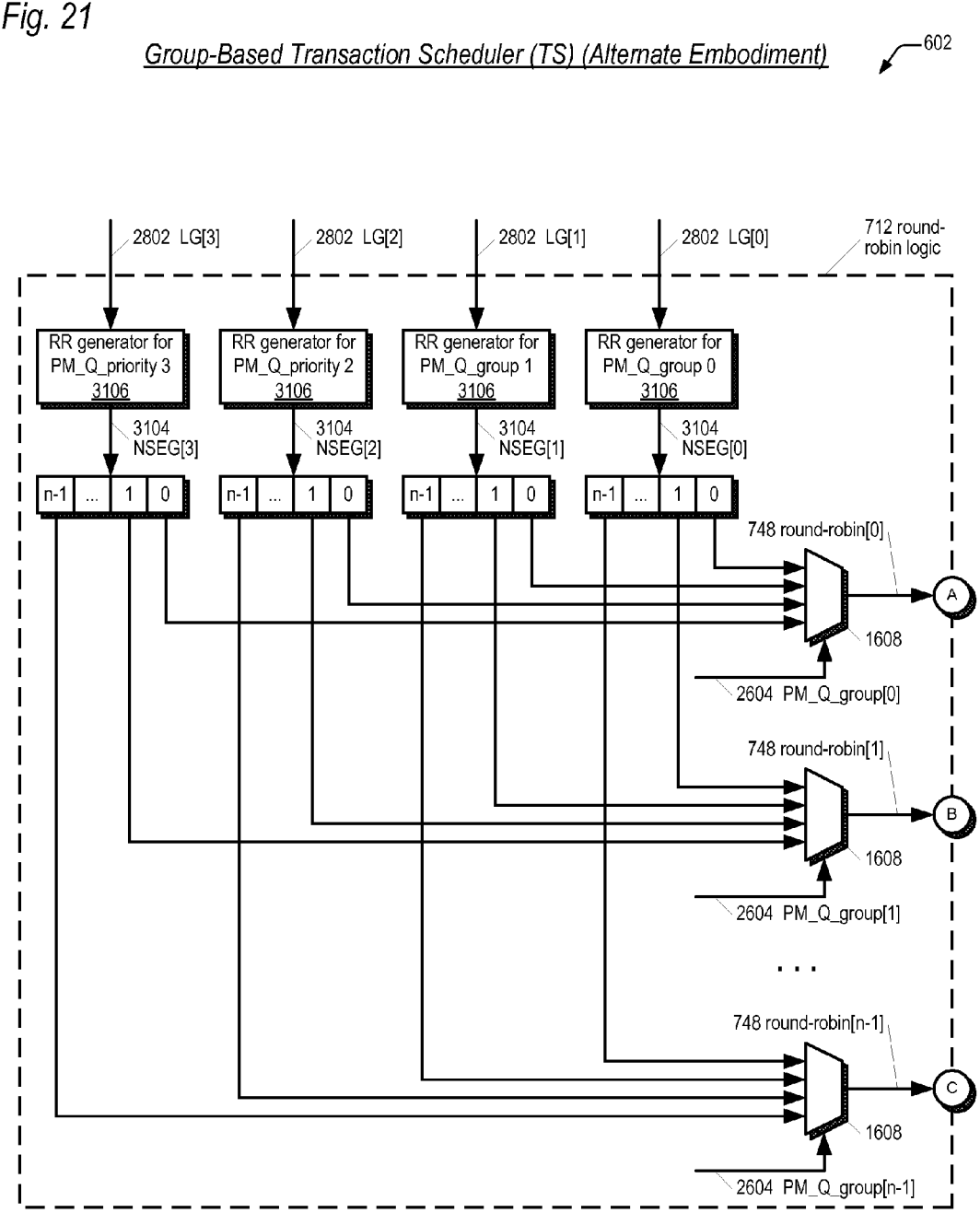
FIG. 21 is a block diagram illustrating the transaction scheduler of FIG. 16 including round-robin logic of FIG. 17 according to an alternate embodiment of the present invention.

Referring now to FIG. 21, a block diagram illustrating the transaction scheduler 602 of FIG. 16 including round-robin logic 712 of FIG. 17A according to an alternate embodiment of the present invention is shown. The transaction scheduler 602 of FIG. 21 is similar to the transaction scheduler 602 of FIG. 18, except the round-robin generators 3106 of FIG. 21 are different from the round-robin generators 2806 of FIG. 18, as described herein. The portion of the transaction scheduler 602 shown in FIG. 18B is similar to a like portion of the alternate embodiment of FIG. 21, and is therefore not duplicated in the Figures.

In one aspect, the round-robin generators 3106 of FIG. 21 are different from the round-robin generators 2806 of FIG. 18 because they do not receive the E vector 1646. In another aspect, the round-robin generators 3106 each generate a corresponding NSEG vector 3104, rather than the NG vector 2804 generated by the round-robin generators 2806 of FIG. 18. The NSEG vectors 3104 are similar to the NG vectors 2804, however, the NSEG vectors 3104 are sign-extended; thus, the NSEG vectors 3104 are not 1-hot. Consequently, by design, two or more transaction queues 106 may have an equal highest TS_Q_priority 208. The greater-than-or-equal comparators 714 of FIG. 18B work in conjunction with the round-robin bits 748 selected from the NSEG vectors 3104 to select the desired round-robin transaction queue 106 from the transaction queue 106 group having the highest PM_group_priority 2602 and at least one transaction queue 106 with a transmittable transaction, as described above with respect to FIG. 17B. For example, assume the NSEG vector 3104 in one of the transaction queue 106 groups is 11100. This value indicates that transaction queues 4, 3, and 2 have priority over transaction queues 1 and 0 with respect to round-robin order selection. If, for example, all of the transaction queues 106 are in this transaction queue 106 group, the GTE comparators 714 of the transaction scheduler 602 will search for a transmittable transaction queue 106 in the order 2, 3, 4, 0, 1. In this respect, the NSEG vectors 3104 operate similarly to the NSE vectors 2004 of FIG. 10, except within transaction queue 106 groups rather than within transaction queue 106 priority level.

Figure 22:
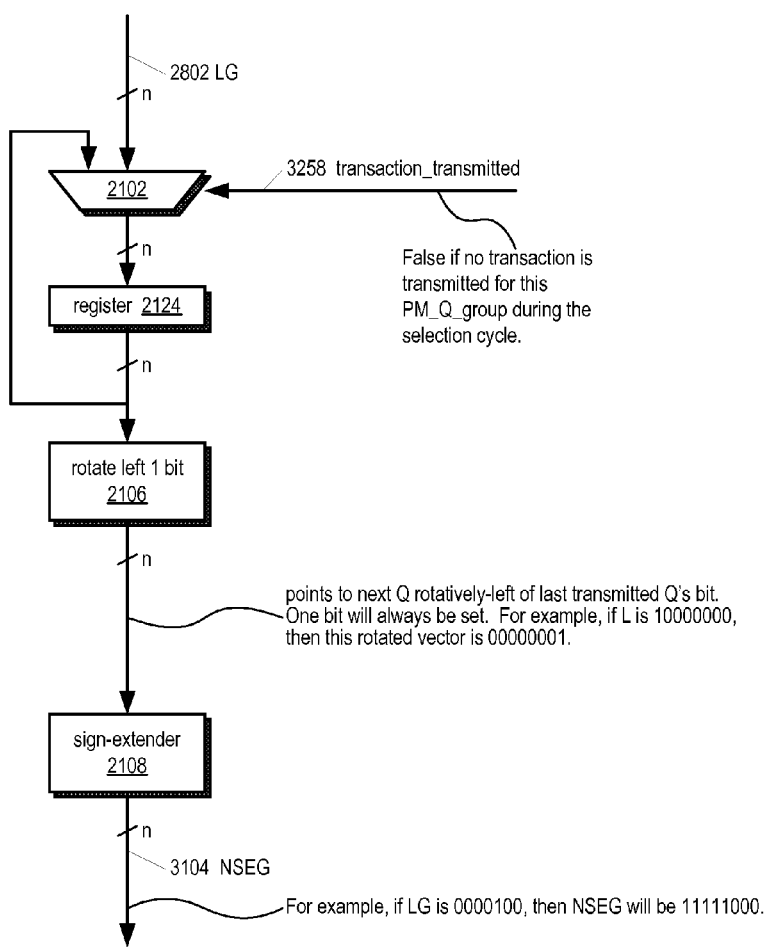
FIG. 22 is a block diagram illustrating the round-robin generator of FIG. 21 according to an alternate embodiment of the present invention.

Referring now to FIG. 22, a block diagram illustrating the round-robin generator 3106 of FIG. 21 according to an alternate embodiment of the present invention is shown. Although only one round-robin generator 3106 is shown in FIG. 22, the transaction scheduler 602 comprises one round-robin generator 3106 for each transaction queue 106 group, as shown in FIG. 21. An advantage of the alternate embodiment of the round-robin generator 3106 of FIG. 22 that employs the sign-extended character of the NSEG vector 3104 is that the NSEG vectors 3104 may be calculated independent of the E vector 1646, i.e., independent of the transaction transmitability of the transaction queues 106, unlike the round-robin generator 2806 embodiment of FIG. 18.

The round-robin generator 3106 includes a mux 2102 that receives as its two inputs the LG vector 2802 and the output of a register 2124. The register 2124 receives and stores the output of the mux 2102. The mux 2102 also receives a transaction_transmitted control signal 3258 that is true if a transaction is transmitted from the corresponding transaction queue 106 group during the current transmission cycle; otherwise, the transaction_transmitted control signal 3258 is false. In one embodiment, the transaction_transmitted signal 3258 may be false for all transaction queue 106 groups, such as if no transaction queues 106 have a transmittable transaction. The mux 2102 selects the LG vector 2802 input if the transaction_transmitted control signal 3258 is true; otherwise, the mux 2102 selects the register 2124 output. Thus, mux 2102 and register 2124 work in combination to retain the old LG vector 2802 value until a transaction is transmitted by the transaction scheduler 602 from a transaction queue 106 in the corresponding transaction queue 106 group. Thus, advantageously, round-robin order is retained within the transaction queue 106 group independent of the other transaction queue 106 groups.

The round-robin generator 3106 also includes a rotate left 1-bit function 2106 configured to receive and rotate the output of the register 2124 left 1-bit. Hence, the output of the rotate left 1-bit function 2106 is a 1-hot vector pointing to the transaction queue 106 rotatively-left of the last transmitted transaction queue 106 bit. For example, if n is 8, and if the LG vector 2802 value is 10000000, then the output of the rotate left 1-bit function 2106 is 00000001.

The round-robin generator 3106 also includes a sign-extender 2108 configured to receive the output of the rotate left 1-bit function 2106 and to sign-extend it to generate the NSEG vector 3104 of FIG. 21. For example, if the LG vector 2802 value is 00000100, then the output of the sign-extender 2108 is 11111000. In one embodiment, the rotate left 1-bit function 2106 does not include any active logic, but simply comprises signal wires routed appropriately from the register 2124 output to the sign-extender 2108 input to accomplish the 1-bit left rotation.

Referring now to FIG. 23, a block diagram illustrating a second example of logic for generating the PM_group_priority 2602 signals within a policy manager 604 of FIG. 16 according to the present invention is shown. The group priority generator 3300 embodiment of FIG. 23 comprises a reference design provided with a switch core which may be used in applications where appropriate or modified as needed for other applications. It should be understood that the embodiment shown in FIG. 23 is provided as an illustration of one method of dynamically generating PM_group_priorities 2602, but that within the general notion of providing an interface that enables a policy manager 604 to specify groups of transaction queues 106 and to specify a priority for each group, many methods of dynamically generating PM_group_priorities 2602 to meet the needs of a particular application may be employed. What should be appreciated is that by maintaining round-robin order within a group of transaction queues 106 (rather than within priority level) whose priority level as a group may change frequently (e.g., each clock cycle), but in which the population of the groups changes relatively infrequently (e.g., every 100 or more clock cycles), the invention provides the ability to maintain round-robin order fairness and to effectively interleave transactions of multiple transaction queues 106 to accomplish desired quality-of-service requirements and to avoid starvation of low priority transaction queues 106.

A distinction between the group priority generator 3300 of FIG. 23 and the group priority generator 3000 of FIG. 20 is that the group priority generator 3300 of FIG. 23 takes into account the number of transmittable transaction queues 106 in the highest priority group and holds off rotating the priorities among the transaction queue 106 groups until each transmittable transaction queue 106 in the highest priority group has had its opportunity in the round-robin order to transmit a transaction. In other words, the group priority generator 3300 of FIG. 23 holds off updating the PM_group_priority 2602 values until each transmittable transaction queue 106 in the group with the highest PM_group_priority 2602 has had its opportunity to have the highest TS_Q_priority 208, which comprises the transaction queue 106 group priority (via the Q_priority 2752) and the round-robin bit 748. By holding off updating the group priorities until each transmittable transaction queue 106 in the highest priority group has its opportunity to transmit a transaction, the group priority generator 3300 of FIG. 23 advantageously maintains the desired relative transaction transmit bandwidth between the various transaction queue 106 groups even in situations where the number of transmittable transaction queues 106 in each group is not equal, as illustrated below.

The group priority generator 3300 includes a 4-bit counter 3002 that receives a rotate signal 3322 and generates a 4-bit count 3024 in response to the rotate signal 3322. The group priority generator 3300 also includes group priority rotation hold logic 3318, which generates the rotate signal 3322 in response to an input clock qualified by other signals, as described below. In the embodiment of FIG. 23, the input clock signal to the group priority rotation hold logic 3318 is the PM_gclk signal 658 of FIG. 3 provided by the switch core 606. The counter 3002 counts up, i.e., increments, each time the rotate signal 3322 cycles. The counter 3002 counts up on count 3024 from a binary 0001 to a binary value 1111 and wraps back to a binary 0001 value. In one embodiment, the clock input to the group priority rotation hold logic 3318 is qualified with the Boolean OR of the PM_Q_transaction_transmitted signals 644 of FIG. 16; that is, the policy manager 604 group priority generator 3300 only changes the PM_group_priorities 2602 if the transaction scheduler 602 actually transmits a transaction.

The group priority rotation hold logic 3318 also receives the PM_group_priority signals 2602, the PM_Q_group signals 2604 for each transaction queue 106, and the transmittable signals 746 for each transaction queue 106. Potentially, each tick of PM_gclk 658, the rotation hold logic 3318 generates a tick on the rotate signal 3322; however, if the PM_group_priority signals 2602, the PM_Q_group signals 2604, and the transmittable signals 746 indicate the number of transmittable transaction queues 106 for the currently highest priority group is greater than one, then the group priority rotation hold logic 3318 holds—i.e., does not generate a tick on—the rotate signal 3322 for a number of ticks of the PM_gclk 658 signal equal to the number of transmittable transaction queues 106 for the currently highest priority group. Consequently, as shown in the example of FIG. 24 below, the group priority rotation hold logic 3318 advantageously causes the desired relative transaction transmit bandwidth between the various transaction queue 106 groups to be maintained in situations where the number of transmittable transaction queues 106 in each group is not equal.

The counter 3002 count 3024 output is provided to a priority encoder 3304. The priority encoder 3304 generates the two-bit PM_group priority value 2602 of FIG. 16 for each of the four transaction queue 106 groups according to the following equations:

PM_group_priority_3=count[0]|count[1]|count[2], count[0];

PM_group_priority_2=count==4'b1001?2'b01: (~count[3]&~count[2]|~count[2]&~count[1] |count[1]^count[0]),(count[2]&count[1]|count[1] &~count[0]);

PM_group_priority_1=~G2_priority;

PM_group_priority_0=~G3_priority;

The group priority generator 3300 generates the resulting PM_group_priority 2602 values shown in the table of FIG. 23. The table includes 15 rows specifying the 15 consecutive values of the count 3024. The table includes 4 adjacent columns specifying the priority of each of the four transaction queue 106 groups. The four priorities are denoted P0, P1, P2, and P3. In particular, when the count 3024 is 4'b0001, 4'b0011, 4'b0101, 4'b1011, or 4'b1101, group 3 is at P3 (highest priority), group 2 is at P2, group 1 is at P1, and group 0 is at P0 (lowest priority); when the count 3024 is 4'b0010, 4'b0110, 4'b1010, or 4'b1110, group 3 is at P2, group 2 is at P3, group 1 is at P0, and group 0 is at P1; when the count 3024 is 4'b0100 or 4'b1100, group 3 is at P2, group 2 is at P0, group 1 is at P3, and group 0 is at P1; when the count 3024 is 4'b0111, 4'b1001, or 4'b1111, group 3 is at P3, group 2 is at P1, group 1 is at P2, and group 0 is at P0; and when the count 3024 is 4'b1000, group 3 is at P0, group 2 is at P2, group 1 is at P1, and group 0 is at P3.

As may be observed from the table of FIG. 23, by varying the instantaneous (i.e., cycle by cycle) group priorities specified on the PM_group_priority 2602 signals over a period of clock cycles, the policy manager 604 accomplishes a long-term, or aggregate, group priority for each transaction queue 106 group to provide more transaction transmit bandwidth to transaction queues 106 in some groups than others over the cycle of the count 3024. In particular, the long-term group priority of group 3 is greater than group 2, the long-term group priority of group 2 is greater than group 1, and the long-term group priority of group 1 is greater than group 0, which is lowest long-term priority. That is, the scheduling policy enforced by the policy manager 604 of FIG. 23 intends to give the transaction queues 106 of group 3 more transaction transmit bandwidth than the transaction queues 106 of group 2, and group 2 more bandwidth than group 1, and group 1 more bandwidth than group 0. In particular, group 3 is highest priority 8 of 15 count 3024 values, group 2 is highest priority 4 of 15 count 3024 values, group 1 is highest priority 2 of 15 count 3024 values, and group 0 is highest priority 1 of 15 count 3024 values. More generally, each successive higher long-term priority group is given the highest instantaneous priority level twice as many count 3024 values as its next adjacent lower group. Furthermore, the 2:1 ratio between adjacent groups is maintained across all count 3024 values. That is, group n+1 is given a higher instantaneous priority level twice as many count 3024 values as group n. In particular, group 3 is given a higher instantaneous priority level than group 2 in 10 of 15 count 3024 values, whereas group 2 is given a higher instantaneous priority level than group 3 in 5 of 15 count 3024 values; similarly, group 2 is given a higher instantaneous priority level than group 1 in 10 of 15 count 3024 values, whereas group 1 is given a higher instantaneous priority level than group 2 in 5 of 15 count 3024 values; and group 1 is given a higher instantaneous priority level than group 0 in 10 of 15 count 3024 values, whereas group 0 is given a higher instantaneous priority level than group 1 in 5 of 15 count 3024 values. In other words, each transaction queue 106 in group n+1 is given 100% more transaction transmit bandwidth than each transaction queue 106 in group n. Furthermore, group n+2 is given a higher instantaneous priority level four times as many count 3024 values as group n. In other words, each transaction queue 106 in group n+2 is given 300% more transaction transmit bandwidth than each transaction queue 106 in group n. Finally, group n+3 is given a higher instantaneous priority level fourteen times as many count 3024 values as group n. In other words, each transaction queue 106 in group n+3 is given 1300% more transaction transmit bandwidth than each transaction queue 106 in group n.

Referring now to FIG. 24, a table 3400 illustrating operation of the logic 3300 of FIG. 23 in an example transaction queue 106 configuration of the switch 100 of FIG. 1 according to the present invention is shown. The example of FIG. 24 assumes a switch 100 having four transaction queues 106: group 3 and group 2 have zero transaction queues 106; group 1 has three transaction queues 106; and group 0 has one transaction queue 106. The example of FIG. 24 assumes each transaction queue 106 has a transmittable transaction each clock cycle. The table 3400 illustrates 35 sequential clock cycles of the PM_gclk input 658.

At cycle 1, the count 3024 has been initialized to 4'b0001, causing group 3 to be at P3, group 2 to be at P2, group 1 to be at P1, and group 0 to be at P0, according to the table of FIG. 23. Since group 1 is the highest priority group with a transmittable transaction queue 106, and group 1 has three transmittable transaction queues 106, the group priority rotation hold logic 3318 of FIG. 23 waits three ticks of the PM_gclk 658 to update the count 3024. Hence, during cycles 1 through 3, the count 3024 remains at 4'b0001 causing group 3 to remain at P3, group 2 to remain at P2, group 1 to remain at P1, and group 0 to remain at P0. Thus in cycles 1, 2, and 3, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 4, the count 3024 is 4'b0010, causing group 3 to be at P2, group 2 to be at P3, group 1 to be at P0, and group 0 to be at P1, according to the table of FIG. 23. Since group 0 is the highest priority group with a transmittable transaction queue 106, and group 0 has only one transmittable transaction queue 106, the group priority rotation hold logic 3318 generates a tick on rotate signal 3322 to cause the counter 3002 to update the count 3024.

At cycle 5, the count 3024 is 4'b0011, causing group 3 to be at P3, group 2 to be at P2, group 1 to be at P1, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 5 through 7, the count 3024 remains at 4'b0011 causing group 3 to remain at P3, group 2 to remain at P2, group 1 to remain at P1, and group 0 to remain at P0. Thus in cycles 5, 6, and 7, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 8, the count 3024 is 4'b0100, causing group 3 to be at P2, group 2 to be at P0, group 1 to be at P3, and group 0 to be at P1, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 8 through 10, the count 3024 remains at 4'b0100 causing group 3 to remain at P2, group 2 to remain at P0, group 1 to remain at P3, and group 0 to remain at P1. Thus in cycles 8, 9, and 10, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 11, the count 3024 is 4'b0101, causing group 3 to be at P3, group 2 to be at P2, group 1 to be at P1, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 11 through 13, the count 3024 remains at 4'b0101 causing group 3 to remain at P3, group 2 to remain at P2, group 1 to remain at P1, and group 0 to remain at P0. Thus in cycles 11, 12, and 13, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 14, the count 3024 is 4'b0110, causing group 3 to be at P2, group 2 to be at P3, group 1 to be at P0, and group 0 to be at P1, according to the table of FIG. 23. Since group 0 is the highest priority group with a transmittable transaction queue 106, and group 0 has only one transmittable transaction queue 106, the group priority rotation hold logic 3318 generates a tick on rotate signal 3322 to cause the counter 3002 to update the count 3024.

At cycle 15, the count 3024 is 4'b0111, causing group 3 to be at P3, group 2 to be at P1, group 1 to be at P2, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 15 through 17, the count 3024 remains at 4'b0111 causing group 3 to remain at P3, group 2 to remain at P1, group 1 to remain at P2, and group 0 to remain at P0. Thus in cycles 15, 16, and 17, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 18, the count 3024 is 4'b1000, causing group 3 to be at P0, group 2 to be at P2, group 1 to be at P1, and group 0 to be at P3, according to the table of FIG. 23. Since group 0 is the highest priority group with a transmittable transaction queue 106, and group 0 has only one transmittable transaction queue 106, the group priority rotation hold logic 3318 generates a tick on rotate signal 3322 to cause the counter 3002 to update the count 3024.

At cycle 19, the count 3024 is 4'b1001, causing group 3 to be at P3, group 2 to be at P1, group 1 to be at P2, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 19 through 21, the count 3024 remains at 4'b1001 causing group 3 to remain at P3, group 2 to remain at P1, group 1 to remain at P2, and group 0 to remain at P0. Thus in cycles 19, 20, and 21, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 22, the count 3024 is 4'b1010, causing group 3 to be at P2, group 2 to be at P3, group 1 to be at P0, and group 0 to be at P1, according to the table of FIG. 23. Since group 0 is the highest priority group with a transmittable transaction queue 106, and group 0 has only one transmittable transaction queue 106, the group priority rotation hold logic 3318 generates a tick on rotate signal 3322 to cause the counter 3002 to update the count 3024.

At cycle 23, the count 3024 is 4'b1011, causing group 3 to be at P3, group 2 to be at P2, group 1 to be at P1, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 23 through 25, the count 3024 remains at 4'b1011 causing group 3 to remain at P3, group 2 to remain at P2, group 1 to remain at P1, and group 0 to remain at P0. Thus in cycles 23, 24, and 25, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 26, the count 3024 is 4'b1100, causing group 3 to be at P2, group 2 to be at P0, group 1 to be at P3, and group 0 to be at P1, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 26 through 28, the count 3024 remains at 4'b1100 causing group 3 to remain at P2, group 2 to remain at P0, group 1 to remain at P3, and group 0 to remain at P1. Thus in cycles 26, 27, and 28, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 29, the count 3024 is 4'b1101, causing group 3 to be at P3, group 2 to be at P2, group 1 to be at P1, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 29 through 31, the count 3024 remains at 4'b1101 causing group 3 to remain at P3, group 2 to remain at P2, group 1 to remain at P1, and group 0 to remain at P0. Thus in cycles 29, 30, and 31, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

At cycle 32, the count 3024 is 4'b1110, causing group 3 to be at P2, group 2 to be at P3, group 1 to be at P0, and group 0 to be at P1, according to the table of FIG. 23. Since group 0 is the highest priority group with a transmittable transaction queue 106, and group 0 has only one transmittable transaction queue 106, the group priority rotation hold logic 3318 generates a tick on rotate signal 3322 to cause the counter 3002 to update the count 3024.

At cycle 33, the count 3024 is 4'b1111, causing group 3 to be at P3, group 2 to be at P1, group 1 to be at P2, and group 0 to be at P0, according to the table of FIG. 23. Since group 1 is the highest priority group with a transmittable transaction queue 106, and group 1 has three transmittable transaction queues 106, the group priority rotation hold logic 3318 waits three ticks of the PM_gclk 658 to update the count 3024. Hence, during cycles 33 through 35, the count 3024 remains at 4'b1111 causing group 3 to remain at P3, group 2 to remain at P1, group 1 to remain at P2, and group 0 to remain at P0. Thus in cycles 33, 34, and 35, each of the three transmittable transaction queues 106 in group 1, respectively, has an opportunity to be at highest group priority (and consequently at highest TS_Q_priority 208); thereafter, the group priority rotation hold logic 3318 generates a tick on rotate signal 3322 to cause the counter 3002 to update the count 3024.

As may be observed from FIG. 24, although there are only 15 possible count 3024 values, 35 cycles of the PM_gclk 658 are required to complete the full rotation of group priorities generated through the 15 possible count 3024 values. Of the 35 clock cycles, group 1 is higher priority than group 0 for 30 cycles and group 0 is higher priority than group 1 for 5 cycles. However, the transaction scheduler 602 of FIG. 17 will round-robin the three transaction queues 106 of group 1 such that each of the three transaction queues 106 will be highest TS_Q_priority 208 for 10 of the 30 cycles in which group 1 is highest group priority. That is, each of the three transaction queues 106 in group 1 will receive one-third of the transaction transmit bandwidth allocated to group 1. In particular, each transaction queue 106 in group 1 is given highest TS_Q_priority 208 28.6% of the clock cycles, and the transaction queue 106 in group 0 is given highest TS_Q_priority 208 14.3% of the clock cycles. That is, each of the three transaction queues 106 in group 1 will receive twice the transaction transmit bandwidth as the transaction queue 106 in group 0, according to the desired relative long-term priorities of all the transaction queues 106.

As may be further observed from FIGS. 23 and 24, a policy manager 604 that interleaves group priorities on a cycle by cycle basis—one example of which is shown in FIG. 23—advantageously tends to minimize the number of instances that transactions from the same transaction queue 106 are transmitted back to back. Additionally, the fact that the round-robin generators 2806 of FIG. 18 (and the round-robin generators 3106 of FIG. 21) maintain round-robin order within groups of transaction queues 106 further tends to minimize the number of instances that transactions from the same transaction queue 106 are transmitted back to back. In summary, the transaction selector 108 of FIG. 16 advantageously provides a mechanism for distributing the transaction transmit bandwidth in switch 100 between transaction queues 106 of different relative long-term priorities such that relatively low long-term priority transaction queues 106 are given some transaction transmit bandwidth to avoid starvation, while relatively high priority transaction queues 106 are given more bandwidth but are still interleaved with other transaction queues 106 so that the quality-of-service requirements may be accomplished. And the group priority generator 3300 of FIG. 23 has the further advantage of maintaining the desired relative long term priorities between the various transaction queue 106 groups even in situations where the number of transmittable transaction queues 106 in each group is not equal.

Although the present invention and its objects, features, and advantages have been described in detail, other embodiments are encompassed by the invention. For example, although embodiments have been described with four PM_TC_priority 652 levels, any number of priority levels may be employed. Furthermore, although a bifurcated transaction selector 108 embodiment has been described in which the policy manager 604 enforces a leaky-bucket scheduling policy, the bifurcated transaction selector 108 is not limited to a leaky-bucket transaction scheduling policy; rather, the transaction scheduling policy enforced by the policy manager of the bifurcated transaction selector 108 may be according to any transaction scheduling algorithm. Still further, although embodiments have been described in which four groups of transaction queues 106 and four group priorities exist, the transaction scheduler may be adapted to support any number of groups and group priorities as necessary to the particular application. In addition, although embodiments have been described with a bifurcated scheduler, the grouping and group priority method may be employed in a non-bifurcated scheduler.

An advantage of the present invention is that provides a single point of arbitration within a given port 102, namely the transaction selector 108, for allocating the output transmission bandwidth of the port 102 among the various requesting transaction queues 106 based on feedback of the number of transactions transmitted for each transaction queue 106 to guarantee that desired quality-of-service requirements are met, such as that no transaction queue 106 is starved for output transmission bandwidth. This is a particular advantage over a scheme in which a port relies on the requestors to specify a priority in the transactions themselves. Such a scheme would suffer from the inability to guarantee that desired quality-of-service requirements are met for each requester and possible starvation if one or more requestors were to send an abundance of highest priority transactions, particularly where there is no feedback to each of the requesters about the requested priorities or transactions transmitted for each requestor. In contrast, as can be seen from the embodiments described, the present invention avoids starvation and accomplishes quality-of-service guarantee capabilities by providing a single point of control that assigns priorities based on a history of completed transactions, rather than based on priorities specified with the transactions.

Additionally, the transaction selector 108 advantageously performs the selection of which transaction queue 106 to transmit with extremely low latency, and in the particular embodiments described, within a single clock cycle. This is particularly an advantage over a scheme in which the priorities are software-programmed, since the software programming requires a much larger latency and may consume relatively large amounts of software bandwidth to program the priorities.

Still further, each port may advantageously employ a transaction selector 108 with a different transaction bandwidth scheduling policy to meet the needs and characteristics of the particular port 102, typically based on the type of device coupled to the port 102.

Finally, the bifurcated nature of the transaction selector 108 enables the switch 100 core designer to more easily test and validate the switch 100 core, thereby making the switch 100 core reusable, and yet enable the customer to design its own transaction bandwidth scheduling policy in the policy manager 604 to meet the needs of the particular application; additionally, the PM interface 628 enables the customer to easily integrate the custom policy manager 604 with the switch 100 core.

Figure 25:
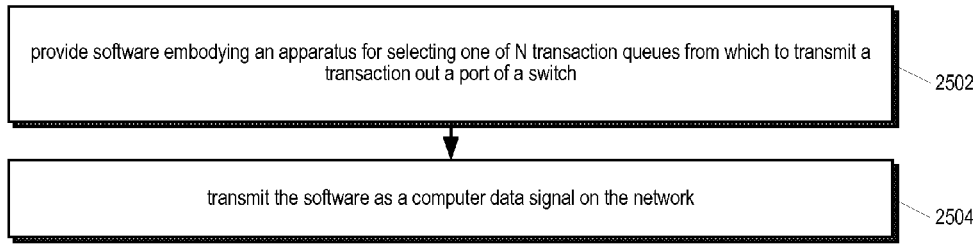
FIGS. 25 through 27 are flowcharts illustrating a method for providing software embodying the apparatus of the present invention and subsequently transmitting the software as a computer data signal over a communication network.
Figure 26:
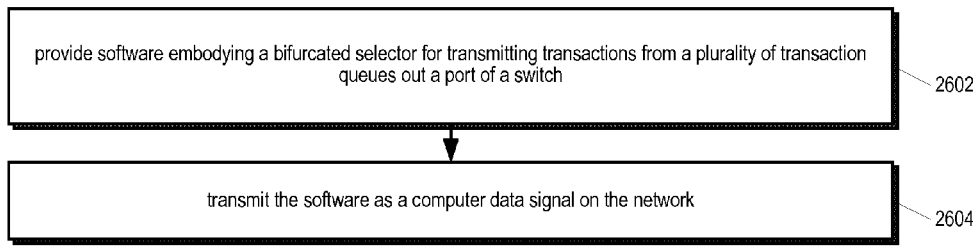
Figure 27:
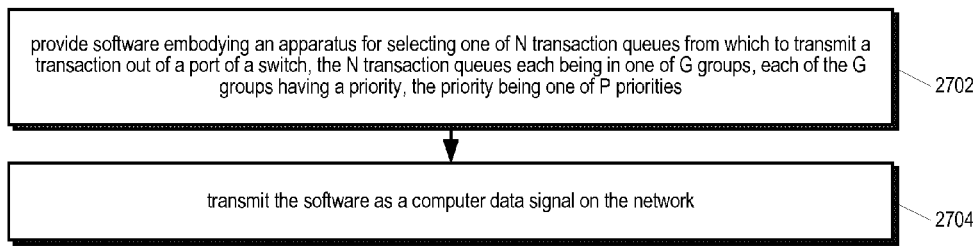

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and transactions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing software embodying the apparatus described herein and subsequently transmitting the software as a computer data signal over a communication network including the Internet and intranets, such as shown in FIGS. 25 through 27. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

I claim:

1. A switch, comprising:
   a network; and
   a plurality of ports, each coupled to receive transactions from others of said ports via said network, each of said ports comprising:
   a port interface configured to transmit said transactions to a device coupled to said port;
   N transaction queues configured to receive said transactions from said network, each of the N transaction queues having a priority, the priority being one of P priorities; and
   a transaction selector coupled to said port interface and said N transaction queues, configured to select for transmission transactions in the N transaction queues in a round-robin fashion within each of the P priorities independent of the other P priorities, said transaction selector comprising:
   P round-robin vectors, corresponding to the respective ones of the P priorities, each having N bits corresponding to the N transaction queues, each being a 1-bit left-rotated and subsequently sign-extended version of an N-bit input vector, said input vector having a single bit true corresponding to a last one of the N transaction queues selected for transmitting out the port at a corresponding one of the P priorities;
   N P-input muxes, each coupled to receive a corresponding one of said N bits of each of said P round-robin vectors, each configured to select for output one of said P inputs specified by the corresponding transaction queue priority;
   selection logic, coupled to receive a transaction from each of the N transaction queues and to select for transmitting out the port one of said N transactions corresponding to one of the N transaction queues having a transmit value greater than or equal to any of the N transaction queues left thereof in said N-bit input vectors;
   wherein said transmit value of each of the N transaction queues comprises a least-significant bit equal to said corresponding P-input mux output, a most-significant bit that is true if said corresponding transaction is transmittable, and middle bits comprising the priority of the transaction queue and,
   priority setting logic configured to set the priority of each of the N transaction queues based on a characteristic of the port with which each respective transaction queue is associated.

2. The switch as recited in claim 1, wherein said network comprises a cross-bar network.

3. The switch as recited in claim 1, wherein the priority of each of the N transaction queues is dynamically updatable among the P priorities.

4. The switch of claim 1 wherein the characteristic of a port comprises the quality-of-service requirements of the port.

5. The switch of claim 1 wherein the characteristic of a port comprises the type of device to which the port is connected.

6. The switch of claim 1 wherein the characteristic of a port comprises the bandwidth requirements of the port.

\* \* \* \* \*